(12) United States Patent
Ke et al.

(10) Patent No.: US 11,190,968 B2
(45) Date of Patent: Nov. 30, 2021

(54) APPARATUS AND METHOD FOR MANAGING CONNECTIONS IN WIRELESS COMMUNICATION SYSTEM

(71) Applicant: Samsung Electronics Co., Ltd., Gyeonggi-do (KR)

(72) Inventors: Xiaowan Ke, Beijing (CN); Lixiang Xu, Beijing (CN); Hong Wang, Beijing (CN)

(73) Assignee: Samsung Electronics Co., Ltd

( * ) Notice: Subject to any disclaimer, the term of this patent is extended or adjusted under 35 U.S.C. 154(b) by 13 days.

(21) Appl. No.: 16/623,201

(22) PCT Filed: Jun. 15, 2018

(86) PCT No.: PCT/KR2018/006739
§ 371 (c)(1),
(2) Date: Dec. 16, 2019

(87) PCT Pub. No.: WO2018/230982
PCT Pub. Date: Dec. 20, 2018

(65) Prior Publication Data
US 2021/0144579 A1    May 13, 2021

(30) Foreign Application Priority Data

Jun. 16, 2017   (CN) .......................... 201710459763.6
Aug. 4, 2017    (CN) .......................... 201710662303.3
(Continued)

(51) Int. Cl.
*H04W 28/02*    (2009.01)
*H04W 76/12*    (2018.01)
(Continued)

(52) U.S. Cl.
CPC ... *H04W 28/0268* (2013.01); *H04W 28/0263* (2013.01); *H04W 76/12* (2018.02); *H04W 76/15* (2018.02); *H04W 76/30* (2018.02)

(58) Field of Classification Search
CPC . H04W 28/0268; H04W 76/12; H04W 76/15; H04W 76/30; H04W 28/0263
See application file for complete search history.

(56) References Cited

U.S. PATENT DOCUMENTS

2010/0091652 A1    4/2010 Lin
2014/0335869 A1    11/2014 Choi et al.
(Continued)

FOREIGN PATENT DOCUMENTS

CN    1719779    1/2006
CN    1794868    6/2006
(Continued)

OTHER PUBLICATIONS

European Search Report dated Nov. 27, 2020 issued in counterpart application No. 18818653.0-1215, 7 pages.
(Continued)

*Primary Examiner* — Ajay Cattungal
(74) *Attorney, Agent, or Firm* — The Farrell Law Firm, P.C.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present disclosure provides a method for connection set-up and corresponding master base station and secondary base station. The method includes: transmitting a secondary base station setup request message to a secondary base station, and receiving a secondary base station setup response message which comprises mapping information from a quality
(Continued)

of service (QoS) flow to a data radio bearer (DRB). The present disclosure further provides a method of requesting a secondary cell group (SCG) configuration and corresponding master base station and secondary base station. The method includes: transmitting a secondary base station modification request message for requesting SCG configuration information, the secondary base station modification request message carrying indication information for indicating that a master base station needs to obtain SCG configuration information; and receiving a secondary base station modification response message transmitted by the secondary base station, the secondary base station modification response message carrying the SCG configuration information. The present disclosure further provides methods and devices for controlling a session operation and a corresponding computer readable medium.

9 Claims, 15 Drawing Sheets

(30) Foreign Application Priority Data

Sep. 28, 2017 (CN) .......................... 201710905767.2
Sep. 29, 2017 (CN) .......................... 201710915312.9
Jan. 11, 2018 (CN) .......................... 201810029453.5

(51) Int. Cl.
*H04W 76/15* (2018.01)
*H04W 76/30* (2018.01)

(56) References Cited

U.S. PATENT DOCUMENTS

| | | | |
|---|---|---|---|
| 2014/0335882 A1 | 11/2014 | Lee et al. | |
| 2015/0223212 A1 | 8/2015 | Der Velde et al. | |
| 2016/0007403 A1 | 1/2016 | Futaki et al. | |
| 2016/0135174 A1 | 5/2016 | Lee et al. | |
| 2016/0219475 A1* | 7/2016 | Kim | H04W 28/08 |
| 2016/0234714 A1* | 8/2016 | Basu Mallick | H04W 28/0278 |
| 2016/0309375 A1* | 10/2016 | Dai | H04W 12/0431 |
| 2016/0338130 A1 | 11/2016 | Park et al. | |
| 2017/0078940 A1 | 3/2017 | Chang et al. | |
| 2018/0213450 A1* | 7/2018 | Futaki | H04W 36/08 |
| 2018/0220425 A1* | 8/2018 | Zhang | H04W 88/10 |
| 2019/0124553 A1* | 4/2019 | Uchino | H04W 28/12 |
| 2020/0008255 A1* | 1/2020 | Sharma | H04W 76/15 |
| 2020/0413290 A1* | 12/2020 | Yang | H04L 47/76 |
| 2021/0022042 A1* | 1/2021 | Peng | H04W 76/12 |

FOREIGN PATENT DOCUMENTS

| | | |
|---|---|---|
| CN | 104797000 | 7/2015 |
| CN | 105992393 | 10/2016 |
| KR | 1020150129293 | 11/2015 |
| WO | WO 2015/008989 | 1/2015 |

OTHER PUBLICATIONS

PCT/ISA/210 Search Report issued on PCT/KR2018/006739, pp. 5.
PCT/ISA/237 Written Opinion issued on PCT/KR2018/006739, pp. 9.
Samsung, "EN DC Inter-node Interaction, Overview and RAN2/RAN3 Scope", R2-1705345, 3GPP TSG-RAN WG2 Meeting #98, May 15-19, 2017, 6 pages.
3rd Generation Partnership Project; Technical Specification Group Radio Access Network; Evolved Universal Terrestrial Radio Access (E-UTRA) and NR; Multi-Connectivity; Stage 2 (Release 15), 3GPP TS 37.340 V0.1.1, Jun. 2017, 30 pages.
Ericsson, "PDU Session, QoS Flow and DRB Control for NG-RAN DC", R3-173954, 3GPP TSG-RAN WG3 Meeting #97bis, Oct. 9-13, 2017, 40 pages.
Samsung, "DC Establishment in New QoS Framework", R3-180969, 3GPP TSG-RAN WG3#99, Feb. 26-Mar. 2, 2018, 11 pages.
Samsung, "Support of DRB Offloading and QoS Flow Offloading", R3-181858, 3GPP TSG-RAN WG3#99bis, Apr. 16-20, 2018, 11 pages.
European Search Report dated May 4, 2020 issued in counterpart application No. 18818653.0-1215, 13 pages.
Motorola Mobility et al., "Corrections to PDU Session Establishment Procedure", S2-172637, SA WG2 Meeting #120, Mar. 26-31, 2017, 15 pages.
Yu Chen et al., "Research and Implement of Policy-based QoS Architecture during Video Streaming Session in IMS", China Academic Journal, Jan. 17, 2019, 3 pages.
Samsung, "Refinement on CSI Acquisition Framework", R1-1705345, 3GPP TSG RAN WG1 88bis, Apr. 3-7, 2017, 5 pages.
Chinese Office Action dated Sep. 9, 2021 issued in counterpart application No. 201710662303.3, 24 pages.
Chinese Office Action dated Oct. 8, 2021 issued in counterpart application No. 201810029453.5, 15 pages.

\* cited by examiner

[Fig. 1]
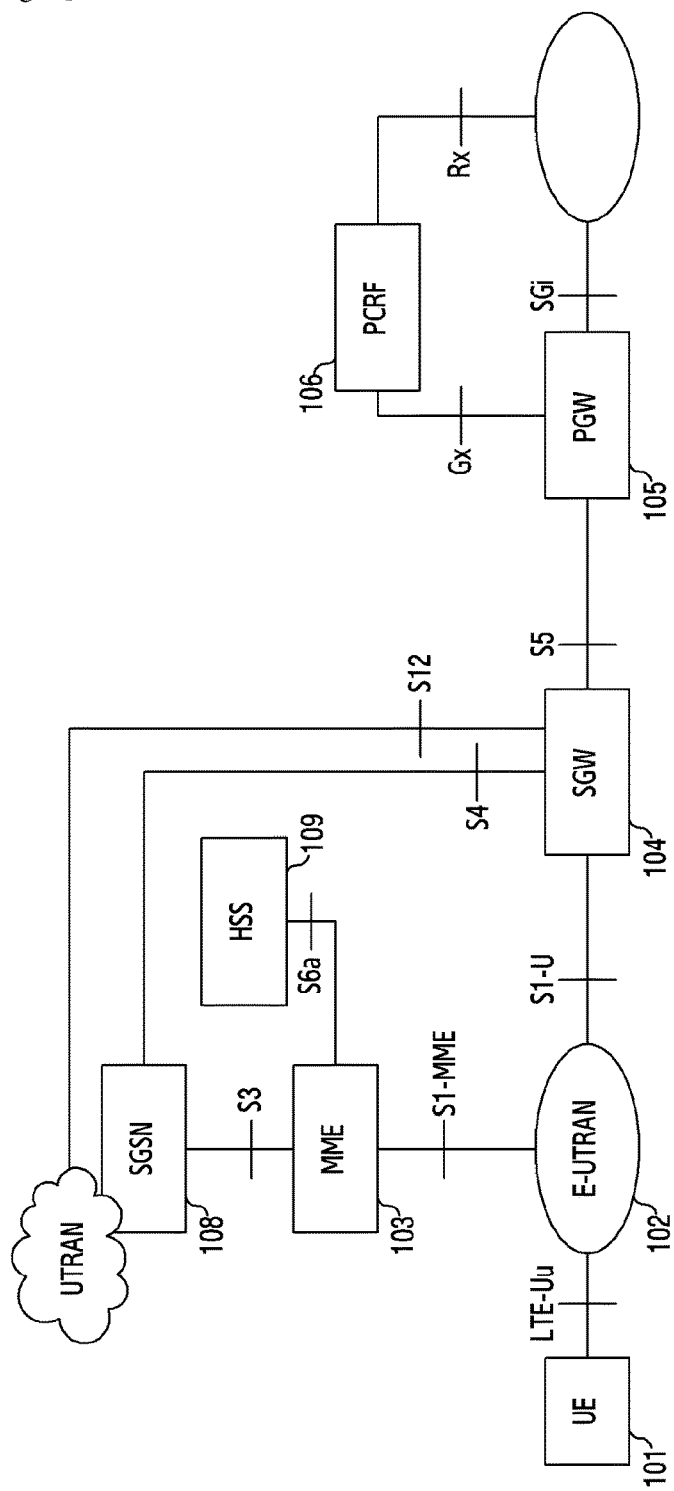
[Fig. 2]
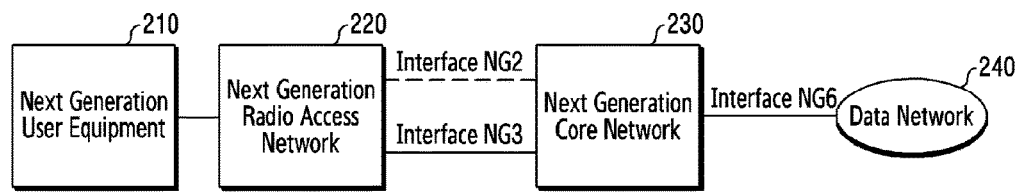

[Fig. 3]
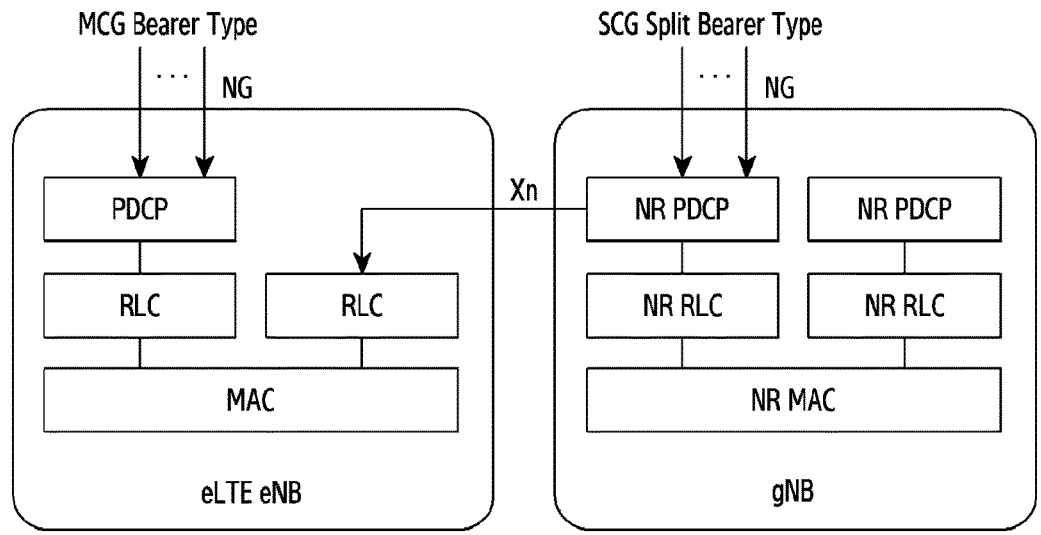
[Fig. 4]
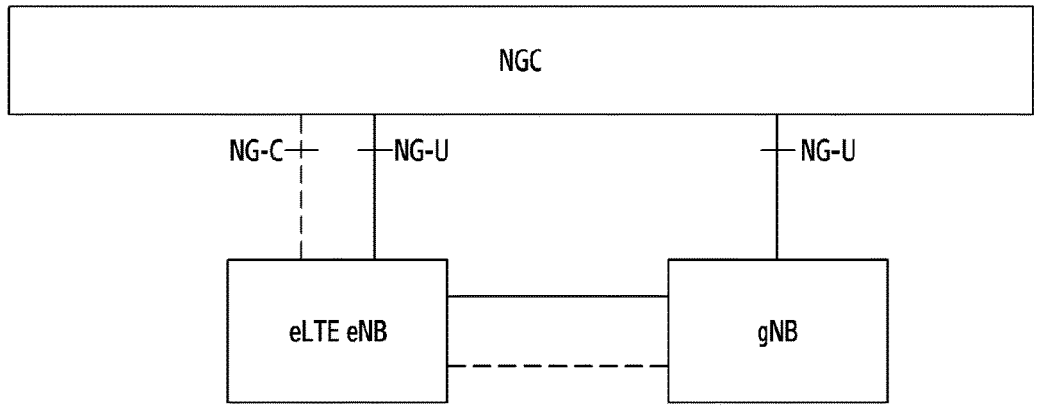
[Fig. 5]
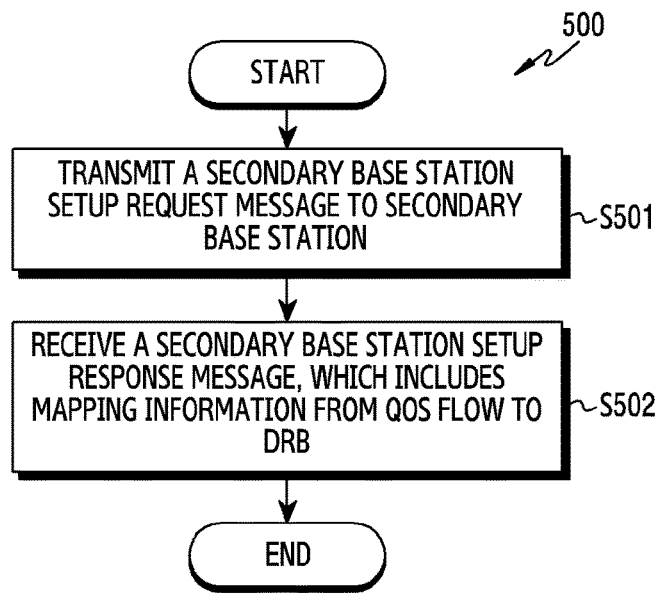

[Fig. 6]
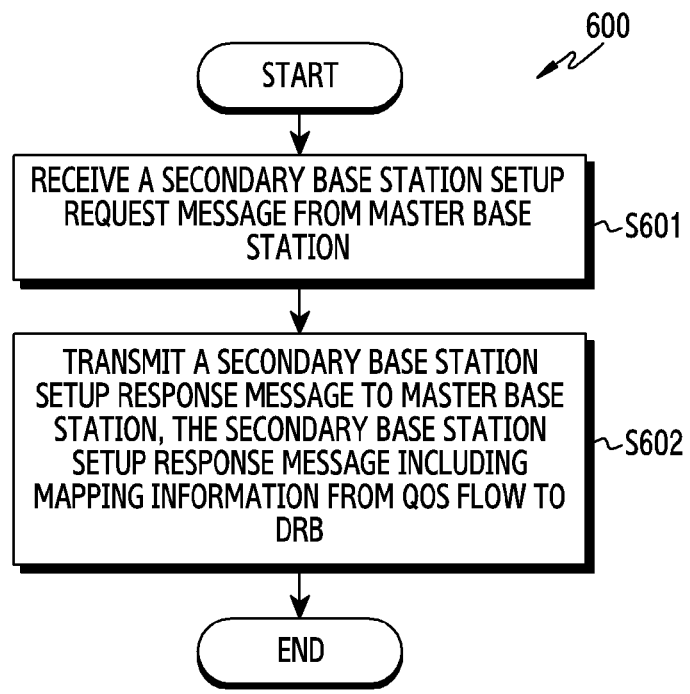

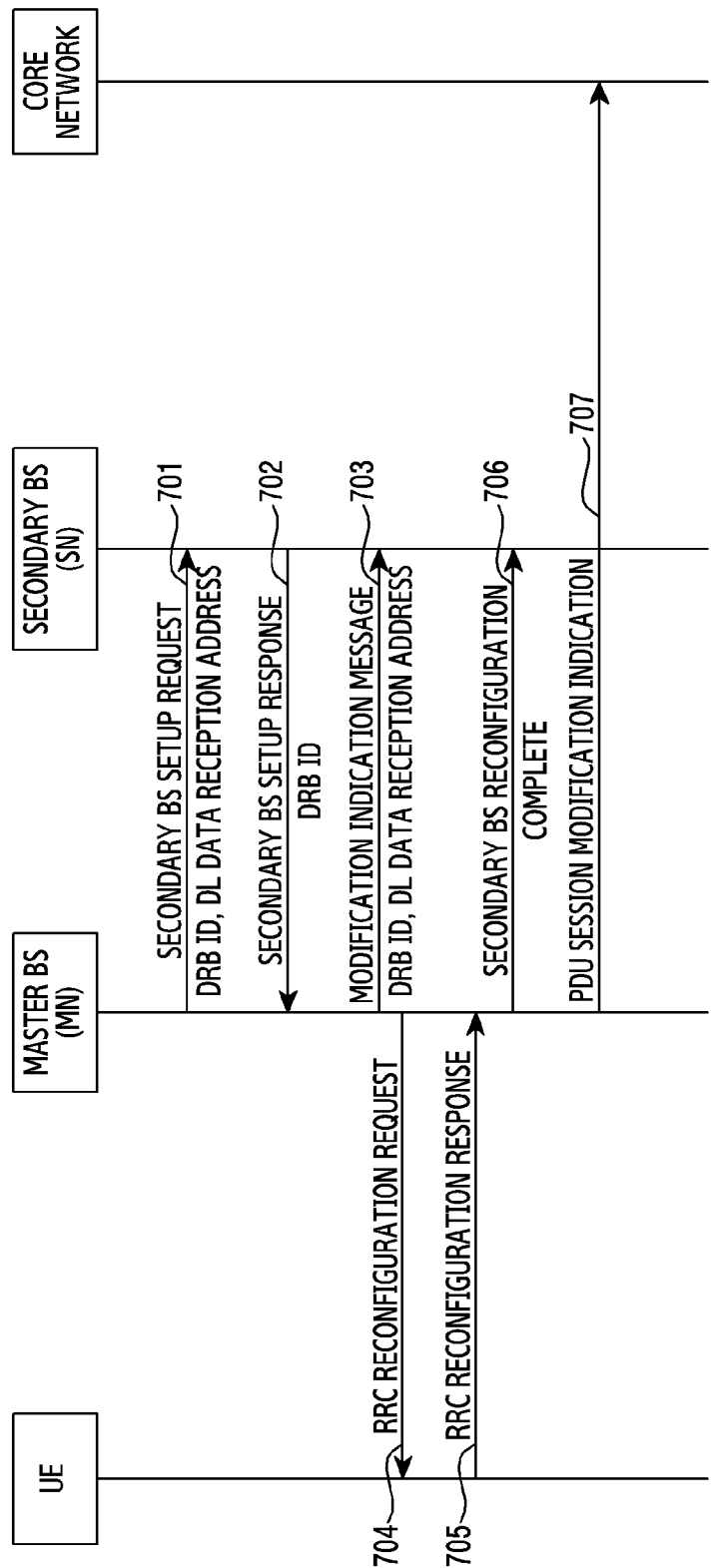

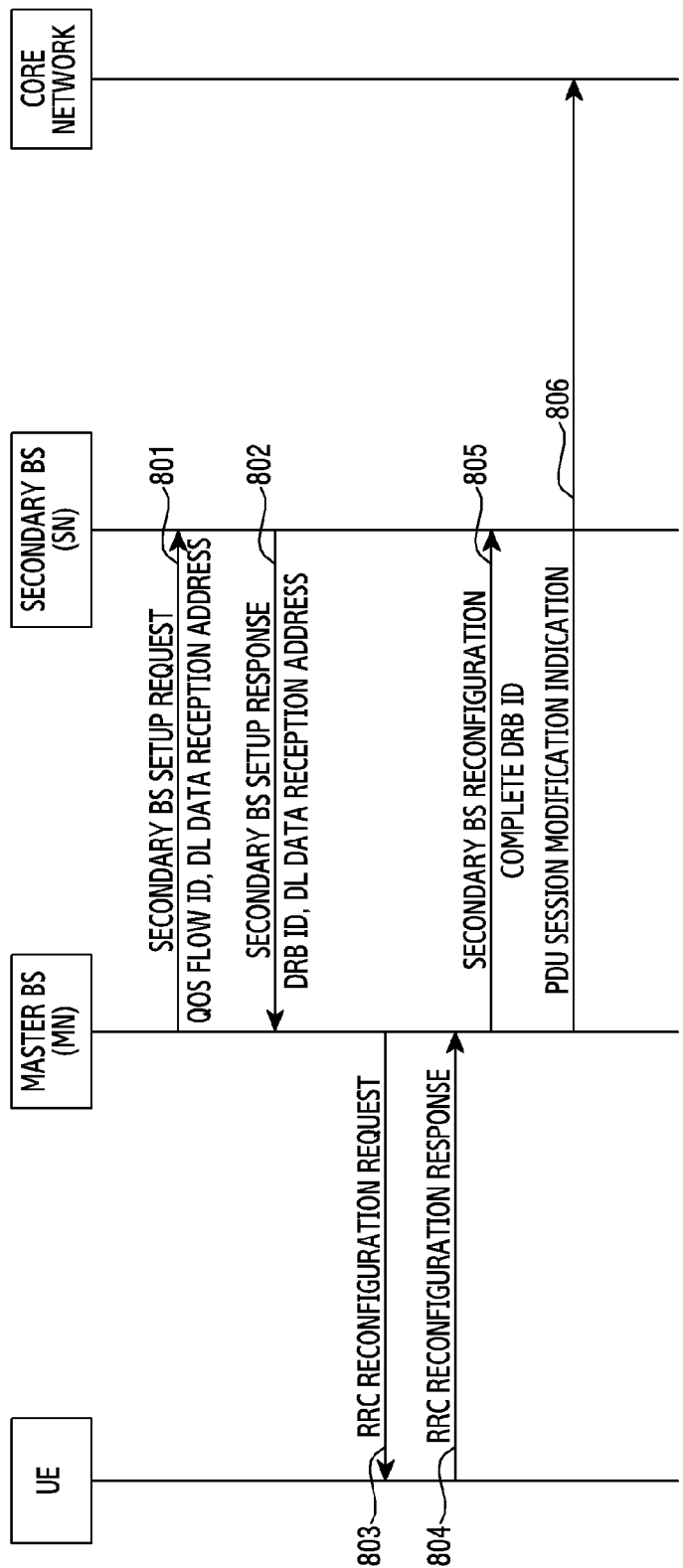

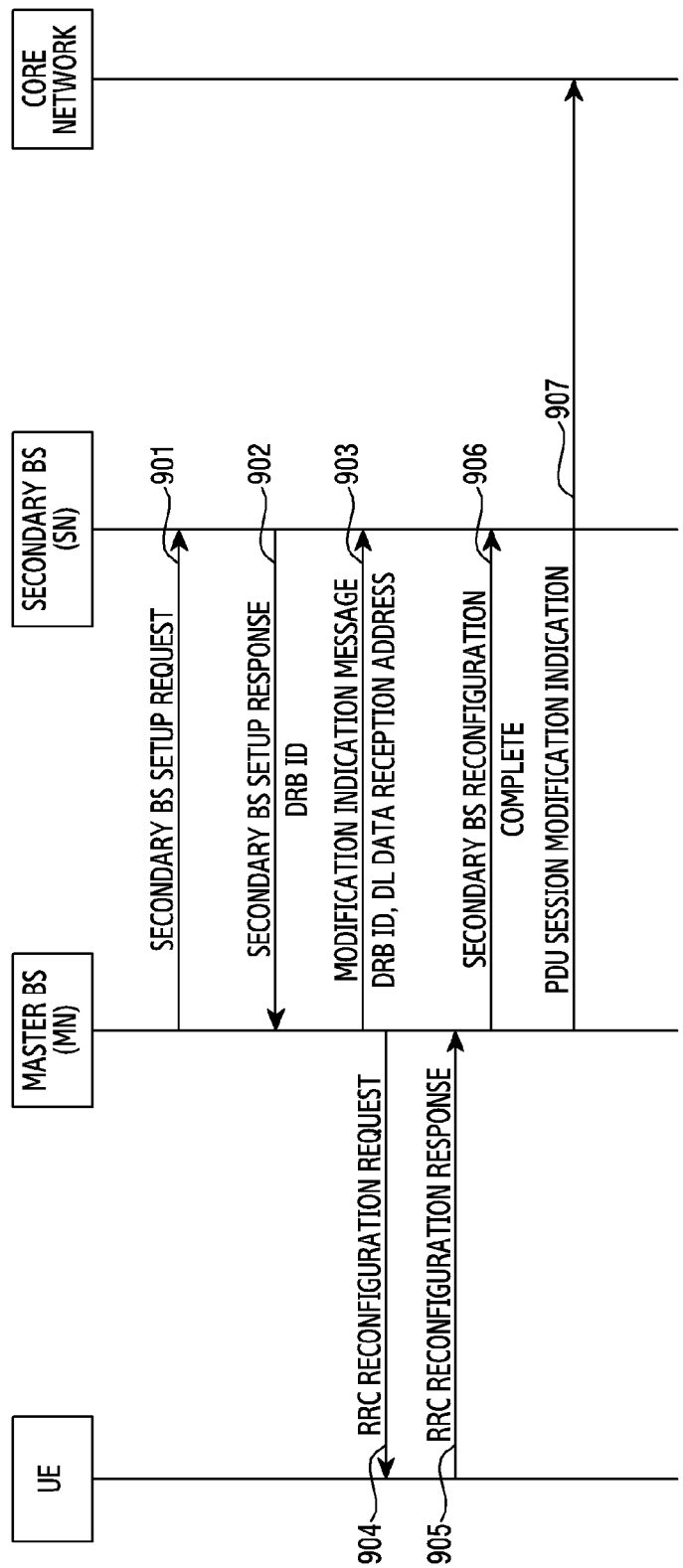
[Fig. 9]

[Fig. 10]
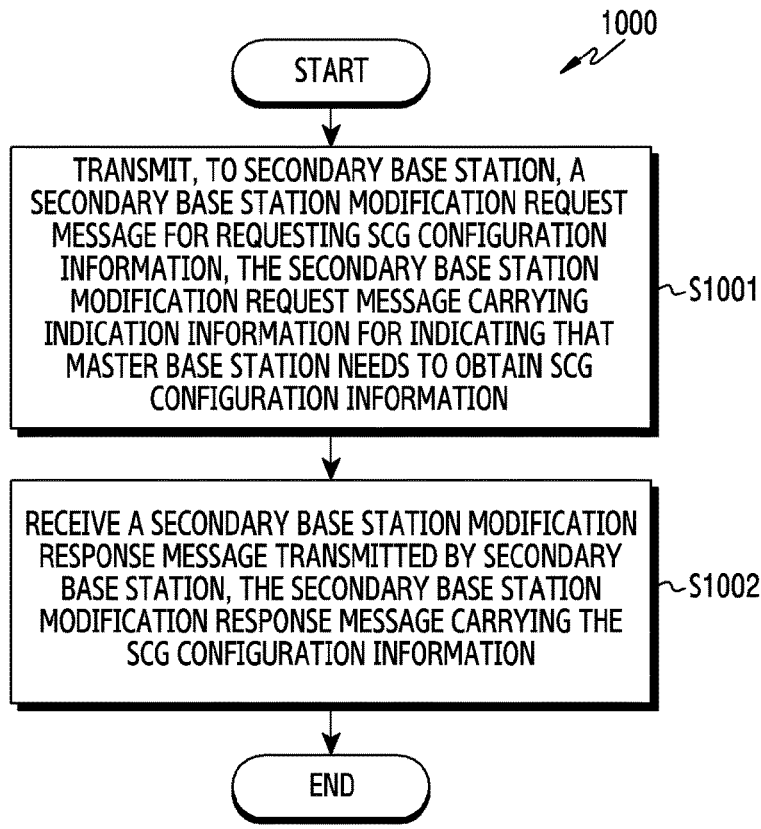
[Fig. 11]
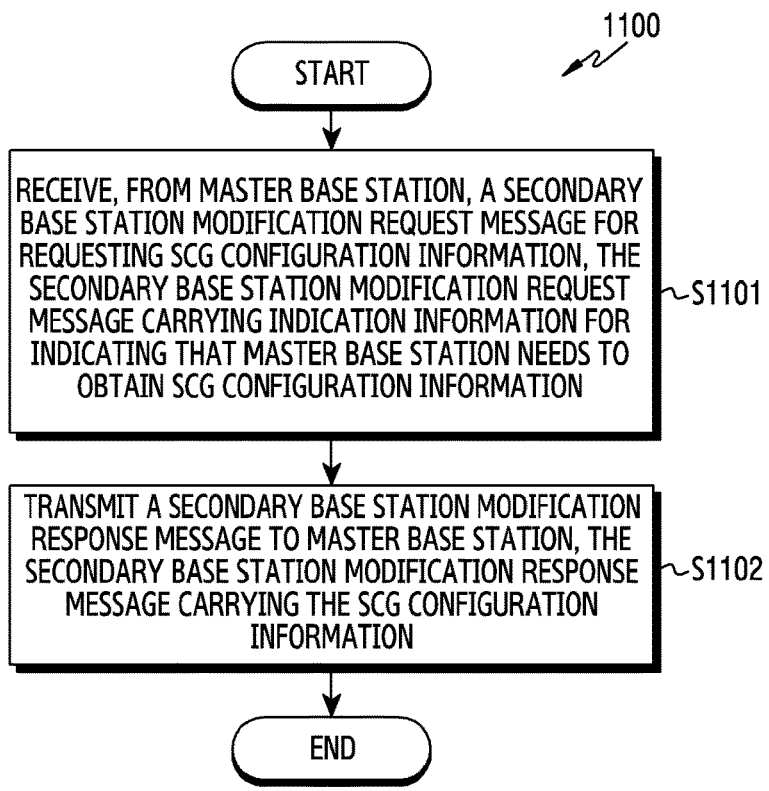

[Fig. 12]
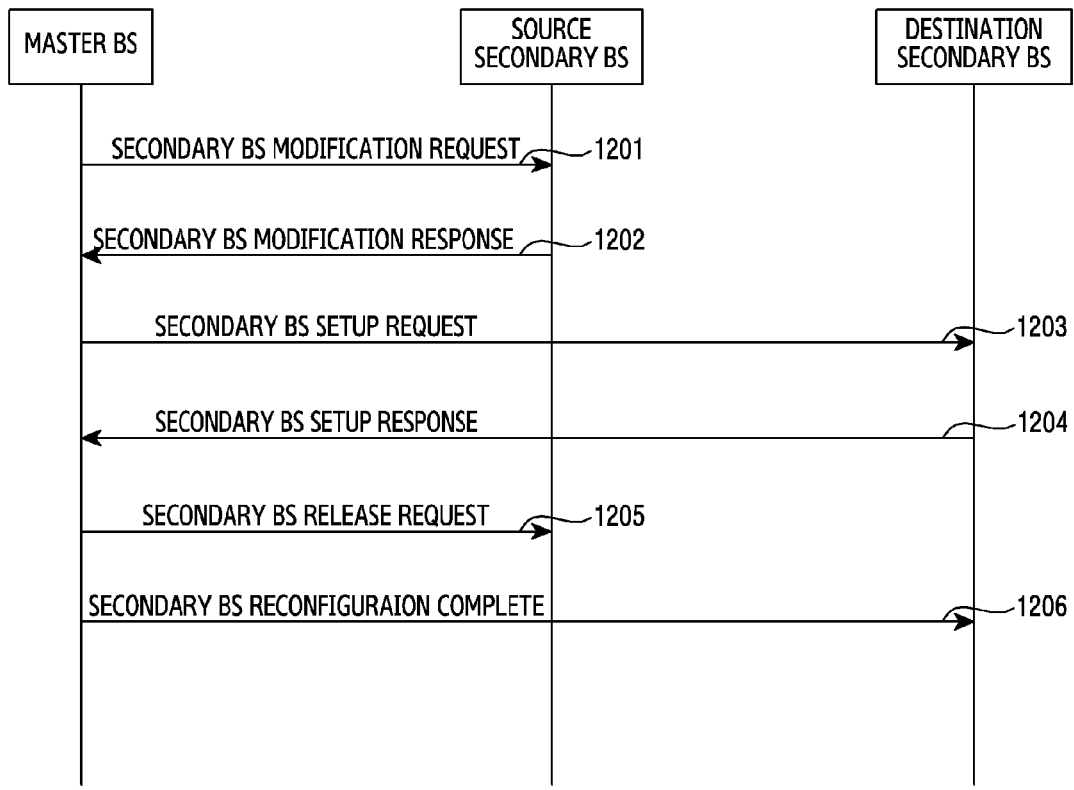
[Fig. 13]
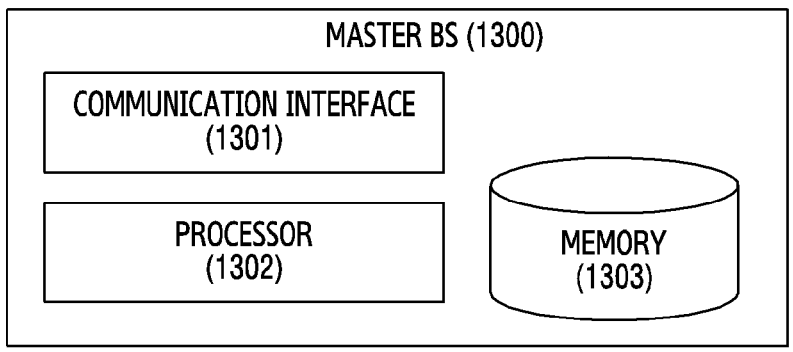
[Fig. 14]
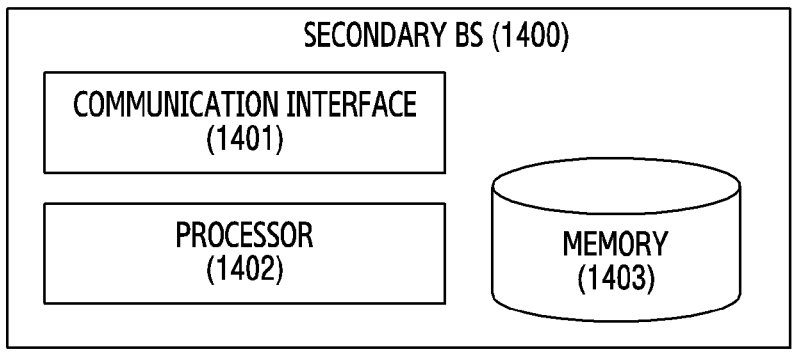

[Fig. 15]
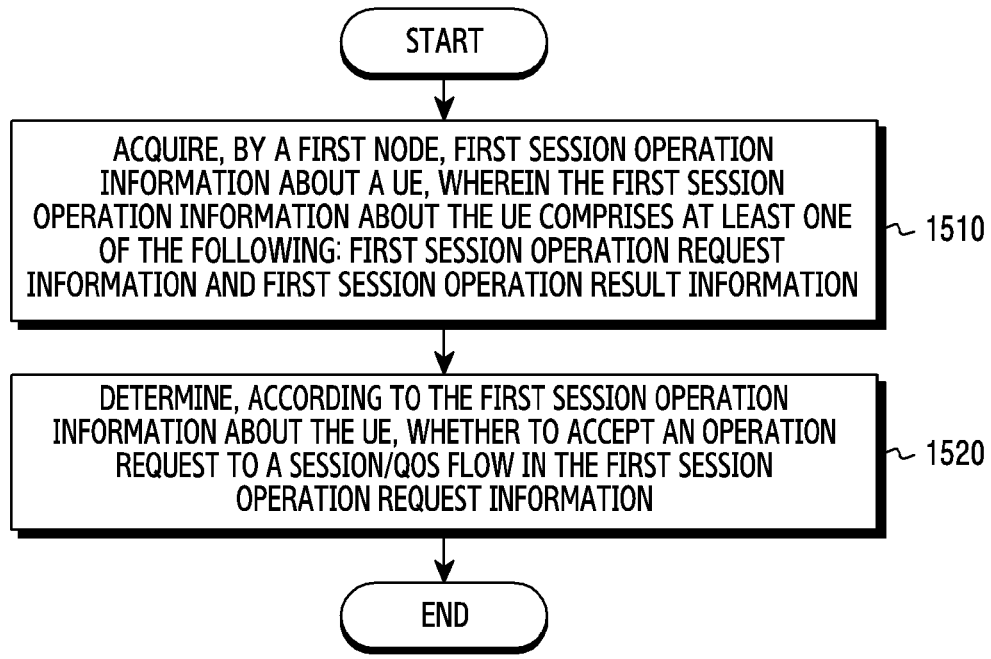
[Fig. 16]
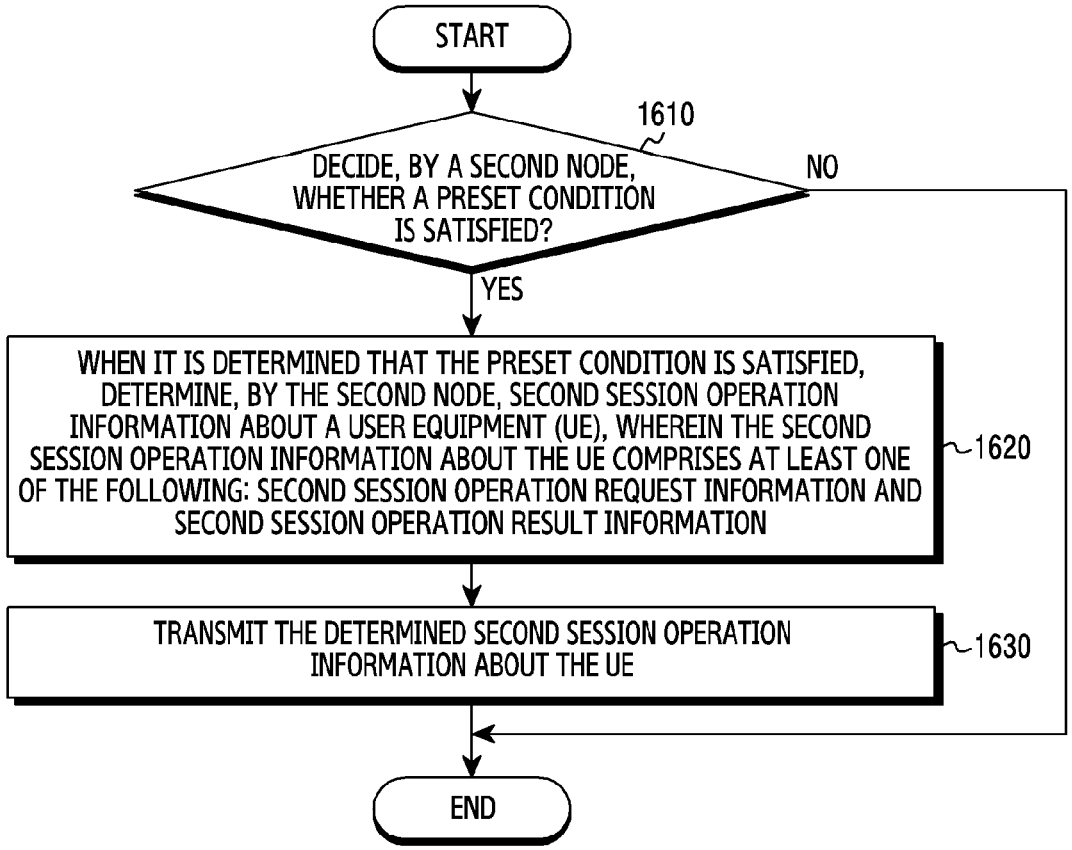

[Fig. 17]
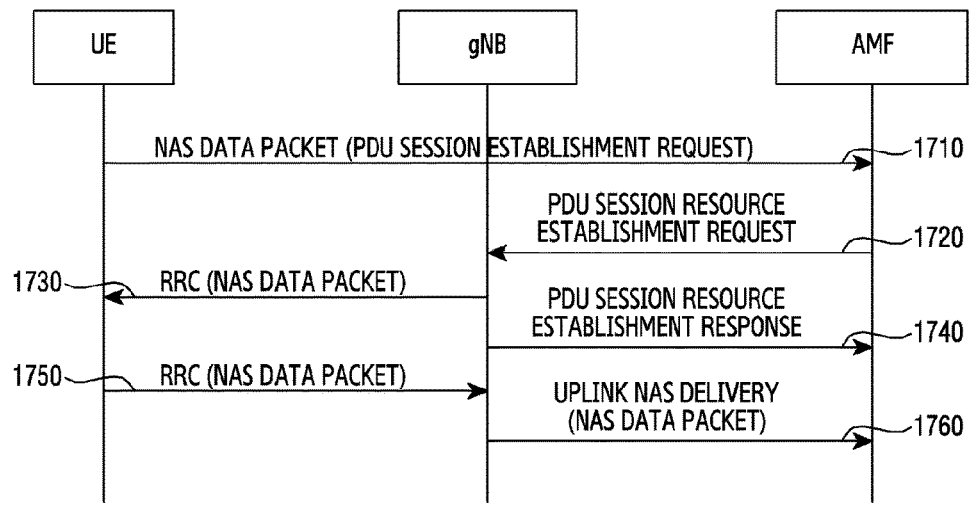
[Fig. 18]
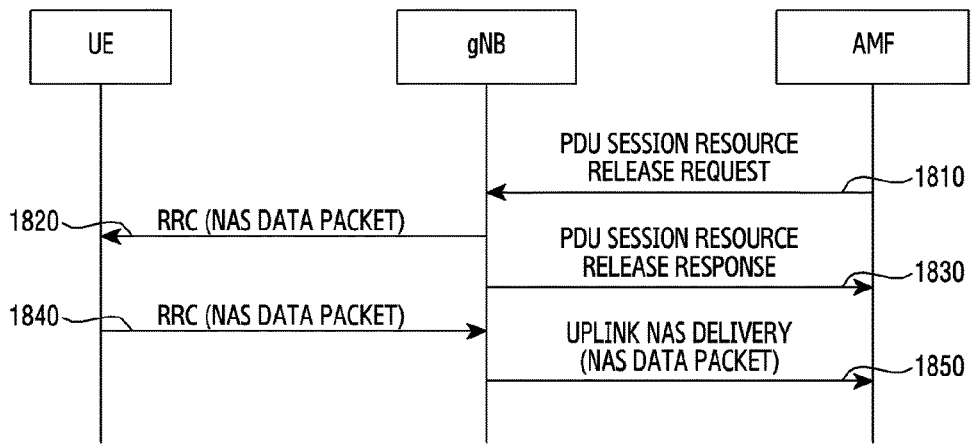
[Fig. 19]
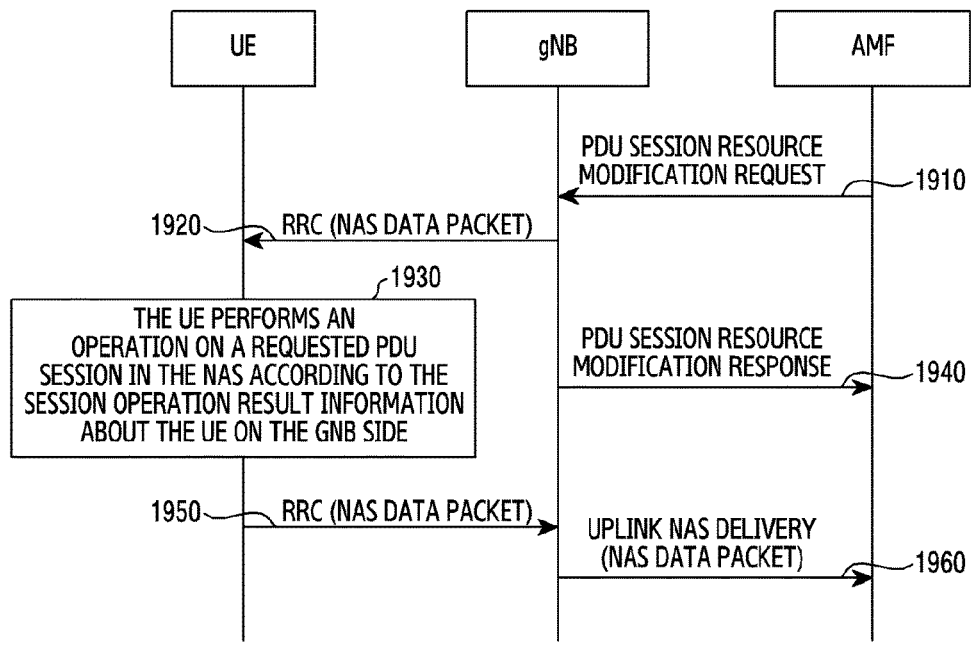

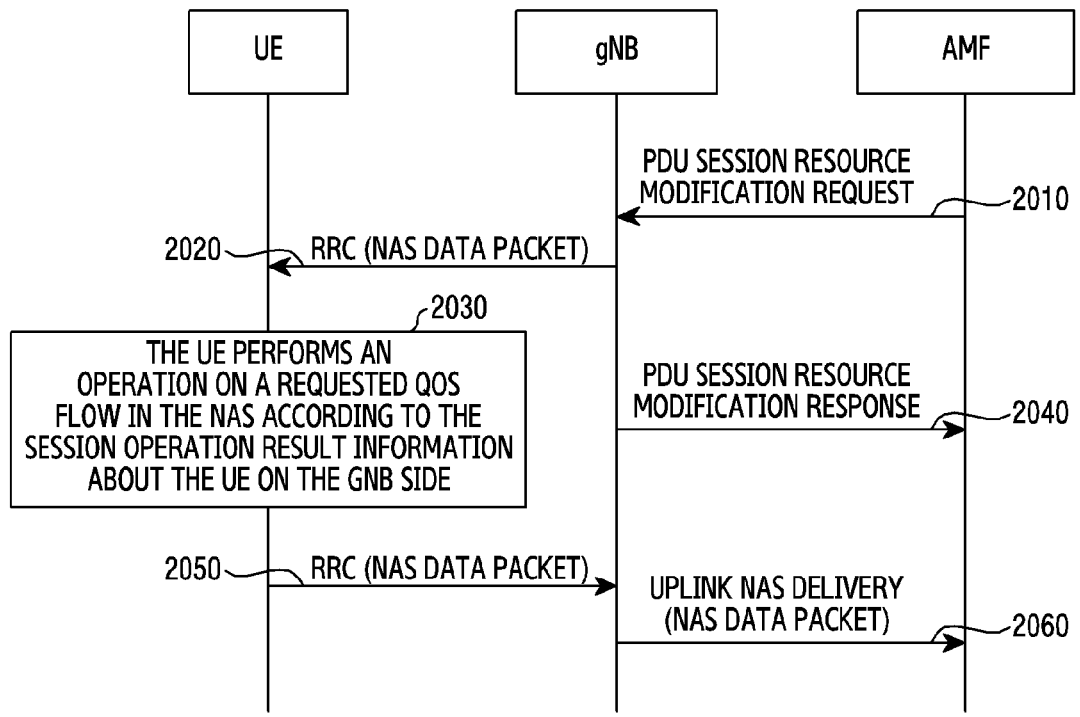
[Fig. 20]
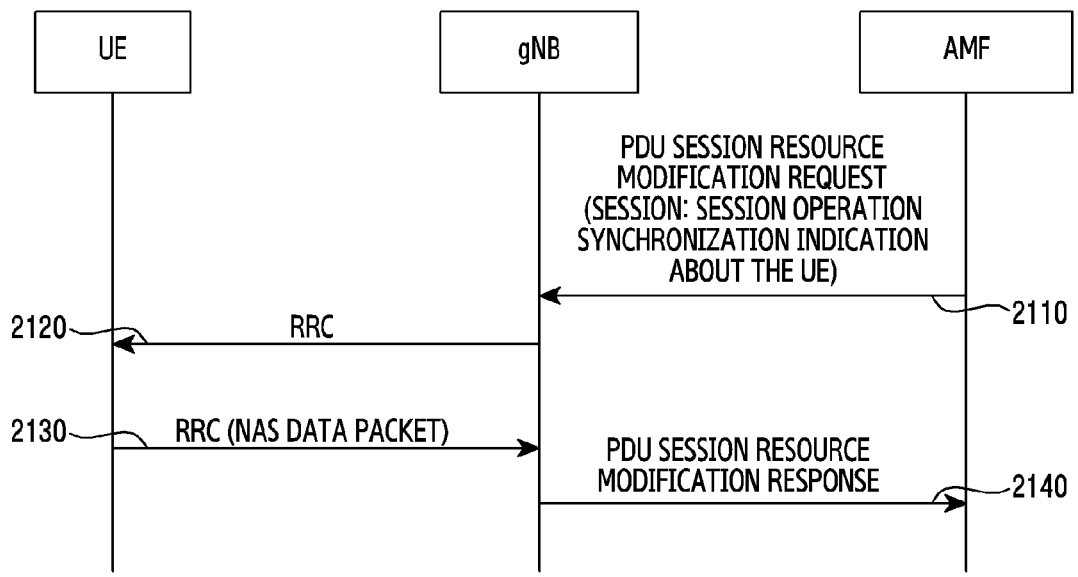
[Fig. 21]

[Fig. 22]
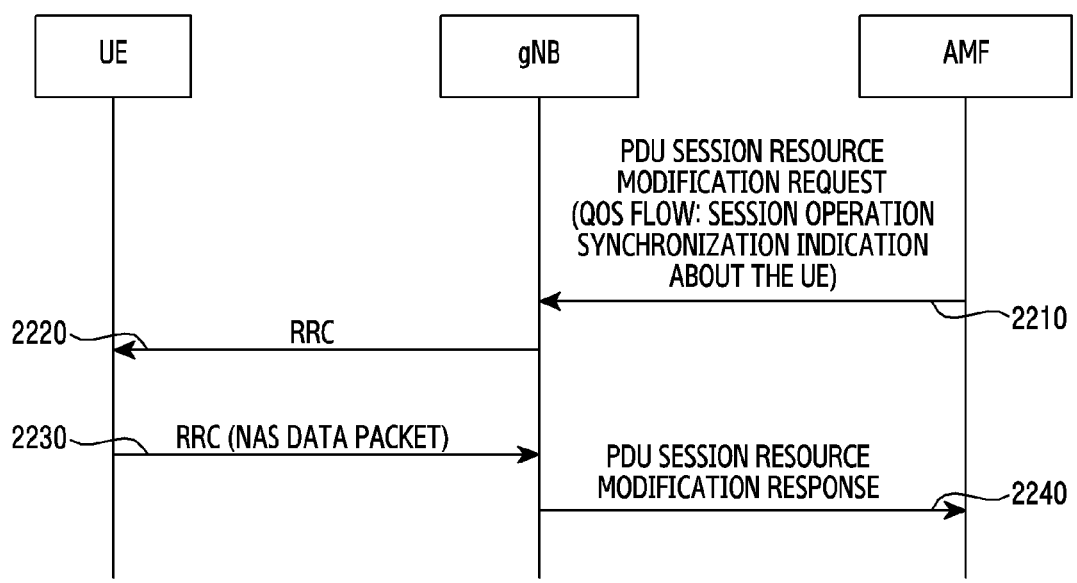

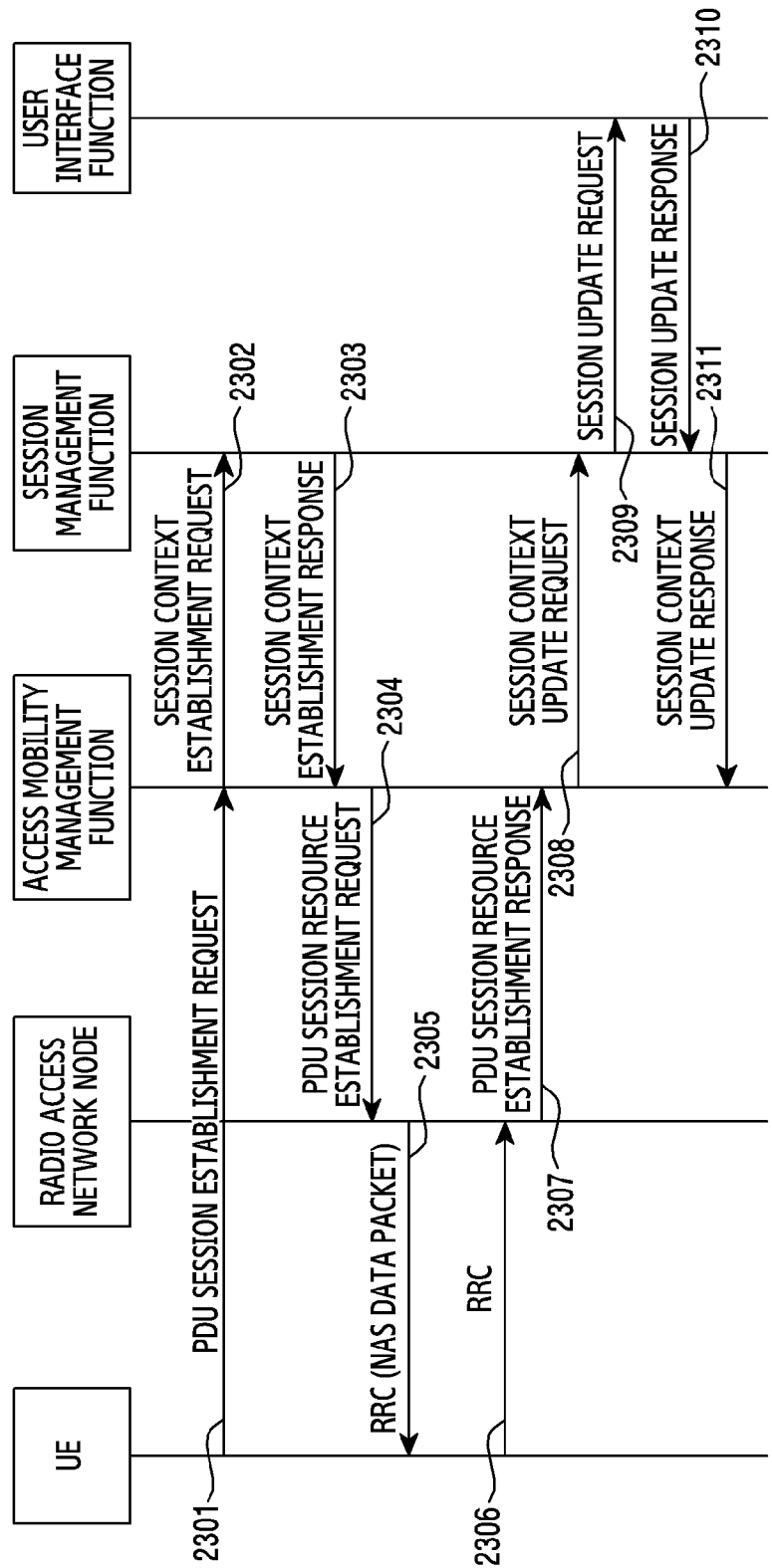
[Fig. 23]

[Fig. 24]
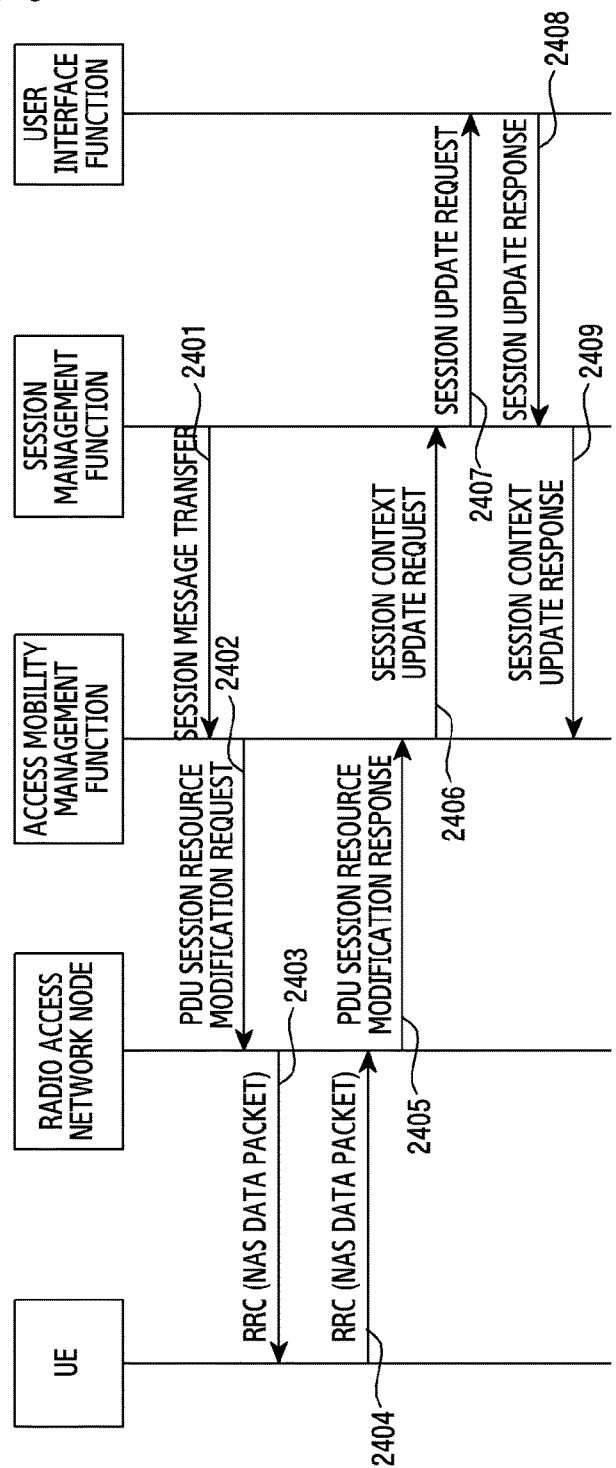
[Fig. 25]
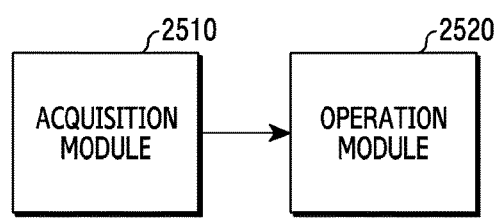

[Fig. 26]
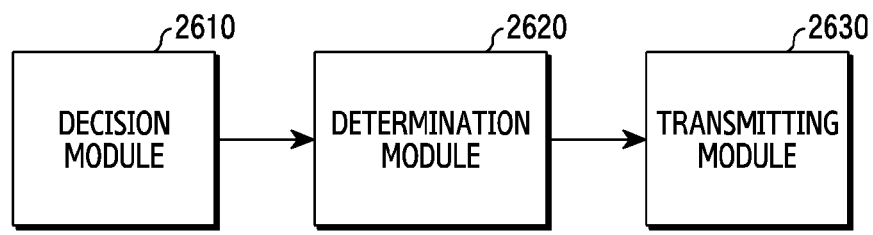

APPARATUS AND METHOD FOR MANAGING CONNECTIONS IN WIRELESS COMMUNICATION SYSTEM

PRIORITY

This application is a National Phase Entry of PCT International Application No. PCT/KR2018/006739 which was filed on Jun. 15, 2018, and claims priority to Chinese Patent Application Nos. 201710459763.6, 201710662303.3, 201710905767.2, 201710915312.9 and 201810029453.5, which were filed on Jun. 16, 2017, Aug. 4, 2017, Sep. 28, 2017, Sep. 29, 2017 and Jan. 11, 2018, the content of each of which is incorporated herein by reference.

TECHNICAL FIELD

The present disclosure relates to wireless communication technology, in particular to a method for connection setup, a method of requesting secondary cell group configuration and corresponding base stations, as well as methods and devices for controlling a session operation.

BACKGROUND ART

To meet the demand for wireless data traffic having increased since deployment of $4^{th}$ generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless communication system such as the 5G system, one or more connections may be established to communicate between a terminal and a base station. In order to perform the communications more effectively, the one or more connections should be managed well in respect of setting up, configuring, controlling, maintaining and so on.

DISCLOSURE OF INVENTION

Technical Problem

For this purpose, the present disclosure provides a technical solution for setting up a dual connectivity when a master base station and a secondary base station make different decisions on mapping from a quality of service (QoS) flow to a data radio bearer (DRB).

Solution to Problem

According to a first aspect of the present disclosure, a method for connection setup is provided. The method includes: transmitting a secondary base station setup request message to a secondary base station; and receiving a secondary base station setup response message which comprises mapping information from a QoS flow to a DRB.

In an exemplary embodiment, the secondary base station setup request message comprises one or more of following information: a type of a dual connectivity bearer; QoS flow identifier (ID) information; an ID of a protocol data unit (PDU) session to which the QoS flow belongs; a quality requirement parameter corresponding to the QoS flow; an uplink data reception address; and a radio resource control (RRC) transparent container.

In an exemplary embodiment, the secondary base station setup request message further comprises: a downlink data reception address assigned by a master base station for receiving downlink data from the secondary base station.

In an exemplary embodiment, the secondary base station setup response message further comprises: a downlink data reception address of the DRB at an Xn interface.

In an exemplary embodiment, the secondary base station setup request message further comprises: an ID of a DRB corresponding to a QoS flow which can be set up at the secondary base station.

In an exemplary embodiment, the method further comprises receiving at least one of following information transmitted by the master base station according to the secondary base station setup response message: an ID of a DRB determined by the secondary base station; and tunnel information assigned by the master base station for the DRB.

In an exemplary embodiment, the information is carried in a secondary base station reconfiguration complete message transmitted to the secondary base station.

According to a second aspect of the present disclosure, a method for connection setup is provided. The method includes: receiving a secondary base station setup request message from a master base station; and transmitting a secondary base station setup response message to the mater base station, the secondary base station setup response message comprising mapping information from a QoS flow to a DRB.

In an exemplary embodiment, the secondary base station setup request message comprises one or more of following information: a type of a dual connectivity bearer; QoS flow ID information; an ID of a PDU session to which the QoS flow belongs; a quality requirement parameter corresponding to the QoS flow; an uplink data reception address; an RRC transparent container.

In an exemplary embodiment, the secondary base station setup request message further comprises: a downlink data reception address assigned by the master base station for receiving downlink data from the secondary base station.

In an exemplary embodiment, the secondary base station setup response message further comprises: a downlink data reception address of the DRB over an Xn interface.

In an exemplary embodiment, the secondary base station setup request message further comprises: an ID of a DRB corresponding to a QoS flow which can be set up at the secondary base station.

In an exemplary embodiment, the method further comprises receiving at least one of following information transmitted by the master base station according to the secondary base station setup response message: an ID of a DRB determined by the secondary base station; and tunnel information assigned by the master base station for the DRB.

In an exemplary embodiment, the information is carried in a secondary base station reconfiguration complete message transmitted from the master base station to the secondary base station.

According to a third aspect of the present disclosure, a method of requesting a secondary cell group (SCG) configuration is provided. The method includes: transmitting, to a secondary base station, a secondary base station modification request message for requesting SCG configuration information, the secondary base station modification request message carrying indication information for indicating that a master base station needs to obtain SCG configuration information; and receiving a secondary base station modification response message transmitted by the secondary base station, the secondary base station modification response message carrying the SCG configuration information.

According to a fourth aspect of the present disclosure, a method of requesting a SCG configuration is provided. The method includes: receiving, from a master base station, a secondary base station modification request message for requesting SCG configuration information, the secondary base station modification request message carrying indication information for indicating that the master base station needs to obtain SCG configuration information; and transmitting a secondary base station modification response message to the master base station, the secondary base station modification response message carrying the SCG configuration information.

In an exemplary embodiment, after receiving the indication information, the secondary base station ignores an RRC transparent container carried in the secondary base station modification request information.

According to a fifth aspect of the present disclosure, a master base station is provided. The master base station includes: a communication interface, configured for communication; a processor; and a memory storing computer executable instructions which, when executed by the processor, cause the master base station to perform the methods as described above which are performed at the master base station.

According to a sixth aspect of the present disclosure, a secondary base station is provided. The secondary base station includes: a communication interface, configured for communication; a processor; and a memory storing computer executable instructions which, when executed by the processor, cause the secondary base station to perform the methods as described above which are performed at the secondary base station.

According to a seventh aspect of the present disclosure, a computer readable medium is provided. The computer readable medium stores instructions which, when executed by a processor, cause the processor to perform the methods as described above.

Another purpose of the present disclosure is to solve the problem of very low data transmission efficiency caused by extensive signaling overhead and large operation delay when a UE accesses to a network in the prior art.

An embodiment of the present disclosure provides a method for controlling a session operation, comprising the steps of: acquiring, by a first node, first session operation information about a user equipment (UE), wherein the first session operation information about the UE comprises at least one of the following: first session operation request information and first session operation result information; and determining, according to the first session operation information about the UE, whether to accept an operation request to a session/QoS flow in the first session operation request information.

An embodiment of the present disclosure further provides a method for controlling a session operation, comprising the steps of: determining, by a second node, whether a preset condition is satisfied; when it is determined that the preset condition is satisfied, determining, by the second node, second session operation information about a UE, wherein the second session operation information about the UE comprises at least one of the following: second session operation request information and second session operation result information; and transmitting the determined second session operation information about the UE.

An embodiment of the present disclosure further provides a device for controlling a session operation, comprising: an acquisition module configured to acquire, by a first node, first session operation information about a UE, wherein the first session operation information about the UE comprises at least one of the following: first session operation request information and first session operation result information; and an operation module configured to determine, according to the first session operation information about the UE, whether to accept an operation request for a session/QoS flow in the first session operation request information.

An embodiment of the present disclosure further provides a device for controlling a session operation, comprising: a decision module configured to decide, by a second node, whether a preset condition is satisfied; a determination module configured to, when it is determined that the preset condition is satisfied, determine, by the second node, second session operation information about a User Equipment (UE), wherein the second session operation information about the UE comprises at least one of the following: second session operation request information and second session operation result information; and a transmitting module configured to transmit the determined second session operation information about the UE.

When a core network performs an operation on a session related to a UE, an operation should be performed on the UE and radio resources should be allocated by a radio access network. A session operation request and a session operation result between the UE and the core network are transparently transmitted by the radio access network. For some session operations, the radio access network does not know the result of an operation performed by the UE, and the UE also does not know the result of an operation performed by the radio access network. If the UE accepts a failed session operation of the radio access network or the radio access network accepts a failed session operation of the UE, inconsistent session operation will occur. In the first embodiment of the present disclosure, this problem can be solved. In addition, the operation in the access stratum and the operation in the non-access stratum by the UE are independent. When the operation in the access stratum is failed, the acceptation of an operation request in the non-access stratum is valueless. This problem can be solved in the first embodiment of the present disclosure. The UE can determine, according to a session operation request from a core network and a result of an operation performed according to the session operation request of the core network from the radio access network, whether to accept the session operation request from the core network; or, the radio access network can determine, according to the session operation request from the core network and its own session operation result, a session operation request to be eventually transmitted to the UE; or, a radio access network node determines, according to the result of session operation from the UE and its own session operation result, a session operation result to be eventually returned to the core network; or, the core network can generate, according to the session operation result returned by the radio access network, a session operation request transmitted to the UE; or more. By controlling the operation of a session/QoS flow of the UE, the establishment, modification and release operations of the session/QoS flow of the UE by the core network, the radio access network and the UE can be ensured to be consistent, and the core network is prevented from repetitively generating signaling to maintain consistency. Thus, the overhead of signaling is reduced, the data transmission efficiency is greatly improved, the delay for the UE to access to a network is greatly reduced, and the operation delay of the session/QoS flow is ensured.

Additional aspects and advantages of the present disclosure will be partially appreciated and become apparent from the descriptions below, or will be well learned from the practices of the present disclosure.

Advantageous Effects of Invention

With the technical solution provided by the present disclosure, resources of the dual connectivity may be configured properly, interactions of signaling may be reduced, and transmission reliability of user data may be improved.

BRIEF DESCRIPTION OF DRAWINGS

FIG. 1 is a system architecture diagram showing the System Architecture Evolution (SAE) in the prior art;

FIG. 2 is an initial system architecture diagram of a next generation network (5G);

FIG. 3 schematically shows a dual connectivity architecture;

FIG. 4 schematically shows a user plane architecture of a secondary cell group (SCG) split bearer;

FIG. 5 schematically shows a flowchart of a method for dual connectivity setup performed at a master base station according to an exemplary embodiment of the present disclosure;

FIG. 6 schematically shows a flowchart of a method for dual connectivity setup performed at a secondary base station according to an exemplary embodiment of the present disclosure;

FIG. 7 schematically shows a signaling flow diagram for dual connectivity setup according to a first exemplary embodiment of the present disclosure;

FIG. 8 schematically shows a signaling flow diagram for dual connectivity setup according to a second exemplary embodiment of the present disclosure;

FIG. 9 schematically shows a signaling flow diagram for dual connectivity setup according to a third exemplary embodiment of the present disclosure;

FIG. 10 schematically shows a flowchart of a method of requesting a SCG configuration performed at a master base station according to an exemplary embodiment of the present disclosure;

FIG. 11 schematically shows a flowchart of a method of requesting a SCG configuration performed at a secondary base station according to an exemplary embodiment of the present disclosure;

FIG. 12 schematically shows a signaling flow diagram of requesting a SCG configuration according to an exemplary embodiment of the present disclosure;

FIG. 13 schematically shows a structural block diagram of a master base station according to an exemplary embodiment of the present disclosure;

FIG. 14 schematically shows a structural block diagram of a secondary base station according to an exemplary embodiment of the present disclosure;

FIG. 15 schematically shows a flowchart of a method for controlling a session operation according to a first embodiment of the present invention;

FIG. 16 schematically shows a flowchart of a method for controlling a session operation according to a second embodiment of the present invention;

FIG. 17 schematically shows a signaling flow diagram of an operation process in the method for controlling a session operation in a first application scenario of the present invention;

FIG. 18 schematically shows a signaling flow diagram of an operation process in the method for controlling a session operation in a second application scenario of the present invention;

FIG. 19 schematically shows a signaling flow diagram of an operation process in the method for controlling a session operation in a third application scenario of the present invention;

FIG. 20 schematically shows a signaling flow diagram of an operation process in the method for controlling a session operation in a fourth application scenario of the present invention;

FIG. 21 schematically shows a signaling flow diagram of an operation process in the method for controlling a session operation in a fifth application scenario of the present invention;

FIG. 22 schematically shows a signaling flow diagram of an operation process of the method for controlling a session operation in an eighth application scenario of the present invention;

FIG. 23 schematically shows a signaling flow diagram of an operation process in the method for controlling a session operation in an eleventh application scenario of the present disclosure;

FIG. 24 schematically shows a signaling flow diagram of an operation process in the method for controlling a session operation in a twelfth application scenario of the present disclosure;

FIG. 25 schematically shows a structural block diagram of a device for controlling a session operation according to a third embodiment of the present disclosure; and FIG. 26 schematically shows a structural block diagram of a device for controlling a session operation according to a fourth embodiment of the present disclosure.

BEST MODE FOR CARRYING OUT THE INVENTION

In order to make the purpose, technical solutions and advantages of the present disclosure clearer, the present disclosure will be further explained in detail with reference to the accompanying drawings. It should be noted that the following description is only for the purpose of illustration but not for any limitation. In the following description, numerous specific details are set forth in order to provide a thorough understanding of the present disclosure. However, it will be apparent to the skilled in the art that the present disclosure need not be practiced with these specific details.

In other instances, well-known circuits, materials, or methods have not been described in detail in order to avoid obscuring the present disclosure.

Throughout the specification, references to "one embodiment", "an embodiment", "one example" or "an example" mean that a particular feature, structure, or characteristic described in connection with the embodiment or example is included in at least one embodiment of the present disclosure. Thus, phrases "in one embodiment", "in an embodiment", "one example" or "an example" appearing in various places throughout the specification are not necessarily all referring to the same embodiment or example. In addition, particular features, structures, or characteristics may be combined in one or more embodiments or examples in any suitable combination and/or sub-combination. Moreover, the skilled in the art should understand that the drawings provided herein are for illustration purposes only, and the drawings are not necessarily drawn to scale. As used herein, the term "and/or" includes any and all combinations of one or more of the associated listed items.

The modern mobile communication increasingly tends to focus on multimedia services with high-rate transmission for users. FIG. 1 is a system architecture diagram showing the system architecture evolution (SAE), wherein a user equipment (UE) 101 is a terminal equipment supporting a network protocol; an evolved universal terrestrial radio access network (E-UTRAN) 102 is a radio access network in which an eNodeB/NodeB providing the UE with an interface for accessing the radio network is included; a mobile management entity (MME) 103 is responsible for managing a movement context, a session context and security information for the UE; a main function of a serving gateway (SGW) 104 is to provide a user plane, and the MME 103 and the SGW 104 may be in a same physical entity; a packet data network gateway (PGW) 105 is responsible for charging, lawful interception or more, and the PGW 105 and the SGW 104 may also be in a same physical entity; a policy and charging rules function Entity (PCRF) 106 provides quality of service (QoS) policy and charging rules; a serving general packet radio service (GPRS) support node (SGSN) 108 is a network node equipment providing routing for data transmission in a universal mobile telecommunication system (UMTS); and, a home subscriber server (HSS) 109 is a home subsystem of the UE, and is responsible for protecting user information including the current location of the UE, the address of a serving node, user security information, a packet data context of the UE, or more. The UTRAN in FIG. 1 denotes the evolved universal terrestrial radio access network.

5$^{th}$ generation (5G) of mobile communication technology. Unlike the previous four generations, 5G is not a single wireless technology but a fusion of existing wireless communication technologies. Currently, a peak rate of Long Term Evolution (LTE) can reach 100Mbps, while a peak rate of 5G will reach 10Gbps, which is 100 times higher than 4G. The existing 4G network has limited spontaneous processing capability and cannot support some high-definition video, high-quality voice, augmented reality, virtual reality, and other services. 5G will introduce more advanced technologies to meet the growing demand for mobile service traffic through higher spectrum efficiency, more spectrum resources, and more densely populated areas, so as to solve the problems faced by 4G networks and build a network community with a high-speed transmission rate, a high capacity, a low latency, high reliability, and excellent user experience.

FIG. 2 is an initial system architecture diagram of a next generation network (e.g., 5G), comprising a next generation UE 210, a next generation access network or next generation radio access network (Next Gen (R)AN) 220, a next generation core network (NextGen Core) 230 and a data network 240. A control plane interface between the Next Gen (R)AN and the NextGen Core is NG 2, and a user plane interface is NG3. The names of these interfaces are merely temporary and shall be subject to the names in the 3rd Generation Partnership Project (3GPP). The NextGen Core further comprises a user plane function entity and a control plane function entity.

In evolution of the network, the first phase will continue to use LTE base stations and meanwhile support 5G terminals and use 5G features. Therefore, some 5G base stations will be deployed. These base stations may serve as secondary base stations, and provide data transmission for the UE together with the LTE base stations. There is no signaling connection between the 5G base station and a core network control node (e.g., MME), while there is only a user plane connection between the 5G base station and a core network gateway (e.g., SGW). With this architecture, the LTE base station and the LTE core network may be reused, which is attractive to operators and desired by the operators. Specifically, the LTE base station configures the 5G base station, and uses a dual connectivity technology defined in the LTE system to provide the UE with a transmission technology. The LTE base station serves as a master base station, and the 5G base station serves as a secondary base station.

There may be a plurality of types of bearers for dual connections. As shown in FIG. 3, the bearers for data transmission may be classified as a split bearer, a secondary bearer (i.e., a secondary cell group (SCG) bearer), and a secondary split bearer (i.e., a SCG split bearer). The split bearer means that a master base station receives data from the core network, and then transmits the data to a UE in two branches, one from the master base station to the UE, and the other from a secondary base station to the UE. The SCG bearer means that the secondary base station receives data from the core network, and then transmits the data to the UE. The secondary split bearer means that the secondary base station receives data from the core network, and then splits the data into one part transmitted from the secondary base station to the UE and the other part transmitted from the secondary base station to the master base station and then from the master base station to the UE. The secondary split bearer is a newly introduced bearer type, and a user plane of the secondary split bearer is shown in FIG. 4.

In 5G technology, some technologies that are different from 4th generation (4G) technologies are used. For example, in quality of service (QoS) architecture, 5G defines a new mode. When a protocol data unit (PDU) session is set up, the core network transmits a default QoS policy and/or an authenticated QoS policy to a radio access network (RAN) and the UE. A data connection is a transmission path from the UE to the core network, containing a transmission path between the core network and the base station and a radio bearer between the base station and the UE. The PDU session is a connection between the UE and a packet data network. This connection is used to transmit data units. Generally, the PDU session is set up for a service. A data unit type contains internet protocol (IP) data, Ethernet data and non-IP data. When the PDU session is being set up, the core network transmits the QoS policy to the RAN through an NG interface, and transmits the QoS policy to the UE through a non-access stratum (NAS) interface. The QoS policy contains indication information/description information of a QoS flow, and also contains specific QoS information, such as a data delay target, a data error rate, a data priority, a guaranteed data rate, a maximum data rate, and other information such as application layer information. A default data radio bearer (DRB) is set up by the RAN according to QoS requirements. In addition to the default DRB, other DRBs may be set up by the RAN at the same time. In the user plane, the core network assembles data packets into a QoS flow, and adds QoS indication information to a data header of the QoS flow. According to the QoS indication information, the RAN may find corresponding specific parameters based on the received QoS policy, and performs a corresponding process on the user plane data according to the parameters in the QoS policy, in order to meet the quality requirements. The core network transmits the data packet with the QoS indication information to the RAN, and the RAN maps the QoS flow to resources and radio bearers of the RAN. For example, the RAN determines to map the QoS flow to a certain data bearer DRB, or sets up a new data bearer DRB for the QoS flow. The RAN determines when to set up the new data bearer DRB. The new data bearer DRB may be set up after signaling from the core network is received. Alternatively, when the data of the QoS flow are received, the RAN may learn a specific QoS requirement corresponding to the QoS flow according to the QoS indication information contained in the header of the QoS flow, in conjunction with the default QoS policy and/or the previously authenticated QoS policy saved by the RAN. According to the default QoS policy, if the DRB that is currently set up is suitable for carrying the data of the QoS requirements, the QoS flow should be transmitted via this DRB; otherwise, the RAN may determine to set up a new DRB, and use the new DRB to carry the QoS flow.

In the dual connectivity, both of the master base station and the secondary base station are RAN nodes, the QoS flow may be offloaded from the master base station to the secondary base station using the dual connectivity, or vice versa. If both of the master base station and the secondary base station are responsible for mapping the QoS flow to the DRB, the current dual connectivity process needs to be modified accordingly when the master base station and the secondary base station make different decisions on the mapping relationship.

Moreover, in the foreseeable future, there will be more and more electric appliances to become intelligent and accessories for daily use to be internetworked, all of which have a function of accessing a network. On one hand, some of UEs in the future tend to have the following features: static or lowly mobile; low in cost; and, often small in volume and discontinuous in terms of the received or transmitted data. For these UEs, the signaling overhead generated by establishing a connection and releasing a connection is far higher than the amount of the received or transmitted data. On the other hand, to support more and more real-time applications, for example, virtual reality or more, the access delay for a future mobile communication network is reduced greatly. However, in order to save the signaling overhead, improve the efficiency of data transmission and reduce the time delay for a UE to access to a network, there are still many problems in the existing networks.

The basic principle of the present disclosure consists in that the master base station determines to set up a dual connectivity at the secondary base station, and the master base station notifies the secondary base station of a dual connectivity type and a QoS flow ID to be offloaded. For the SCG split bearer, optionally, the master base station may notify a DRB ID determined by the master base station (i.e., a DRB ID at the master base station corresponding to the QoS flow to be offloaded) and downlink reception tunnel information at the Xn interface which is determined by the master base station to corresponding to the DRB.

The secondary base station determines mapping from the QoS flow to the DRB. If the mapping determined by the secondary base station is the same as that determined by the master base station, the secondary base station uses a downlink reception tunnel at the Xn interface which is determined by the master base station for the old DRB, transmits the offloaded data to the tunnel, and then the data are transmitted by the master base station to the UE. If the mapping determined by the secondary base station is different from that determined by the master base station, the secondary base station notifies the master base station of an ID of a new DRB. Optionally, the secondary base station may indicate downlink reception tunnel information at the Xn interface corresponding to the new DRB.

The master base station assigns a downlink reception tunnel at the corresponding Xn interface for the new DRB, according to the ID of the new DRB transmitted from the secondary base station; and notifies the secondary base station of the downlink reception tunnel at the Xn interface.

Hereinafter, a method for dual connectivity setup according to an exemplary embodiment of the present disclosure will be described with reference to FIG. 5. The method may be performed at a master base station.

FIG. 5 schematically shows a flowchart of a method 500 for dual connectivity setup performed at a master base station according to an exemplary embodiment of the present disclosure. As shown in FIG. 5, the method 500 may include steps S501 and S502.

In Step S501, the master base station transmits a secondary base station setup request message to a secondary base station for requesting a DRB to be set up at the secondary base station. The secondary base station setup request message may include one or more of the following information (for example, detail can refer to the third exemplary embodiment, that will be described later with reference to FIG. 9): a type of a dual connectivity bearer; QoS flow ID information; an ID of a PDU session to which the QoS flow belongs; a quality requirement parameter corresponding to the QoS flow; an uplink data reception address; and an RRC transparent container.

In an exemplary embodiment, the secondary base station setup request message may further include:

a downlink data reception address assigned by the master base station for receiving downlink data from the secondary base station, ID(s) of a DRB corresponding to a QoS flow which is set up at the secondary base station (for example, detail can refer to the first exemplary embodiment, that will be described later with reference to FIG. 7); or a downlink data reception address assigned by the master base station for receiving downlink data from the secondary base station (for example, detail can refer to the second exemplary embodiment, that will be described later with reference to FIG. 8).

The secondary base station can allocate an ID for a DRB. The ID(s) of the DRB(s) is managed and assigned by the master base station in a unified manner. In the secondary base station setup request message, the master base station notifies the secondary base station of the available DRB ID(s). If the secondary base station determines to set up a new DRB, it needs to select one ID from the available DRB ID(s) as the ID to a newly setup DRB. Alternatively, an available range of DRB IDs of the secondary base station and the master base station may be pre-configured, and the master base station or the secondary base station may select, from the available range, a DRB ID for a DRB.

In Step S502, the master base station may receive a secondary base station setup response message from the secondary base station, and the secondary base station setup response message includes mapping information from a QoS flow to a DRB.

In the second exemplary embodiment that will be described later with reference to FIG. 8, the secondary base station setup response message may further include: a downlink data reception address of the DRB at the Xn interface, which is one of downlink data reception addresses corresponding to the QoS flow mapped to the DRB.

In the first and the third exemplary embodiments that will be described later with reference to FIGS. 7 and 9 respectively, the method 500 may further include: transmitting, by the master base station, at least one of the following information to the secondary base station according to the received secondary base station setup response message: an ID of a DRB determined by the secondary base station; and tunnel information assigned by the master base station for the said DRB.

The information may be carried in a separate message (e.g., Signaling 703 or 903 which will be described later) to be transmitted to the secondary base station, and may also be carried in a secondary base station reconfiguration completion message (e.g., Signaling 706 or 906 which will be described later) transmitted to the secondary base station.

Correspondingly, a method for dual connectivity setup according to an exemplary embodiment of the present disclosure will be described with reference to FIG. 6. The method may be performed at a secondary base station.

FIG. 6 schematically shows a flowchart of a method 600 for dual connectivity setup performed at a secondary base station according to an exemplary embodiment of the present disclosure. As shown in FIG. 6, the method 600 may include steps S601 and S602.

In Step S601, the secondary base station may receive a secondary base station setup request message from a master base station for requesting a DRB to be set up at the secondary base station. The secondary base station setup request message may include one or more of the following information (for example, the third exemplary embodiment that will be described later with reference to FIG. 9): a type of a dual connectivity bearer; QoS flow ID information; an ID of a PDU session to which the QoS flow belongs; a quality requirement parameter corresponding to the QoS flow; an uplink data reception address; and an RRC transparent container.

In an exemplary embodiment, the secondary base station setup request message may further include:

a downlink data reception address assigned by the master base station for receiving downlink data from the secondary base station, an ID of a DRB corresponding to a QoS flow which is set up at the secondary base station (for example, the first exemplary embodiment that will be described later with reference to FIG. 7); or a downlink data reception address assigned by the master base station for receiving downlink data from the secondary base station (for example, the second exemplary embodiment that will be described later with reference to FIG. 8).

The secondary base station can allocate an ID for a DRB. The ID(s) of the DRB(s) is managed and assigned by the master base station in a unified manner. In the secondary base station setup request message, the master base station notifies the secondary base station of the available DRB ID(s). If the secondary base station determines to set up a new DRB, it needs to select one ID from the available DRB ID(s) as an ID to a newly setup DRB. Alternatively, an available range of DRB IDs of the secondary base station and the master base station may be pre-configured, and the master base station or the secondary base station may select, from the available range, a DRB ID for a DRB.

In Step S602, the secondary base station may transmit a secondary base station setup response message to the master base station, and the secondary base station setup response message includes mapping information from a QoS flow to a DRB.

In the second exemplary embodiment that will be described later with reference to FIG. 8, the secondary base station setup response message may further include: a downlink data reception address of the DRB at the Xn interface, which is one of downlink data reception addresses corresponding to the QoS flow mapped to the DRB.

In the first and the third exemplary embodiments that will be described later with reference to FIGS. 7 and 9 respectively, the method 600 may further include: receiving, by the secondary base station, at least one of the following information transmitted by the master base station according to the secondary base station setup response message: an ID of a DRB determined by the secondary base station; and tunnel information assigned by the master base station for the DRB.

The information may be carried in a separate messages (e.g., Signaling 703 or 903 which will be described later) transmitted from the master base station to the secondary base station, and may also be carried in a secondary base station reconfiguration completion message (e.g., Signaling 706 or 906 which will be described later) transmitted from the master base station to the secondary base station.

Hereinafter, signaling flow diagrams for dual connectivity setup according to the first, second and third exemplary embodiments of the present disclosure will be respectively described in detail in conjunction with FIGS. 7, 8 and 9.

The first exemplary embodiment describes that the master base station notifies the secondary base station of information of QoS flows to be offloaded, a DRB ID (referred to as an old DRB ID) to which these QoS flows are mapped, and downlink data reception tunnel information at the Xn interface corresponding to the DRB, and the secondary base station determines mapping from QoS flow to DRB, and notifies the master base station of the new DRB ID. If the new DRB ID is different from the old DRB ID, the master base station assigns a downlink data reception tunnel at the Xn interface for the new DRB ID, and transmits the tunnel information to the secondary base station. The tunnel information contains an IP address and a tunnel number, that is, tunnel endpoint identifier (TEID).

FIG. 7 schematically shows a signaling flow diagram for dual connectivity setup according to a first exemplary embodiment of the present disclosure. Referring to FIG. 7, the signaling flow of the first exemplary embodiment may include:

Signaling 701, in which the master base station transmits a secondary base station setup request to the secondary base station.

The master base station/secondary base station may be an LTE base station or a 5G base station gNB. It is assumed that both the master base station and the secondary base station are connected to the 5G core network. Both the LTE base station and the 5G base station belong to devices of the 5G access network.

The master base station determines to set up some QoS flows on the secondary base station. These QoS flows may be previously set up on a source secondary base station, or on the master base station, or are new data bearers configured by the core network. The secondary base station setup request message contains an ID of a QoS flow, a transport layer address and a tunnel number TEID of a PDU session where the QoS flow is belonging to for receiving downlink data in the core network,. The message also carries capability information of the UE. The message also carries a type of dual connectivity bearer determined by the master base station. The type of dual connectivity bearer set up on the secondary base station may be a split bearer, a SCG bearer, or a secondary split bearer, a MCG split signaling or similar information.

Specifically, the secondary base station setup request message carries one or more of the following information:

A type of a dual connectivity bearer, which may be set as a split bearer type, a SCG bearer type, or a SCG split bearer type.

QoS flow ID information, which may be e.g. an ID of a QoS flow to be set up on the secondary base station. The master base station intends to indicate which QoS flows may be set up on the secondary base station in a case of the above-mentioned types of bearers. The QoS flow ID is transmitted from the core network to the master base station. The core network transmits the QoS flow ID and quality requirements corresponding to the QoS flow ID to the master base station through an initial context setup procedure, or an initial context modification procedure, or a data connection procedure.

An ID of a PDU Session (a PDU Session ID) to which the QoS flow belongs.

A quality requirement parameter of the QoS flow. The information indicates the quality requirements corresponding to the QoS flow, which may contain standard 5G quality requirement indicator 5QI, a priority ARP, a maximum uplink/downlink rate of a GBR service, and an uplink/downlink guaranteed rate of the GBR service. Or, it may be a specific parameter containing the quality requirements, such as a resource type, a priority level, a data delay target, an error rate, etc. The QoS flow ID and the corresponding quality requirement parameter are transmitted from the core network to the master base station. The master base station may transmit the value sent from the core network to the secondary base station directly, or may determine, according to the value sent from the core network, a new value to be transmitted to the secondary base station.

A DRB ID. The DRB ID is an ID of a DRB corresponding to the QoS flow going to be set up on the secondary base station as said above. The secondary base station can learn, from the QoS flow ID and the DRB ID, which QoS flows are mapped to the same DRB on the master base station.

An uplink data reception address. If it is a split bearer, the uplink data reception address is a transport layer address and a tunnel ID (i.e., GTP TEID) for uplink data reception which are assigned by the master base station. If it is an SCG bearer or an SCG split bearer, the uplink data reception address is a transport layer address and a tunnel ID for uplink data reception which are assigned by the core network.

A downlink data reception address. If it is a SCG split bearer, the message also carries a transport layer address and a tunnel ID for downlink data reception. The downlink data reception address is an address assigned by the master base station for receiving downlink data from the secondary base station. The master base station assigns each DRB with a downlink data reception address of the Xn interface.

An RRC transparent container, in which a measurement report of the UE may be contained. An ID of the MCG split SRB and/or corresponding configuration information of RLC and MAC layers, etc., may also be contained in the RRC transparent container.

ID(s) of the DRB(s) that the secondary base station may use. The ID(s) of the DRB(s) is managed and assigned by the master base station in a unified manner. In the secondary base station setup request message, the master base station notifies the secondary base station of the available DRB ID(s). If the secondary base station determines to set up a new DRB, it needs to select one from the available DRB ID(s) as an ID of a newly setup DRB. Alternatively, an available range of DRB IDs of the secondary base station and the master base station may be pre-configured, and the master base station or the secondary base station may select, from the available range, a DRB ID for a DRB. The information may also be contained in the RRC transparent container.

A <Table 1> below describes content contained in the secondary base station setup request message when the set up bearer is a SCG split bearer.

TABLE 1

Secondary Base Station Setup Request Message
Contains Information As Follows:

Data Bearer Type
    SCG Bearer Type
PDU Session ID
QoS flow Info
    QoS flow ID
    QoS Info
DRB ID
Uplink Data Reception Address
Downlink Data Reception Address
. . .

Signaling 702, in which the secondary base station transmits a secondary base station setup response message to the master base station.

The secondary base station setup response message contains one or more of information as follows:

An ID of a QoS flow accepted by the secondary base station. For the QoS flow that the master base station determines to offload to the secondary base station, the secondary base station may determine to accept some QoS flows, and reject some QoS flows. In the secondary base station setup response message, the secondary base station notifies the master base station which QoS flows are accepted and which QoS flows are rejected.

An ID of a DRB set up by the secondary base station. The secondary base station setup response message also needs to carry the DRB ID corresponding to the QoS flow. If in the secondary base station setup request message, the master base station determines that the type of the dual connectivity to be set up is a SCG split bearer, the master base station determines which QoS flows need to be offloaded to the secondary base station and determines the type of the setup bearer, and the secondary base station may determine the mapping from QoS flows to DRBs. If the offloaded QoS flows were previously set up on the master base station, the master base station receives the QoS flow data from the core network and transmits the data to the UE through the DRB on the master base station, the master base station determines the mapping from the QoS flows to DRBs. Then, the master base station decides to offload these QoS flows to the secondary base station. For the SCG split bearer, the secondary base station may determine the mapping from QoS flow to DRB, the secondary base station receives the QoS flow data from the core network, maps the data to the DRB, and then splits the data into two parts, one part of the data being transmitted by the secondary base station to the UE, and the other part of the data being transmitted by the secondary base station to the master base station and then transmitted by the master base station to the UE. The mapping determined by the secondary base station may be different from that determined by the master base station. On the Xn interface, for the SCG split bearer, one part of data is transmitted by the master base station to the UE. Therefore, the master base station needs to assign the data with an Xn downlink data reception tunnel number. The tunnel number is for one DRB, and the secondary base station needs to notify the master base station of the mapping from QoS flow to DRB determined by itself. The secondary base station notifies the master base station of the mapping relationship through the DRB ID and the QoS flow ID carried in the secondary base station setup response message.

An RRC transparent container, in which configuration information of the secondary base station for the UE may be contained. The master base station forwards the RRC transparent container to the UE in Signaling 704.

Signaling 703, in which the master base station transmits a modification message to the secondary base station.

The modification message contains one or more of information as follows:

An ID of a DRB, which is a DRB ID determined by the secondary base station, and is transmitted to the master base station over Signaling 702.

Tunnel information, which is tunnel information assigned by the master base station for the said DRB. The tunnel information contains an IP address and a tunnel number TEID. On the Xn interface, for the SCG split bearer, the master base station needs to assign an Xn downlink data reception tunnel number for the data from the secondary base station. The tunnel number is for a DRB determined by the secondary base station.

Alternatively, the above two pieces of information may be carried by the secondary base station reconfiguration complete message by Signaling 706, and transmitted by the master base station to the secondary base station. In this way, the message in Signaling 703 is not needed. An advantage of defining the message of Signaling 703 consists in that the data may be transmitted from the secondary base station to the master base station as soon as possible so as to be transmitted to the UE.

Signaling 704, in which the master base station transmits an RRC configuration request message to the UE.

The master base station does not parse the RRC container transmitted from the secondary base station, but forwards the RRC container to the UE. The master base station may add its own configuration information for the UE and transmit it together with the configuration information of the secondary base station to the UE.

Signaling 705, in which the UE transmits an RRC configuration complete message to the master base station.

After the UE is configured successfully, it transmits a response message to the master base station. The response message may include a response to the configuration information of the master base station and also a response to the configuration information of the secondary base station. If necessary, the UE also needs to perform a random access procedure with the new secondary base station, and synchronize with the new secondary base station. After synchronization, the secondary base station may start transmitting data to the UE.

Signaling 706, in which the master base station transmits a secondary base station reconfiguration complete message to the secondary base station.

The master base station notifies the secondary base station that configuration at the UE side has been successful. Because the UE transmits an acknowledgment message to the master base station, the master base station needs to forward the acknowledgment message to the secondary base station. If the master base station cannot parse the response of the UE to the configuration information of the secondary base station, the master base station may forward the response of the UE to the configuration information of the secondary base station to the secondary base station in a form of an RRC container.

If there is no message from Signaling 603, the secondary base station reconfiguration complete message may also contain the following information:

An ID of a DRB, which is a DRB ID determined by the secondary base station, and is transmitted to the master base station over Signaling 702.

Tunnel information, which is tunnel information assigned by the master base station for the DRB. The tunnel information contains an IP address and a tunnel number TEID. On the Xn interface, for the SCG split bearer, the master base station needs to assign an Xn downlink data reception tunnel number for the data. The tunnel number is for a DRB determined by the secondary base station.

The second exemplary embodiment describes that the master base station notifies the secondary base station of information of QoS flows to be offloaded, and downlink data reception tunnel information at the Xn interface corresponding to the QoS flows; and the secondary base station determines mapping from QoS flow to DRB, and transmits, to the master base station, a new DRB ID and downlink data reception tunnel information at the Xn interface corresponding to the new DRB ID. The tunnel information contains an IP address and a tunnel number TEID.

FIG. 8 schematically shows a signaling flow diagram for dual connectivity setup according to a second exemplary embodiment of the present disclosure. Referring to FIG. 8, the signaling flow of the second exemplary embodiment may include:

Signaling 801, in which the master base station transmits a secondary base station setup request, which is transmitted to the secondary base station.

The master base station/secondary base station may be an LTE base station or a 5G base station gNB. It is assumed that both the master base station and the secondary base station are connected to the 5G core network. Both the LTE base station and the 5G base station belong to devices of the 5G access network.

The master base station determines to set up some QoS flows on the secondary base station. These QoS flows may be previously set up on a source secondary base station, or on the master base station, or are new data bearers configured by the core network. The secondary base station setup request message contains an ID of a QoS flow, a transport layer address and a tunnel number TEID of a PDU session where the QoS flow is belonging to for receiving downlink data in the core network,. The message also carries capability information of the UE. The message also carries a type of connection determined by the master base station. The type of dual connectivity set up on the secondary base station may be a split bearer, a SCG bearer, or a secondary split bearer, a MCG split signaling.

Specifically, the secondary base station setup request message carries one or more of the following information:

A type of a dual connectivity bearer, which may be set as a split bearer type, a SCG bearer type, or a SCG split bearer type.

QoS flow ID information, which may be e.g. an ID of a QoS flow to be set up on the secondary base station. The master base station intends to indicate which QoS flows may be set up on the secondary base station in a case of the above-mentioned types of bearers. The QoS flow ID is transmitted from the core network to the master base station. The core network transmits the QoS flow ID and quality requirements corresponding to the QoS flow ID to the master base station through an initial context setup procedure, or an initial context modification procedure, or a data connection procedure.

An ID of a PDU Session (a PDU Session ID) to which the QoS flow belongs.

A quality requirement parameter of the QoS flow. The information is the quality requirements corresponding to the QoS flow, which may contain standard 5G quality requirement indicator 5QI, a priority ARP, a maximum uplink/downlink rate of a GBR service, and an uplink/downlink guaranteed rate of the GBR service. Or, it may be a specific parameter containing the quality requirements, such as a resource type, a priority level, a data delay target, an error rate, etc. The QoS flow ID and the corresponding quality requirement parameter are transmitted from the core network to the master base station. The master base station may transmit the value sent from the core network to the secondary base station directly, or may determine, according to the value sent from the core network, a new value to be transmitted to the secondary base station.

An uplink data reception address. If it is a split bearer, the uplink data reception address is a transport layer address and a tunnel ID (i.e., GTP TEID) for uplink data reception which are assigned by the master base station. If it is an SCG bearer or a SCG split bearer, the uplink data reception address is a transport layer address and a tunnel ID for uplink data reception which are assigned by the core network.

A downlink data reception address. If it is a SCG split bearer, the message also carries a transport layer address and a tunnel ID for downlink data reception. The downlink data reception address is an address assigned by the master base station for receiving downlink data from the secondary base station. The master base station assigns each DRB with a downlink data reception address of the Xn interface. Alternatively, the master base station assigns a plurality of downlink data reception addresses, and carries a list of downlink data reception addresses in the message to the secondary base station. If the secondary base station determines to use different mapping, a new DRB is set up, and the secondary base station selects a downlink data reception address from the list as a downlink data reception address of the Xn interface of the SCG split, and transmits the downlink data to this address.

An RRC transparent container, in which a measurement report of the UE may be contained. An ID of the MCG split SRB and/or corresponding configuration information of RLC and MAC layers, etc., may also be contained in the RRC transparent container.

ID(s) of the DRB(s) that the secondary base station may use. The ID(s) of the DRB(s) is managed and assigned by the master base station in a unified manner. In the secondary base station setup request message, the master base station notifies the secondary base station of the available DRB ID(s). If the secondary base station determines to set up a new DRB, it needs to select one from the available DRB ID(s) as an ID of a newly setup DRB. The information may also be contained in the RRC transparent container.

<Table 2> below describes content contained in the secondary base station setup request message when the set up bearer is a SCG split bearer.

TABLE 2

| Secondary Base Station Setup Request Message Contains Information As Follows: |
| --- |
| Data Bearer Type |
|    SCG Bearer Type |
|    PDU Session ID |
|    QoS flow Info |
|       QoS flow ID |
|       Quality Requirement |
|       Xn Downlink Data Reception Address |
|    Uplink Data Reception Address |
| . . . |

Signaling 802, in which the secondary base station transmits a secondary base station setup response message to the master base station.

The secondary base station setup response message contains one or more of information as follows:

An ID of a QoS flow accepted by the secondary base station. For the QoS flow that the master base station determines to offload to the secondary base station, the secondary base station may determine to accept some QoS flows, and reject some QoS flows. In the secondary base station setup response message, the secondary base station notifies the master base station which QoS flows are accepted and which QoS flows are rejected.

An ID of a DRB set up by the secondary base station. The secondary base station setup response message also needs to carry the DRB ID corresponding to the QoS flow. If in the secondary base station setup request message, the master base station determines that the type of the dual connectivity to be set up is a SCG split bearer, the master base station determines which QoS flows need to be offloaded to the secondary base station and determines the type of the setup bearer, and the secondary base station may determine the mapping from QoS flows to DRBs. If the offloaded QoS flows were previously set up on the master base station, the master base station receives the QoS flow data from the core network and transmits the data to the UE through the DRB on the master base station, the master base station determines the mapping from the QoS flows to DRBs. Then, the master base station decides to offload these QoS flows to the secondary base station. For the SCG split bearer, the secondary base station may determine the mapping from QoS flow to DRB, the secondary base station receives the QoS flow data from the core network, maps the data to the DRB, and then splits the data into two parts, one part of the data being transmitted by the secondary base station to the UE, and the other part of the data being transmitted by the secondary base station to the master base station and then being transmitted by the master base station to the UE. The mapping determined by the secondary base station may be different from that determined by the master base station. On the Xn interface, for the SCG split bearer, one part of data is transmitted by the master base station to the UE. Therefore, the master base station needs to assign the data with an Xn downlink data reception tunnel number. The tunnel number is for one DRB, and the secondary base station needs to notify the master base station of the mapping from QoS flow to DRB determined by itself. The secondary base station notifies the master base station of the mapping relationship through the DRB ID and the QoS flow ID carried in the secondary base station setup response message.

An Xn downlink data reception address. A plurality of QoS flows may be mapped to one DRB. The mapping relationship is determined by the secondary base station. One downlink data reception address on the Xn interface is corresponding to each DRB. The address is an address allocated by the master base station, and the secondary base station transmits data to this address. The message in Step S801 includes a downlink data reception address assigned by the master base station for each of the offloaded QoS flows. The secondary base station determines the mapping from QoS flow to DRB, and selects one from the downlink data reception addresses assigned by master base station as a downlink data reception address of the DRB on the Xn interface.

An RRC transparent container, in which configuration information of the secondary base station for the UE may be contained. The master base station forwards the RRC transparent container to the UE in Signaling 804.

Signaling 803, in which the master base station transmits an RRC configuration request message to the UE.

The master base station does not parse the RRC container transmitted from the secondary base station, but forwards the RRC container to the UE. The master base station may add its own configuration information for the UE and transmit it together with the configuration information of the secondary base station to the UE.

Signaling 804, in which the UE transmits an RRC configuration complete message to the master base station.

After the UE is configured successfully, it transmits a response message to the master base station. The response message may include a response to the configuration information of the master base station and also a response to the configuration information of the secondary base station. If necessary, the UE also needs to perform a random access procedure with the new secondary base station, and synchronize with the new secondary base station. After synchronization, the secondary base station may start transmitting data to the UE.

Signaling 805, in which the master base station transmits a secondary base station reconfiguration complete message to the secondary base station.

The master base station notifies the secondary base station that configuration at the UE side has been successful. Because the UE transmits an acknowledgment message to the master base station, the master base station needs to forward the acknowledgment message to the secondary base station. If the master base station cannot parse the response of the UE to the configuration information of the secondary base station, the master base station may forward the response of the UE to the configuration information of the secondary base station to the secondary base station in a form of an RRC container.

The third exemplary embodiment describes that the master base station notifies information of QoS flows to be offloaded, and the secondary base station determines mapping from QoS flow to DRB, and transmits, to the master base station, a new DRB ID.

FIG. 9 schematically shows a signaling flow diagram for dual connectivity setup according to a third exemplary embodiment of the present disclosure. Referring to FIG. 9, the signaling flow of the third exemplary embodiment may include:

Signaling 901, in which the master base station transmits a secondary base station setup request, which is transmitted to the secondary base station.

The master base station/secondary base station may be an LTE base station or a 5G base station gNB. It is assumed that both the master base station and the secondary base station are connected to the 5G core network. Both the LTE base station and the 5G base station belong to devices of the 5G access network.

The master base station determines to set up some QoS flows on the secondary base station. These QoS flows may be previously set up on a source secondary base station, or on the master base station, or are new data bearers configured by the core network. The secondary base station setup request message contains an ID of a QoS flow, a transport layer address and a tunnel number TEID of a PDU session where the QoS flow is located for receiving downlink data in the core network,. The message also carries capability information of the UE. The message also carries a type of connection determined by the master base station. The type of dual connectivity set up on the secondary base station may be a split bearer, a SCG bearer, or a secondary split bearer, a MCG split signaling.

Specifically, the secondary base station setup request message carries one or more of the following information:

A type of a dual connectivity bearer, which may be set as a split bearer type, a SCG bearer type, or a SCG split bearer type.

QoS flow ID information, which may be e.g. an ID of a QoS flow to be set up on the secondary base station. The master base station intends to indicate which QoS flows may be set up on the secondary base station in a case of the above-mentioned types of bearers. The QoS flow ID is transmitted from the core network to the master base station. The core network transmits the QoS flow ID and quality requirements corresponding to the QoS flow ID to the master base station through an initial context setup procedure, or an initial context modification procedure, or a data connection procedure.

An ID of a PDU Session (a PDU Session ID) to which the QoS flow belongs.

A quality requirement parameter of the QoS flow. The information is the quality requirements corresponding to the QoS flow, which may contain standard 5G quality requirement indicator 5QI, a priority ARP, a maximum uplink/downlink rate of a GBR service, and an uplink/downlink guaranteed rate of the GBR service. Or, it may be a specific parameter containing the quality requirements, such as a resource type, a priority level, a data delay target, an error rate etc. The QoS flow ID and the corresponding quality requirement parameter are transmitted from the core network to the master base station. The master base station may transmit the value sent from the core network to the secondary base station directly, or may determine, according to the value sent from the core network, a new value to be transmitted to the secondary base station.

An uplink data reception address. If it is a split bearer, the uplink data reception address is a transport layer address and a tunnel ID (i.e., GTP TEID) for uplink data reception which are assigned by the master base station. If it is an SCG bearer or a SCG split bearer, the uplink data reception address is a transport layer address and a tunnel ID for uplink data reception which are assigned by the core network.

An RRC transparent container, in which a measurement report of the UE may be contained. An ID of the MCG split SRB and/or corresponding configuration information of RLC and MAC layers etc. may also be contained in the RRC transparent container.

ID(s) of the DRB(s) that the secondary base station may use. The ID(s) of the DRB(s) is managed and assigned by the master base station in a unified manner. In the secondary base station setup request message, the master base station notifies the secondary base station of the available DRB ID(s). If the secondary base station determines to set up a new DRB, it needs to select one from the available DRB ID(s) as an ID of a newly setup DRB. The information may also be contained in the RRC transparent container. Alternatively, an available range of DRB IDs of the secondary base station and the master base station may be pre-configured, and the master base station or the secondary base station may select, from the available range, a DRB ID for a DRB. The information may also be contained in the RRC transparent container.

<Table 3> below describes content contained in the secondary base station setup request message when the set up bearer is a SCG split bearer.

TABLE 3

Secondary Base Station Setup Request Message
Contains Information As Follows:

Data Bearer Type
   SCG Bearer Type
   PDU Session ID
   QoS flow Info
      QoS flow ID
      Quality Info
   DRB ID
   Uplink Data Reception Address
. . .

Signaling 902, in which the secondary base station transmits a secondary base station setup response message to the master base station.

The secondary base station setup response message contains one or more of information as follows:

An ID of a QoS flow accepted by the secondary base station. For the QoS flow that the master base station determines to offload to the secondary base station, the secondary base station may determine to accept some QoS flows, and reject some QoS flows. In the secondary base station setup response message, the secondary base station notifies the master base station which QoS flows are accepted and which QoS flows are rejected.

An ID of a DRB set up by the secondary base station. The secondary base station setup response message also needs to carry the DRB ID corresponding to the QoS flow. If in the secondary base station setup request message, the master base station determines that the type of the dual connectivity to be set up is a SCG split bearer, the master base station determines which QoS flows need to be offloaded to the secondary base station and determines the type of the setup bearer, and the secondary base station may determine the mapping from QoS flows to DRBs. If the offloaded QoS flows were previously set up on the master base station, the master base station receives the QoS flow data from the core network and transmits the data to the UE through the DRB on the master base station, the master base station determines the mapping from the QoS flows to DRBs. Then, the master base station decides to offload these QoS flows to the secondary base station. For the SCG split bearer, the secondary base station may determine the mapping from QoS flow to DRB, the secondary base station receives the QoS flow data from the core network, maps the data to the DRB, and then splits the data into two parts, one part of the data being transmitted by the secondary base station to the UE, and the other part of the data being transmitted by the secondary base station to the master base station and then being transmitted by the master base station to the UE. The mapping determined by the secondary base station may be different from that determined by the master base station. On the Xn interface, for the SCG split bearer, one part of data is transmitted by the master base station to the UE. Therefore, the master base station needs to assign the data with an Xn downlink data reception tunnel number. The tunnel number is for one DRB, and the secondary base station needs to notify the master base station of the mapping from QoS flow to DRB determined by itself. The secondary base station notifies the master base station of the mapping relationship through the DRB ID and the QoS flow ID carried in the secondary base station setup response message.

An RRC transparent container, in which configuration information of the secondary base station for the UE may be contained. The master base station forwards the RRC transparent container to the UE in Signaling 904.

Signaling 903, in which the master base station transmits a modification message to the secondary base station.

The modification message contains one or more of information as follows:

An ID of a DRB, which is a DRB ID determined by the secondary base station, and is transmitted to the master base station in Step S402.

Tunnel information, which is tunnel information assigned by the master base station for the said DRB. The tunnel information contains an IP address and a tunnel number TEID. On the Xn interface, for the SCG split bearer, the master base station needs to assign an Xn downlink data reception tunnel number for the data from secondary base station. The tunnel number is for a DRB determined by the secondary base station.

Alternatively, the above two pieces of information may be carried by the secondary base station reconfiguration complete message by Signaling 906, and transmitted by the master base station to the secondary base station. In this way, the message in Signaling 903 is not needed. An advantage of defining the message of Signaling 903 consists in that the data may be transmitted from the secondary base station to the master base station as soon as possible so as to be transmitted to the UE.

Signaling 904, in which the master base station transmits an RRC configuration request message to the UE.

The master base station does not parse the RRC container transmitted from the secondary base station, but forwards the RRC container to the UE. The master base station may add its own configuration information for the UE and transmit it together with the configuration information of the secondary base station to the UE.

Signaling 905, in which the UE transmits an RRC configuration complete message to the master base station.

After the UE is configured successfully, it transmits a response message to the master base station. The response message may include a response to the configuration information of the master base station and also a response to the configuration information of the secondary base station. If necessary, the UE also needs to perform a random access procedure with the new secondary base station, and synchronize with the new secondary base station. After synchronization, the secondary base station may start transmitting data to the UE.

Signaling 906, in which the master base station transmits a secondary base station reconfiguration complete message to the secondary base station.

The master base station notifies the secondary base station that configuration at the UE side has been successful. Because the UE transmits an acknowledgment message to the master base station, the master base station needs to forward the acknowledgment message to the secondary base station. If the master base station cannot parse the response of the UE to the configuration information of the secondary base station, the master base station may forward the response of the UE to the configuration information of the secondary base station to the secondary base station in a form of an RRC container.

If there is no message from Signaling 903, the secondary base station reconfiguration complete message may also contain the following information:

An ID of a DRB, which is a DRB ID determined by the secondary base station, and is transmitted to the master base station over Signaling 902.

Tunnel information, which is tunnel information assigned by the master base station for the DRB. The tunnel information contains an IP address and a tunnel number TEID. On the Xn interface, for the SCG split bearer, the master base station needs to assign an Xn downlink data reception tunnel number for the data from the secondary base station. The tunnel number is for a DRB determined by the secondary base station.

Hereinafter, a method of requesting a SCG configuration according to an exemplary embodiment of the present disclosure will be described with reference to FIG. 10. The method may be performed at a master base station.

FIG. 10 schematically shows a flowchart of a method 1000 of requesting a SCG configuration performed at a master base station according to an exemplary embodiment of the present disclosure. As shown in FIG. 10, the method 1000 may include steps S1001 and S1002.

In step S1001, the master base station may transmit a secondary base station modification request message for requesting SCG configuration information to the secondary base station. The secondary base station modification request message carries indication information for indicating that the master base station needs to obtain SCG configuration information.

In step S1002, the master base station may receive a secondary base station modification response message transmitted by the secondary base station, and the secondary base station modification response message carries the SCG configuration information.

Hereinafter, a method of requesting a SCG configuration according to an exemplary embodiment of the present disclosure will be described with reference to FIG. 11. The method may be performed at a secondary base station.

FIG. 11 schematically shows a flowchart of a method of requesting a SCG configuration performed at a secondary base station according to an exemplary embodiment of the present disclosure. As shown in FIG. 10, the method 1000 may include steps S1101 and S1102.

In step S1101, the secondary base station may receive, from the master base station, a secondary base station modification request message for requesting SCG configuration information, the secondary base station modification request message carrying indication information for indicating that the master base station needs to obtain SCG configuration information.

In step S1102, the secondary base station may transmit a secondary base station modification response message to the master base station, the secondary base station modification response message carrying the SCG configuration information.

After receiving the indication information, the secondary base station may ignore the RRC transparent container carried in the secondary base station modification request message.

Hereinafter, a signaling flow of requesting a SCG configuration according to an exemplary embodiment of the present disclosure will be described in detail with reference to FIG. 12.

The exemplary embodiment describes a method of requesting SCG configuration by a master base station. The master base station determines to perform handover of a secondary base station, and has the UE handed over from a source secondary base station to a destination secondary base station. Before the handover, the master base station needs to obtain the latest SCG configuration information from the secondary base station. Steps of the messages are described in FIG. 12. FIG. 12 schematically shows a signaling flow diagram of requesting a SCG configuration according to an exemplary embodiment of the present disclosure.

In Signaling 1201, the master base station transmits a secondary base station modification request message to the secondary base station.

The message carries an ID 'XnAP ID' on the Xn interface assigned by the master base station to the UE.

The message carries an ID 'XnAP ID' on the Xn interface assigned by the secondary base station to the UE.

The message may carry an RRC transparent container. The transparent container contains MCG configuration information and UE capability configuration information. Normally, if the RRC transparent container is included in the message, the secondary base station needs to parse the RRC transparent container, and the secondary base station may modify SCG configuration information according to the content included in the RRC transparent container.

The secondary base station modification request message further carries indication information which indicates that the master base station needs to obtain the latest SCG configuration information on the secondary base station. If the secondary base station modification request message includes the RRC transparent container, the indication information also indicates that the secondary base station needs to ignore the RRC transparent container carried in the secondary base station modification request message. The indication information may carry a single information element, e.g., defining a "Required to Obtain SCG Configuration Information Indication" or an "Action Indication", in the message, wherein the Action Indication is used for indicating a purpose for the master base station to initiate the secondary base station modification request message, and in this embodiment, the Action Indication may be set as for a purpose of obtaining SCG configuration information. Or, a particular reason may be indicated by an information element "Cause" existing in the secondary base station modification request message, i.e., because SCG configuration information is to be obtained. The secondary base station receives the indication information, and needs to transmit the latest SCG configuration information on the secondary base station to the master base station. Alternatively, if the secondary base station modification request message includes the RRC transparent container, the secondary base station needs to ignore the RRC transparent container contained in the secondary base station modification request message.

In Signaling 1202: The secondary base station transmits a secondary base station modification response message to the master base station.

The message carries an ID 'XnAP ID' on the Xn interface assigned by the master base station to the UE.

The message carries an ID 'XnAP ID' on the Xn interface assigned by the secondary base station to the UE.

If the message in Signaling 1201 carries the indication information indicating that the master base station needs to obtain the latest SCG configuration information on the secondary base station, the message in Signaling 1202 carries the RRC transparent container. The latest SCG configuration information is contained in the RRC transparent container. The SCG configuration information may be configuration information of a complete SCG for the UE. If the message in Signaling 1201 carries the RRC transparent container and the indication information indicating that the master base station needs to obtain the latest SCG configuration information on the secondary base station, the secondary base station ignores the RRC transparent container contained in the secondary base station modification request message.

In Signaling 1203, the master base station transmits a secondary base station setup request message to the destination secondary base station. The message carries the SCG configuration information obtained in Signaling 1102 from the source secondary base station.

In Signaling 1204, the destination secondary base station transmits a secondary base station setup response message to the master base station. The message carries the SCG configuration information of the destination secondary base station for the UE. The configuration information refers to the SCG configuration information of the source secondary base station for the UE carried in the message of Signaling 1203. The destination secondary base station generates the latest SCG configuration information, and transmits the information to the UE through the master base station.

In Signaling 1205, the master base station transmits a secondary base station release request to the source secondary base station. The source secondary base station deletes context of the UE.

In Signaling 1206, the master base station transmits a secondary base station reconfiguration complete message to the secondary base station. The secondary base station may start transmitting data.

Hereinafter, a structure of a master base station according to an exemplary embodiment of the present disclosure will be described with reference to FIG. 13. FIG. 13 schematically shows a structural block diagram of a master base station for performing a method for dual connectivity setup according to an exemplary embodiment of the present disclosure. The master base station 1300 may be used to perform the method 500 described with reference to FIG. 5 or the method 1000 described with reference to FIG. 10. For the sake of brevity, only a schematic structure of the master base station according to the exemplary embodiment of the present disclosure will be described herein, and details which have been described previously in the method 500 with reference to FIG. 5 or in the method 1000 described with reference to FIG. 10 will thus be omitted.

As shown in FIG. 13, the master base station 1300 includes a communication interface 1301 for external communication, a processing unit or a processor 1302, which may be a single unit or a combination of multiple units for performing different steps of the method; a memory 1303 storing computer executable instructions which, when executed by the processor 1302, cause the master base station 1300 to perform the method 500 or the method 1000.

In the exemplary embodiment of the master base station 1300 performing the method 500 when the instructions are executed by the processor 1302, the instructions cause the master base station 1300 to perform the following operations: transmitting a secondary base station setup request message to a secondary base station for requesting a DRB to be set up at the secondary base station; and receiving a secondary base station setup response message which includes mapping information from a QoS flow to a DRB.

In an exemplary embodiment, the secondary base station setup request message may include one or more of the following information (for example, the third exemplary embodiment described with reference to FIG. 9): a type of a dual connectivity bearer; QoS flow ID information; an ID of a PDU session to which the QoS flow belongs; a quality requirement parameter corresponding to the QoS flow; an uplink data reception address; and an RRC transparent container.

In an exemplary embodiment, the secondary base station setup request message may further include: a downlink data reception address assigned by the master base station for receiving downlink data from the secondary base station, an ID of a DRB corresponding to a QoS flow which is set up at the secondary base station (for example, the first exemplary embodiment described with reference to FIG. 7); or a downlink data reception address assigned by the master base station for receiving downlink data from the secondary base station (for example, the second exemplary embodiment described with reference to FIG. 8).

As described above, in the second exemplary embodiment described with reference to FIG. 8, the secondary base station setup response message may further include: a downlink data reception address of the DRB at the Xn interface, which is one of downlink data reception addresses corresponding to the QoS flow mapped to the DRB.

As described above, in the exemplary embodiments 1 and 3 described with reference to FIGS. 7 and 9 respectively, the instructions, when executed by the processor 1302, cause the master base station 1300 to perform the following process: transmitting at least one of the following information to the secondary base station according to the received secondary base station setup response message: an ID of a DRB determined by the secondary base station; and tunnel information assigned by the master base station for the DRB.

The information may be carried in a separate message (e.g., Signaling 703 or 903) to be transmitted to the secondary base station, and may also be carried in a secondary base station reconfiguration completion message (e.g., Signaling 706 or 906) transmitted to the secondary base station.

Alternatively, In the exemplary embodiment of the master base station 1300 performing the method 1000 when the instructions are executed by the processor 1302, the instructions cause the master base station 1300 to perform the following operations: transmitting a secondary base station modification request message for requesting SCG configuration information to the secondary base station, the secondary base station modification request message carrying indication information for indicating that the master base station needs to obtain SCG configuration information; and receiving a secondary base station modification response message transmitted by the secondary base station, the secondary base station modification response message carrying the SCG configuration information.

Hereinafter, a structure of a secondary base station according to an exemplary embodiment of the present disclosure will be described with reference to FIG. 14. FIG. 14 schematically shows a structural block diagram of a secondary base station for performing a method for dual connectivity setup according to an exemplary embodiment of the present disclosure. The secondary base station 1400 may be used to perform the method 600 described with reference to FIG. 6 or the method 1100 described with reference to FIG. 11. For the sake of brevity, only a schematic structure of the secondary base station according to the exemplary embodiment of the present disclosure will be described herein, and details which have been described previously in the method 600 with reference to FIG. 6 or in the method 1100 described with reference to FIG. 11 will thus be omitted.

As shown in FIG. 14, the secondary base station 1400 includes a communication interface 1401 for external communication, a processing unit or a processor 1402, which may be a single unit or a combination of multiple units for performing different steps of the method; a memory 1403 storing computer executable instructions which, when executed by the processor 1402, cause the master base station 1400 to perform the method 600 or the method 1100.

In the exemplary embodiment of the secondary base station 1400 performing the method 600 when the instructions are executed by the processor 1402, the instructions cause the secondary base station 1400 to perform the following operations: transmitting a secondary base station setup request message to a secondary base station for requesting a DRB to be set up at the secondary base station; and receiving a secondary base station setup response message which comprises mapping information from a QoS flow to a DRB.

In an exemplary embodiment, the secondary base station setup request message may include one or more of the following information (for example, the third exemplary embodiment described with reference to FIG. 9): a type of a dual connectivity bearer; QoS flow ID information; an ID of a PDU session to which the QoS flow belongs; a quality requirement parameter corresponding to the QoS flow; an uplink data reception address; and an RRC transparent container.

In an exemplary embodiment, the secondary base station setup request message may further include:

a downlink data reception address assigned by the master base station for receiving downlink data from the secondary base station, an ID of a DRB corresponding to a QoS flow which is set up at the secondary base station (for example, the first exemplary embodiment described with reference to FIG. 7); or a downlink data reception address assigned by the master base station for receiving downlink data from the secondary base station (for example, the second exemplary embodiment described with reference to FIG. 8).

As described above, in the second exemplary embodiment described with reference to FIG. 8, the secondary base station setup response message may further include: a downlink data reception address of the DRB at the Xn interface, which is one of downlink data reception addresses corresponding to the QoS flow mapped to the DRB.

As described above, in the first and third exemplary embodiments described with reference to FIGS. 7 and 9 respectively, the instructions, when executed by the processor 1302, cause the master base station 1300 to perform the following process: transmitting at least one of the following information to the secondary base station according to the received secondary base station setup response message: an ID of a DRB determined by the secondary base station; and tunnel information assigned by the master base station for the DRB.

The information may be carried in a separate message (e.g., Signaling 703 or 903) to be transmitted to the secondary base station, and may also be carried in a secondary base station reconfiguration completion message (e.g., Signaling 706 or 906) transmitted to the secondary base station.

Alternatively, In the exemplary embodiment of the secondary base station 1400 performing the method 1100 when the instructions are executed by the processor 1402, the instructions cause the secondary base station 1400 to perform the following operations: receiving a secondary base station modification request message for requesting SCG configuration information from the master base station, the secondary base station modification request message carrying indication information for indicating that the master base station needs to obtain SCG configuration information; and transmitting a secondary base station modification response message to the master base station, the secondary base station modification response message carrying the SCG configuration information.

After receiving the indication information, the secondary base station may ignore an RRC transparent container carried in the secondary base station modification request information.

Turning back to FIG. 2, there is an NG1 interface between a core network and a UE, and NAS (Non-Access Stratum) data packets are transmitted by signaling between the core network and the UE. The NAS data packet transmitted to the UE by the core network is transmitted to the UE by a radio access network, and the NAS data packet transmitted to the core network by the UE is transmitted to the core network by the radio access network. The content of the NAS data packet is usually transparent to the radio access network, so that the radio access network does not need to know the content of the NAS data packet during the transmission of the NAS data packet.

The core network can simultaneously operate multiple UE sessions. One UE session operation can contain operations to multiple QoS flows.

The QoS profile of one QoS flow is about the QoS parameter of the QoS flow and the relevant operation requirements (for example, notification requirement if the QoS flow is not satisfied, the mapping of the QoS attributes, etc.).

Generally, the QoS rule and the QoS profile of the QoS flow are determined by the core network. Generally, the core network can transmit the QoS rule authorized by the QoS flow to the UE. The UE applies the authorized QoS rule to determine the mapping of the service data flows to the QoS flows. The core network can transmit the QoS profile of the QoS flow to the radio access network. The radio access network will decide whether to accept the QoS flow according to the QoS profile of the QoS flow. If the radio access network decide to accept the QoS flow, the radio access network can establish mapped radio resources (for example, DRBs) for the QoS flow. The radio access network can transmit the configuration of DRBs mapped by the QoS flow to the UE. The UE can establish DRBs and/or decide the mapping of DRBs to QoS flows according to the configuration of DRBs.

When a new service data flow arrives, the core network needs to decide the mapping of a QoS flow for the service data flow. One of the following ways can be used: using the defaulted QoS rule, modifying the existing QoS rule to contain the new service data flow, and establishing a new QoS rule.

The core network can simultaneously establish or modify multiple UE sessions. One UE session can contain operations to multiple QoS flows (establish, modify, delete). The core network can also simultaneously establish and/or modify and/or delete multiple QoS flows in one UE session, for example, establish one QoS flow, delete one QoS flow, modify the QoS parameter of the QoS flow, modify the QoS profile, modify the mapping rule of QoS flows to service data flows (for example, the QoS rule). The establishment or modification performed on a UE session or a QoS flow by the core network may need to be synchronized to the radio access network and the UE. The radio access network may be configured according to the established content, for example, determine the configuration of a Data Radio Bearer (DRB) mapped by the QoS flow according to the QoS parameter or QoS profile of the QoS flow, and a DRB after being configured with the UE. The radio access network may change the configuration according to the modified content, for example, determine a Data Radio Bearer (DRB) mapped by the QoS flow according to the updated QoS parameter or the updated QoS profile of the QoS flow. Of course, for the modified content, the radio access network may establish a DRB to map the updated QoS flow; or may change the DRB mapped by the QoS flow. The radio access network may not change the configuration. For example, if the DRB mapped by the QoS flow before modification can still satisfy the requirements of the QoS of the modified QoS flow, the mapping between the QoS flow and the DRB is maintained; or more. The modification to the QoS flow also belongs to the modification to the UE session.

For the modification to the UE session/QoS flow, there are still following problems. These problems will be analyzed below one by one.

Problem 1: Generally, when the core network requests the radio access network to establish or modify the UE session, session establishment information or modification information to be synchronized to the UE is contained in an NAS data packet and then transmitted to the radio access network; and, after the radio access network completes the establishment or modification to the UE session, the radio access network transmits the received NAS data packet to the UE. However, due to resource limitation or other reasons, the radio access network may fail in the establishment or modification to the UE session. For example, if the QoS flow changes from a non-guaranteed bit rate (non-GBR) to a guaranteed bit rate (GBR), the radio access network may fail in the modification because it probably cannot ensure a rate required by the GBR currently. For an unsuccessfully modified QoS flow, the radio access network can maintain the original configuration of the QoS flow and inform the core network of the result of failure.

Upon receiving the NAS data packet, the UE will execute its own configuration.

If one NAS data packet contains establishment information of multiple UE sessions or contains establishment information of multiple QoS flows in one session, since the operation in the access stratum and the operation in the non-access stratum are independent, the establishment of UE sessions and QoS flows, which is not accepted by the radio access network, may be accepted by the UE. That is, the establishment in the access stratum is failed while the establishment in the non-access stratum is successful. As a result, the configuration of the UE between the access stratum and the non-access stratum will be inconsistent, and consequently, the configuration between the UE and the radio access network will be inconsistent. The UE maps service data flows according to the mapping rule of the accepted QoS flow. However, no DRB is configured for the QoS flow and the transmission of the QoS flow is thus failed. The operation of mapping service data flows according to the QoS rule is unnecessary and costs the valuable computing resources and power energy. For services, it is also possible to map QoS flows according to the defaulted QoS rule for the PDU session so that there is still an opportunity to transmit QoS flows, if it is not intended to map QoS flows according to the dedicated QoS rule. If QoS flows without DRBs are still mapped, false connection will be caused. That is, it seems that the data transmission is ongoing, but the data has been not successfully transmitted. If the configuration of the UE is corrected after the core network finds this problem, it will cost extra signaling overhead.

If one NAS data packet contains modification information of multiple UE sessions, similarly, since the UE session modification not accepted by the radio access network may be accepted by the UE, the configuration of the UE between the access stratum and the non-access stratum will be inconsistent, and consequently, the configuration between the UE and the radio access network will be inconsistent; and, if one NAS data packet contains modification information of QoS flows in one UE session, since the QoS flow modification not accepted by the radio access network will be accepted by the UE, the configuration of the UE between the access stratum and the non-access stratum will be inconsistent, and consequently, the configuration between the UE and the radio access network will also be inconsistent.

Problem 2: The UE may fail in the modification to its own configuration upon receiving the NAS data packet, and the UE will return the result of modification by the NAS data packet. This NAS data packet will be transmitted to the radio access network first and then to the core network. However, if one NAS data packet contains modification information of multiple UE sessions, since the radio access network may accept the UE session modification not accepted by the UE, the configuration between the UE and the radio access network will be inconsistent; and, if one NAS data packet contains modification information of one UE session, since the radio access network may accept the QoS flow modification not accepted by the UE, the configuration between the UE and the radio access network will also be inconsistent.

Problem 3: For a failure of a modified session or QoS flow, it is possible to maintain the configuration before modification to continuously serve the UE, or it is also possible that the session or QoS flow needs to be released since it cannot satisfy the service requirements of the UE. In the latter case, upon confirming the modification failure in the core network, the core network needs to trigger a release process to release related sessions/QoS flows, thereby resulting in the unnecessary signaling overhead.

Problem 4: Due to the limited radio resources, the radio access network may not accept the QoS parameter for establishing a QoS flow. For a QoS flow of the unacceptable QoS parameter, errors may occur when the UE or core network applies its corresponding QoS rule. In this case, it may be considerable to decrease requirements on the QoS parameter of the QoS flow, or apply the defaulted QoS rule, or release the relevant service data. For the establishment of a UE session/QoS flow, the problems 1, 2 and 4 in the modification of the UE session/QoS flow will also occur;

and, for the release of a UE session/QoS flow, the problems 1, 2 and 4 in the modification of the UE session/QoS flow may occur.

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It should be understood by one person of ordinary skill in the art that, unless otherwise defined, all terms (including technical and scientific terms) used herein have the same meaning as commonly understood by one person of ordinary skill in the art to which the present disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

For ease of understanding, before the technical solutions of the present disclosure are described in detail, some technical terms in the embodiments of the present disclosure will be described below.

In some implementations, the radio access network node can be at least one of the following: a base station, an evolved node B (eNodeB), a node B (NodeB), a gNB in the 5G radio access technology, a radio access network central control unit (CU, e.g., a gNB-CU), a radio access network node distributed unit (DU, e.g., a gNB-DU), a source radio access network node during the movement process of a UE, a target radio access network node during the movement process of a UE, a new radio access network node accessed by a UE in a light connection mode or in an inactive state, an old radio access network node for storing UE context when a UE is in a light connection mode or in an inactive state, a radio access network node of a suspended UE, and a radio access network node to which a UE requests for connection recovery. In the next generation network, the concept of node may be virtualized as a function or a unit, and the radio access network central control unit can be connected to multiple radio access network node distributed units.

The UE can be further divided into at least one of the following: a UE entirety, a non-access stratum (e.g., an NA stratum) of the UE, an access stratum (e.g., an AS stratum) of the UE, and an application stratum (e.g., an APP stratum) of the UE.

In some implementations, the core network node can be at least one of the following: an MME, a SGSN, a SGW, an access mobility management Function (AMF), a session management function (SMF), a user plane function (UPF), a core network control node, a core network user plane node, a core network control plane function, a core network user plane function, a core network control plane unit, a core network user plane unit or more. In the next generation network, the concept of node may be virtualized as a function or a unit.

In some implementations, the core network control node can be an MME, an SGSN, an AMF, an SMF, a core network control plane function, a core network control plane unit or more.

In some implementations, the core network user plane node can be an SGW, an SGSN, a UPF, a core network user plane function, a core network user plane unit, a network fragment or more.

Unless otherwise specified, the operation in the present application can be at least one of the following: establishment, modification and release; and, the operation object can be at least one of the following: a session (e.g., a PDU session or a PDU connection) and a QoS flow.

In some implementations, establishing a QoS flow or a session is to allocate corresponding resources for the QoS or session, releasing a QoS flow or a session is to release corresponding resources allocated for the QoS or session, and modifying the configuration information of a QoS flow or a session may or may not cause the change in the corresponding resources since the current resources may still satisfy the new configuration.

In some implementations, unless otherwise specified, the "operation" mentioned herein refers to establishment, modification and/or release. Unless otherwise specified, the object of a "session operation" refers to a QoS flow and/or a UE session. Unless otherwise specified, the "session/QoS flow" mentioned herein refers to a QoS flow and/or a UE session.

In some implementations, unless otherwise specified, the "NAS message" or "NAS signaling" mentioned herein refers to the content in an NAS data packet.

Unless otherwise specified, the "allocation/mapping of radio bearers" mentioned herein refers to allocation and/or mapping of radio bearers.

Unless otherwise specified, the "QoS profile/QoS parameter" mentioned herein refers to QoS profile and/or QoS parameter. A method for controlling a session operation is provided, comprising the steps of: acquiring, by a first node, first session operation information about a UE, wherein the first session operation information about the UE comprises at least one of the following: first session operation request information and first session operation result information; and, determining, according to the first session operation information about the UE, whether to accept an operation request to a session/QoS flow in the first session operation request information.

Preferably, after the step of determining whether to accept an operation request to a session/QoS flow in the first session operation request information, the method further comprises the steps of: generating second session operation request information; and/or, generating second session operation result information.

Preferably, the step of generating second session operation result information comprises at least one of the following situations:

using sessions/QoS flows in the first session operation request information which are not to be executed or refused to be executed as unsuccessfully operated sessions/QoS flows in the second session operation result information; using sessions/QoS flows in the first session operation request information can be operated or have been operated successfully as successfully operated sessions/QoS flows in the second session operation result information; using unsuccessfully operated sessions/QoS flows in the acquired first session operation result information as unsuccessfully operated sessions/QoS flows in the second session operation result information; and, using successfully operated sessions/QoS flows in the acquired first session operation result information as unsuccessfully operated sessions/QoS flows in the second session operation result information.

Preferably, the step of generating second session operation request information specifically comprises: using sessions/QoS flows in the first session operation request information which are not to be modified or refused to be modified as sessions/QoS flows requested to be released in the second session operation result information; and, using sessions/QoS flows in the first session operation request information which can be operated or have been operated successfully as sessions/QoS flows requested to be operated in the second session operation result information.

Preferably, the first node is at least one of the following: a core network, a radio access network, a gNB, a gNB-CU, a gNB-DU, a UE, a radio access network node, a core network node, a data endpoint, a non-access stratum of a UE, an access stratum of a UE, an application stratum of a UE, a central control unit (CU), a distributed unit (DU), a core network user plane node, a core network control panel node, a source radio access network node during the movement of a UE, a target radio access network node during the movement of a UE, a new radio access network node accessed by a UE in a light connection mode or in an inactive state, an old radio access network node for storing UE context when a UE is in a light connection mode or in an inactive state, a radio access network node of a suspended UE, and a radio access network node to which a UE requests for connection recovery. In an embodiment, the first node may include a communication interface (e.g., a transceiver), at least one processor and a memory.

Preferably, the first session operation request information and the second session operation request information comprise at least one of the following: operation request information, session information of an operation-related session, QoS flow information of an operation-related QoS flow, session information of a session requested to be established, session information of a session requested to be modified, session information requested to be released, QoS flow information of a QoS flow requested to be established, QoS flow information of a QoS flow requested to be modified, and QoS flow information of a QoS flow requested to be released; and/or the first session operation result information and the second session operation result information comprise at least one of the following: operation result information, operation information, session information of an operation-related session, QoS flow information of an operation-related QoS flow, session information of a successfully established session and/or session information of an unsuccessfully established session, session information of a successfully modified session and/or session information of an unsuccessfully modified session, session information of a successfully released session and/or session information of an unsuccessfully released session, QoS flow information of a successfully established QoS flow and/or QoS flow information of an unsuccessfully established QoS flow, QoS flow information of a successfully modified QoS flow and/or QoS flow information of an unsuccessfully modified QoS flow, and QoS flow information of a successfully released QoS flow and/or session information of an unsuccessfully released QoS flow.

Preferably, the operation request information comprises at least one of the following: request for establishment, request for modification, request for release, and subsequent operation requirements after modification failure; and/or the operation result information comprises at least one of the following: operation success, operation failure, establishment success, establishment failure, modification success, modification failure, release success, release failure, being able to be operated successfully, being able to be established successfully, being able to be modified successfully, and being able to be released unsuccessfully; and/or the QoS flow information at least comprises one of the following: an identifier of a session to which a QoS flow belongs, an identifier of a QoS flow, a QoS profile of the QoS flow, a QoS rule related to the QoS flow, information indicative of QoS flow establishment success, information indicative of QoS flow establishment failure, information indicative of QoS flow modification success, information indicative of QoS flow modification failure, a QoS parameter, bearer information of a configured DRB, the reason for operation failure, and subsequent operation requirements after modification failure; and/or the session information comprises at least one of the following: an identifier of a session, bearer information of a configured DRB, configured NG interface channel information, QoS flow information of contained QoS flows, the reason for operation failure, and subsequent operation requirements after modification failure.

Preferably, the subsequent operation requirements after modification failure comprise at least one of the following: maintaining the configuration before modification, releasing unsuccessfully modified QoS flows, and releasing unsuccessfully modified sessions.

Preferably, the information indicative of QoS flow establishment success at least comprises one of the following: an identifier of a successfully established QoS flow, an identifier of a radio bearer mapped by a successfully established QoS flow, the acceptation of a QoS flow by a UE, the acceptation of a QoS rule of a QoS flow by the UE, the acceptation of a QoS flow in the non-access stratum, the acceptation of a QoS flow by a radio access network node, a QoS flow for which a radio bearer is allocated/mapped by a radio access network, the presence of a radio bearer mapped by a QoS flow, the acceptation of a QoS flow in the access stratum, the acceptation of a QoS profile of a QoS flow by a radio access network node, the acceptation of a QoS parameter of a QoS flow by a radio access network node, and a QoS flow for which necessary radio resources are established;

preferably, the information indicative of QoS flow establishment failure at least comprises one of the following: an identifier of an unsuccessfully established QoS flow, the refusal of QoS rule of a QoS flow by a UE, the refusal of a QoS flow in the non-access stratum, the refusal of a QoS flow by a radio access network node, a radio bearer with a QoS flow not configured, a radio bearer with a QoS flow not mapped, the refusal of a QoS flow in the access stratum, the refusal of a QoS profile of a QoS flow by a radio access network node, the refusal of a QoS parameter of a QoS flow by a radio access network node, and a QoS flow for which no necessary radio resources (for example, radio bearers) are established and/or mapped;

preferably, the information indicative of QoS flow modification success at least comprises one of the following: an identifier of a successfully modified QoS flow, an identifier of a radio bearer mapped by a successfully modified QoS flow, the acceptation of updates in a QoS rule of a QoS flow by a UE and/or a core network node (for example, an SMF or a UPF), the acceptation of updates in a QoS profile of a QoS flow by a radio access network node, the acceptation of updates in a QoS parameter of a QoS flow by a radio access network node, the allocation/mapping of a radio bearer by a radio access network according to the updated QoS profile or QoS parameter of a QoS flow, and a QoS flow for which necessary radio resources are established and/or mapped according to the updates; and preferably, the information indicative of QoS flow modification failure at least comprises one of the following: an identifier of an unsuccessfully modified QoS flow, an identifier of a radio bearer mapped by an unsuccessfully modified QoS flow, the refusal of updates in a QoS rule of a QoS flow by a UE and/or a core network node (for example, an SMF or a UPF), the refusal of updates in a QoS profile of a QoS flow by a radio access network node, the refusal of updates in a QoS parameter of a QoS flow by a radio access network node, the allocation/mapping failure of a radio bearer by a radio access network node according to the updated QoS profile of a QoS flow, the allocation/mapping failure of a radio bearer by a radio access network according to the updated QoS parameter, and a QoS flow for which necessary radio resources (for example, radio bearers) are not established and/or mapped according to the updates; and/or Preferably, the session operation information about the UE is acquired by one of the following: a core network, a radio access network, a gNB in the 5G radio access technology, a central control unit (gNB-CU) of a gNB in the 5G radio access technology, a distributed unit (gNodeB-DU) of a gNB in the 5G radio access technology, a UE, a radio access network node, a core network node, a data endpoint, a non-access stratum of a UE, an access stratum of a UE, an application stratum of a UE, a control unit (CU), a distributed unit (DU), a core network user plane node, a core network control plane node, a source radio access network node during the movement process of a UE, a target radio access network node during the movement process of a UE, a new radio access network node accessed by a UE in a light connection mode or in an inactive state, an old radio access network node for storing UE context when a UE is in a light connection mode or in an inactive state, a radio access network node of a suspended UE, and a radio access network node to which a UE requests for connection recovery, Preferably, the step of determining, according to the first session operation information about the UE, whether to accept an operation request to a session/QoS flow in the first session operation request information comprises at least one of the following situations:

for an unsuccessfully operated session/QoS flow in the first session operation result information, not executing or refusing to execute an operation request to the unsuccessfully established session/QoS in the first session operation request information;

for an unsuccessfully modified session/QoS flow in the first session operation result information, releasing the unsuccessfully modified session/QoS flow;

for a successfully operated session/QoS flow in the first session operation result information, accepting or executing an operation request to the successfully operated session/QoS flow in the first session operation request information;

for a QoS flow meeting at least one of the following situations in the first session operation result information: the QoS flow is successfully established, the QoS flow is modified successfully, accepting or executing an operation request to the successfully established and/or modified QoS flow in the first session operation request information, at least comprising one of the following: accepting or applying the QoS rule related to the QoS flow, accepting or applying the QoS profile of the QoS flow, accepting or applying the QoS parameter of the QoS flow, accepting or applying the updates in the QoS rule of the QoS flow, accepting or applying the updates in the QoS profile of the QoS flow, and accepting or applying the updates in the QoS parameter of the QoS flow;

for a QoS flow meeting at least one of the following situations in the first session operation result information: the QoS flow is unsuccessfully established, the QoS flow is unsuccessfully established and the defaulted QoS rule cannot be applied, or the defaulted QoS rule cannot be applied for relevant service data in the unsuccessfully established QoS flow, not executing or refusing to execute an operation request to the QoS flow in the first session operation request information, which at least comprising one of the following: refusing or not applying the QoS rule related to the QoS flow, requesting other nodes to refuse or not apply the QoS rule related to the QoS flow, refusing or not applying the QoS rule related to the QoS profile of the QoS flow, requesting other nodes to release and/or not apply the QoS rule related to the QoS flow, refusing or not applying the QoS profile of the QoS flow, refusing or not applying the QoS parameter of the QoS flow, abandoning the data of the QoS flow and/or the data of the service data flow related to the QoS flow, requesting other nodes to abandon the data of the QoS flow and/or the data of the service data flow related to the QoS flow, temporarily caching the data of the QoS flow and/or the data of the service data flow related to the QoS flow, requesting other nodes to temporarily cache the data of the QoS flow and/or the data of the service data flow related to the QoS flow, applying the defaulted QoS rule for the data of the service data flow related to the QoS flow, applying the defaulted QoS rule for the data of the service data flow related to the QoS rule of the QoS flow, decreasing requirements on the QoS parameter of the QoS flow, releasing the relevant configurations of the QoS flow, and transmitting the data of the QoS flow by employing a defaulted radio bearer; and For a QoS flow meeting at least one of the following situations in the first session operation result information: the QoS flow is unsuccessfully modified or the defaulted QoS rule cannot be applied for relevant new service data flows in the unsuccessfully modified QoS flow, not executing or refusing to execute an operation request to the QoS flow in the first session operation request information, which at least comprising one of the following: refusing and/or releasing the updates in the QoS rule of the QoS flow, requesting other nodes to refuse and/or release updates in the QoS rule of the QoS flow, refusing and/or releasing the QoS rule related to the QoS flow, requesting other nodes to refuse and/or release the QoS rule related to the QoS flow, maintaining the QoS rule of the QoS flow before modification, requesting other nodes to maintain the QoS rule of the QoS flow before modification, refusing or not applying the updates in the QoS rule related to the updates in the QoS profile or updates in the QoS parameter, refusing or not applying the updates in the QoS profile or updates in the QoS parameter of the QoS flow, maintaining the QoS profile or QoS parameter of the QoS flow before the update, maintaining the radio bearer mapped by the QoS flow before the update, abandoning the data of new service data flows related to the updates in the QoS rule of the QoS flow, requesting other nodes to abandon the data of new service data flows related to the updates in the QoS rule of the QoS flow, temporarily caching the data of new service data flows related to the updates in the QoS rule of the QoS flow, requesting other nodes to temporarily cache the data of new service data flows related to the updates in the QoS rule of the QoS flow, applying the defaulted QoS rule for the data of new service data flows related to the updates in the QoS rule of the QoS flow, applying the defaulted QoS rule for the new service data flows without any dedicated QoS rule, decreasing requirements on the updated QoS profile or QoS parameter of the QoS flow, releasing relevant configurations of the QoS flow, and transmitting the QoS flow by a defaulted radio bearer.

The technical solutions of the present disclosure will be described below in detail by specific embodiments.

FIG. 15 schematically shows a flowchart of a method for controlling a session operation according to a first embodiment of the present invention. Referring FIG. 15, in step 1510, A first node acquires first session operation information about a UE. Herein, the first session operation information about the UE comprises at least one of the following: first session operation request information and first session operation result information. In step 1502, it is determined, according to the first session operation information about the UE, whether to accept an operation request to a session/QoS flow in the first session operation request information.

Specifically, in the step 1510, the first node acquires first session operation information about the UE.

Optionally, the first session operation information about the UE can comprise at least one of the following: first session operation request information and first session operation result information.

Optionally, the session operation request information or the first session operation request information can comprise at least one of the following:

operation request information (the operation request is for example, a request for establishment, authorization, a request for configuration modification, a request for release or more), session information of an operation-related session (the operation-related session is, for example, a session in which the operation object is a UE), QoS flow information of an operation-related QoS flow (the operation-related QoS flow is, for example, a QoS flow in which the operation object is a UE), session information of a session requested to be established, session information of a session requested to be modified, session information of a session requested to be released, QoS flow information of a QoS flow requested to be established (or, authorized QoS flow information of a QoS flow, for example, authorized QoS rule), QoS flow information of a QoS flow requested to be modified, and QoS flow information of a QoS flow requested to be released.

In some implementations, the first node is a UE which is informed that the first session operation request information is from the NAS layer message of the core network, for example, a PDU session establishment acceptation message, a PDU session modification command message. In the PDU session establishment acceptation message, a QoS flow in the QoS rule for authorization may represent a QoS flow requested to be established. In the PDU session modification command message, a QoS flow in the QoS rule for authorization may represent a QoS flow requested to be established, and a QoS flow in the QoS rule for modification request may be a QoS flow requested to be modified. The first session operation result information acquired by the UE is the result of operating, by the radio access network node, the QoS flow requested to be established. For example, the presence of radio bearers mapped by the QoS flow may represent the QoS flow establishment success, and the absence of radio bearers mapped by the QoS flow may represent the QoS flow establishment failure.

In some implementations, the first node is a radio access network node which is informed that the first session operation request information is from a PDU session resource establishment request message of the NG interface of the core network. In the PDU session resource establishment request message from the NG interface, a QoS flow requested to be added may represent a QoS flow requested to be established. Its QoS flow information can contain the QoS profile/QoS parameter of the QoS flow. The radio access network may allocate/map radio bearers (for example, DRBs) to the QoS flow according to the QoS profile/QoS parameter. The radio bearers can be used for transmitting data of the QoS flow.

Preferably, the operation request information can comprise at least one of the following: request for establishment, request for modification, request for release, and subsequent operation requirements after modification failure.

The subsequent operation requirements after modification failure can comprise at least one of the following: maintaining the configuration before the modification after the modification failure occurs, releasing unsuccessfully modified QoS flows, and releasing unsuccessfully modified sessions. Needless to say, the subsequent operation requirements after modification failure are actions to be executed after a session or QoS flow requested to be modified is modified unsuccessfully or the modification is not accepted. By the subsequent operation requirements after modification failure, the session operation process can be accelerated, the signaling operation can be reduced, and excessive signaling overhead caused by the release process re-initiated after modification failure is avoided.

Optionally, the session operation result information or the first session operation result information can comprise at least one of the following:

operation result information (for example, success, failure, establishment success, establishment failure, modification success, modification failure, release success, release failure or more), operation information (for example, establishment, modification, release or more), session information of an operation-related session, QoS flow information of an operation-related QoS flow, session information of a successfully established session and session information of an unsuccessfully established session, session information of a successfully modified session and session information of an unsuccessfully modified session (which can also be embodied as a session which is maintained unchanged or refused to be modified), session information of a successfully released session and session information of an unsuccessfully released session, QoS flow information of a successfully established QoS flow and QoS flow information of an unsuccessfully established QoS flow, QoS flow information of a successfully modified QoS flow and QoS flow information of an unsuccessfully modified QoS flow (which can also be embodied as a QoS flow which is maintained unchanged or refused to be modified), and QoS flow information of a successfully released QoS flow and session information of an unsuccessfully released QoS flow.

In some implementations, the QoS flow establishment success may be represented by at least one of the following: the acceptation of a QoS flow by a UE, the acceptation of a QoS rule of a QoS flow by the UE, the acceptance of a QoS flow in the non-access stratum, the acceptance of a QoS flow by a radio access network node, a QoS flow for which a radio bearer (for example, a DRB) is allocated/mapped by a radio access network, the presence of a radio bearer mapped by a QoS flow, the acceptance of a QoS flow in the access stratum, the acceptance of a QoS profile of a QoS flow by a radio access network node, the acceptance of a QoS parameter of a QoS flow by a radio access network node, and a QoS flow for which necessary radio resources are established.

In some implementations, the QoS flow establishment failure may be represented by at least one of the following: the refusal of a QoS flow by a UE, the refusal of a QoS rule of a QoS flow by the UE, the refusal of a QoS flow in the non-access stratum, the refusal of a QoS flow by a radio access network node, the absence of a radio bearer (for example, a DRB) configured for a QoS flow, the absence of a radio bearer (for example, a DRB) mapped by a QoS flow, the refusal of a QoS flow in the access stratum, the refusal of a QoS profile of a QoS flow by a radio access network node, the refusal of a QoS parameter of a QoS flow by a radio access network node, and a QoS flow for which no necessary radio resources are established and/or mapped.

In some implementations, the QoS flow modification success may be represented by at least one of the following: the acceptance of updates in a QoS rule of a QoS flow by a UE and/or a core network node, the acceptance of updates in a QoS profile of a QoS flow by a radio access network node, the acceptance of updates in a QoS parameter of a QoS flow by a radio access network node, the allocation/mapping of a radio bearer by a radio access network according to the updated QoS profile or QoS parameter of a QoS flow (in some implementations, when the mapped radio bearer before the update cannot satisfy the updated QoS profile/QoS parameter, the radio access network may not change the radio bearer mapped by the QoS flow), and a QoS flow for which necessary radio resources are established and/or mapped according to the updates.

In some implementations, the QoS flow modification failure may be represented by at least one of the following: the refusal of updates in a QoS rule of a QoS flow by a UE and/or a core network node (for example, an SMF or a UPF), the refusal of updates in a QoS profile of a QoS flow by a radio access network node, the refusal of updates in a QoS parameter of a QoS flow by a radio access network node, the allocation/mapping failure of a radio bearer by a radio access network according to the updated QoS profile of a QoS flow, the allocation/mapping failure of a radio bearer by a radio access network according to the updated QoS parameter of a QoS flow, and a QoS flow for which no necessary radio resources are established and/or mapped according to the updates.

In some implementations, the radio access network is unable to allocate/map a radio bearer according to the updated QoS parameter. It can maintain, for the QoS flow, a radio bearer mapped before the update.

Optionally, the operation result information can comprise at least one of the following: operation success, operation failure, establishment success, establishment failure, modification success, modification failure, release success, release failure, being able to be operated successfully, being able to be established successfully, being able to be modified successfully, and being able to be released unsuccessfully. In some implementations, the first session operation result information is the result of an operation which has been completed or the result of an operation which can be completed, wherein the result of an operation which can be completed can mean that the operation can be completed but has not yet been completed actually. In some implementations, the acquired first session operation result information can be the result of an operation performed according to the first session request information by the first node or received session operation result information (for example, result information of an operation performed by other nodes according to the first session request information).

Optionally, the QoS flow information can comprise at least one of the following: a
QoS profile of a QoS flow, a QoS rule related to a QoS flow, information indicative of QoS flow establishment success, information indicative of QoS flow establishment failure, information indicative of QoS flow modification success, information indicative of QoS flow modification failure, an identifier of a session to which a QoS flow belongs, an identifier of a QoS flow, a QoS parameter, bearer information of an associated Data Radio Bearer (DRB) (for example, an identifier of the DRB, an identifier of a logical channel to which the DRB is mapped, QoS parameters of the DRB, the Packet Data Convergence Protocol (PDCP) configuration, Radio Link Control (RLC) configuration and/or logical channel configuration of the DRB, or more), the reason for operation failure (which can be one of pieces of QoS flow information of an unsuccessfully operated QoS flow), subsequent operation requirements after establishment failure (which can indicate at least one of the following: mapping service data flows related to the unsuccessfully established QoS flows by the defaulted QoS rule, and releasing service data flows related to the unsuccessfully established QoS flows) (the service data flows related to the QoS flows can be known from the QoS rule of the QoS flows), and subsequent operation requirements after modification failure (which can indicate at least one of the following: maintaining the configuration before modification after the modification failure occurs, releasing unsuccessfully modified QoS flows, mapping service data flows related to the unsuccessfully modified QoS flows by the defaulted QoS rule (for example, the new service data flows related to the QoS flows can be known from the updated QoS rule of the QoS flows)). Needless to say, when the operation to a QoS flow is to modify the configuration and the modification is failed, according to the subsequent operation requirements after modification failure, the first node can release related resources of this QoS flow or maintain the previous configuration of this QoS flow.

Optionally, the defaulted QoS rule is the QoS rule defaulted for the PDU session. For service data for which no QoS rule is mapped, the mapping may be done according to the defaulted QoS rule.

Optionally, the information indicative of QoS flow establishment success can indicate one of the following: an identifier of a successfully established QoS flow, an identifier of a radio bearer mapped by a successfully established QoS flow, the acceptance of a QoS flow by a UE, the acceptance of a QoS rule of a QoS flow by the UE, the acceptance of a QoS flow in the non-access stratum, the acceptance of a QoS flow by a radio access network node, a QoS flow for which a radio bearer (for example, a DRB) is allocated/mapped by a radio access network, the presence of a radio bearer mapped by a QoS flow, the acceptance of a QoS flow in the access stratum, the acceptance of a QoS profile of a QoS flow by a radio access network node, the acceptance of a QoS parameter of a QoS flow by a radio access network node, and a QoS flow for which necessary radio resources are established.

Optionally, the information indicative of QoS flow establishment failure can indicate one of the following: an identifier of an unsuccessfully established QoS flow, the refusal of a QoS flow by a UE, the refusal of a QoS rule of a QoS flow by the UE, the refusal of a QoS flow in the non-access stratum, the refusal of a QoS flow by a radio access network node, the absence of a radio bearer configured for a QoS flow, the absence of a radio bearer (for example, a DRB) mapped by a QoS flow, the refusal of a QoS flow in the access stratum, the refusal of a QoS profile of a QoS flow by a radio access network node, the refusal of a QoS parameter of a QoS flow by a radio access network node, and a QoS flow for which no necessary radio resources are established and/or mapped.

Optionally, the information indicative of QoS flow modification success can indicate one of the following: an identifier of a successfully modified QoS flow, an identifier of a radio bearer mapped by a successfully modified QoS flow, the acceptance of updates in a QoS rule of a QoS flow by a UE and/or a core network node (for example, an SMF or a UPF), the acceptance of updates in a QoS profile of a QoS flow by a radio access network node, the acceptance of updates in a QoS parameter of a QoS flow by a radio access network node, the allocation/mapping of a radio bearer by a radio access network according to the updated QoS profile or QoS parameter of a QoS flow, and a QoS flow for which necessary radio resources are established and/or mapped according to the updates.

In some implementations, when the radio access network node cannot satisfy the updated QoS profile/QoS parameter, the radio access network may not change the radio bearer previously mapped by the QoS flow. In this case, the radio access network node can transmit, to the UE, an identifier of an unsuccessfully modified QoS flow. In this way, the UE can know that updating the QoS parameter or QoS profile of the QoS flow is failed.

Optionally, the information indicative of QoS flow modification failure can indicate one of the following: an identifier of an unsuccessfully modified QoS flow, an identifier of a radio bearer mapped by an unsuccessfully modified QoS flow, the refusal of updates in a QoS rule of a QoS flow by a UE and/or a core network node (for example, an SMF or a UPF), the refusal of updates in a QoS profile of a QoS flow by a radio access network node, the refusal of updates in a QoS parameter of a QoS flow by a radio access network node, the allocation/mapping failure of a radio bearer by a radio access network according to the updated QoS profile of a QoS flow, the allocation/mapping failure of a radio bearer by a radio access network according to the updated QoS parameter of a QoS flow, and a QoS flow for which no necessary radio resources are established and/or mapped according to the updates.

In some implementations, when the radio access network node cannot satisfy the requirements on the updated QoS profile/QoS parameter, the radio access network may not change the radio bearers mapped by the QoS flow. In this case, the radio access network node can transmit an identifier of the unsuccessfully modified QoS flow to the UE. In this way, the UE can know that updating the QoS parameter or QoS profile of the QoS flow is failed.

Optionally, the QoS profile and/or QoS parameter of the QoS flow can contain, but not limited to, at least one of the following: an identifier of a QoS flow, a 5G QoS indicator (5QI), an allocation and retention priority (ARP), a guaranteed flow bit rate (GFBR)—UL, a guaranteed flow bit rate (GFBR)—DL, a maximum flow bit rate (MFBR)—UL, a maximum flow bit rate (MFBR)—DL, the type of GFBR, the type of non-GFBR, a notification control indicator (that is, when the requirements on the QoS flow (for example, the requirements on the QoS parameter) cannot be satisfied, it is required to notify the core network), and a reflective QoS attribute (RQA).

Optionally, one QoS rule for the QoS flow is a rule for mapping a service data flow to a QoS flow. One QoS rule can contain, but is not limited to, at least one of the following: an identifier of a QoS rule, an identifier of a mapped QoS flow, data packet filters, a precedence value, a QoS parameter of a QoS flow (for example, a QoS parameter of a QoS flow regarding the UE). One QoS flow may have multiple QoS rules.

Optionally, the session information can comprise at least one of the following: an identifier of a session, bearer information of a configured DRB (for example, an identifier of the DRB, QoS parameters of the DRB, the PDCP/RLC/configuration of the DRB, or more), configured NG interface channel information, QoS flow information of the contained QoS flows, the reason for operation failure (which can be one of pieces of session information of an unsuccessfully operated session), and subsequent operation requirements after modification failure (which can indicate at least one of the following: maintaining the configuration before the modification after the modification failure occurs, and releasing unsuccessfully modified sessions). Needless to say, when the operation to a session is to modify the configuration and the modification is failed, according to the subsequent operation requirements after modification failure, the first node can release related resources of this session or maintain the previous configuration of this session.

Optionally, the session operation information about the UE can be acquired by at least one of the following: a core network, a radio access network, a gNodeB, a gNodeB-CU, a gNodeB-DU, a UE, a radio access network node, a core network node, a data endpoint, a non-access stratum (e.g., an NA stratum) of a UE, an access stratum (e.g., an AS stratum) of a UE, an application stratum (e.g., an APP stratum) of a UE, a CU, a DU, a core network user plane node, a core network control panel node, a source radio access network node during the movement process of a UE, a target radio access network node during the movement process of a UE, a new radio access network node accessed by a UE in a light connection mode or in an inactive state, an old radio access network node for storing UE context when a UE is in a light connection mode or in an inactive state, a radio access network node of a suspended UE, and a radio access network node to which a UE requests for connection recovery.

In some implementations, the first session operation request information and the first session operation result information can be from different nodes or node units. For example, the session operation request information is from a core network, the session operation result information is from a radio access network node, and the first node is a UE. For another example, the session operation request information is from a core network, the session operation result information is from a UE, and the first node is a radio access network node.

The session operation information about the UE acquired by the core network can be contained in an NAS data packet and/or in a cell outside an NAS data packet in an NG interface message.

The session operation information about the UE acquired by the radio access network can be contained in a cell outside an NAS data packet in a Radio Resource Control (RRC) message.

The session operation information about the UE acquired by the UE can be contained in an NAS data packet and/or in a cell outside an NAS data packet in an RRC message.

Optionally, the first node can be at least one of the following: a core network, a radio access network, a gNB, a gNB-CU, a gNB-DU, a UE, a radio access network node, a core network node, a data endpoint, a non-access stratum (e.g., an NA stratum) of a UE, an access stratum (e.g., an AS stratum) of a UE, an application stratum (e.g., an APP stratum) of a UE, a CU, a DU, a core network user plane node, a core network control panel node, a source radio access network node during the movement process of a UE, a target radio access network node during the movement process of a UE, a new radio access network node accessed by a UE in a light connection mode or in an inactive state, an old radio access network node for storing UE context when a UE is in a light connection mode or in an inactive state, a radio access network node of a suspended UE, and a radio access network node to which a UE requests for connection recovery.

Specifically, in the step 1520, the first node determines, according to the first session operation information about the UE, whether to accept an operation request to a session/QoS flow in the first session operation request information.

In some implementations, the acquired first session operation result information can be the result of an operation performed by the first node according to the first session request information or received session operation result information (for example, result information of an operation performed by other nodes according to the first session request information).

Specifically, after the step of determining whether to accept an operation request to a session/QoS flow in the first session operation request information, the method can further comprise at least one of the following steps: generating second session operation request information; and generating second session operation result information.

The acquired first session operation result information can be the result of an operation performed by the first node according to the first session request information or the received result of an operation performed by other nodes according to the first session request information.

Specifically, the step of determining, by the first node, according to the acquired session operation information about the UE, whether to accept an operation request to a session/QoS flow in the first session operation request information can comprise at least one of the following situations:

1) for an unsuccessfully operated session/QoS flow in the first session operation result information, an operation request to the unsuccessfully operated session/QoS in the first session operation request information is not executed or refused to be executed, for example:

for an unsuccessfully established session/QoS flow in the first session operation result information, an establishment request to the unsuccessfully established session/QoS in the first session operation request information is not executed or refused to be executed;

for an unsuccessfully modified session/QoS flow in the first session operation result information, a modification request to the unsuccessfully modified session/QoS in the first session operation request information is not executed or refused to be executed; and for an unsuccessfully released session/QoS flow in the first session operation result information, a release request to the unsuccessfully released session/QoS in the first session operation request information is not executed or refused to be executed;

2) for an unsuccessfully operated session/QoS flow in the first session operation result information, the unsuccessfully modified session/QoS flow is released, for example:

for an unsuccessfully modified session/QoS flow in the first session operation result information, the unsuccessfully modified session/QoS flow is released;

the first node can release the unsuccessfully modified session/QoS flow according to the "RELEASE" in the subsequent operation requirements after modification failure of the session/QoS flow; and 3) for a successfully operated session/QoS flow in the first session operation result information, an operation request to the successfully operated session/QoS in the first session operation request information can be accepted or executed.

In some implementations, the first node is a UE; and, the first node can acquire session operation request information from an NAS data packet from the core network node and can acquire session operation result information from the radio access network node (the session operation result information can be the result of an operation performed by the radio access network node according to the session operation request of the UE). Regarding a related session or related QoS flow which is explicitly indicated by the radio access network node to be unsuccessfully operated, the first node does not execute or refuses to execute an operation request to the related session or related QoS flow from the core network, specifically including one of the following situations.

For a session/QoS flow unsuccessfully established by the radio access network, the first node may not execute or refuse to execute an establishment request to the related session.

For a session unsuccessfully modified by the radio access network, the first node can execute at least one of the following: not executing or refusing to execute a modification request to the related session, and releasing the session unsuccessfully modified by the radio access network. The first node can release the unsuccessfully modified session according to the "RELEASE" in the subsequent operation requirements after modification failure of this session.

For a session unsuccessfully released by the radio access network, the first node may not execute or refuse to execute a release request to the related session.

For a QoS flow unsuccessfully established by the radio access network, the first node may not execute or refuse to execute an establishment request to the related QoS flow.

For a QoS flow unsuccessfully modified by the radio access network, the first node can execute at least one of the following: not executing or refusing to execute a modification request to the related QoS flow, and releasing the QoS flow unsuccessfully modified by the radio access network. The first node can release the unsuccessfully modified QoS flow according to the "RELEASE" in the subsequent operation requirements after modification failure of this QoS flow.

For a QoS flow unsuccessfully released by the radio access network, the first node may not execute or refuse to execute a release request to the related QoS flow.

Needless to say:

When the session operation request transmitted by the core network is a request to operate multiple QoS flows in one UE session(for example, modify QoS parameters), the radio access network node may fail to operate some QoS flows. When the radio access network node transmits a session operation request about the UE to the UE (the session operation request about the UE can be contained in an NAS data packet), the session operation result about the UE (for example, QoS flow information of a successfully modified QoS flow or QoS flow information of an unsuccessfully modified QoS flow) on the radio access network side is indicated to the UE; and, according to the session operation result about the UE transmitted by the radio access network, the first node accepts only an operation request to a successfully operated QoS flow indicated by the session operation result about the UE, in other words, refuses to accept an operation request to an unsuccessfully operated QoS flow indicated by the session operation result about the UE.

When the session operation request transmitted by the core network is a request to operate multiple UE sessions (for example, modify QoS parameters), the radio access network node may fail to operate some UE sessions. When the radio access network node transmits a session operation request about the UE to the UE (the session operation request about the UE can be contained in an NAS data packet), the session operation result about the UE (for example, session information of a successfully modified UE session or session information of an unsuccessfully modified UE session) on the radio access network side is indicated to the UE; and, according to the session operation result about the UE transmitted by the radio access network, the first node accepts only a modification request to a successfully modified UE session indicated by the session operation result about the UE, in other words, refuses to accept a modification request to an unsuccessfully modified UE session indicated by the session operation result about the UE.

In some implementations, the first node is radio access network node (e.g., a gNB or a gNB-CU); and, the first node can acquire session operation request information from an NG/N2 (an interface between the 5G core network and the radio access network) interface signaling transmitted by the core network node and can acquire session operation result information (which can be the result of an operation performed by the UE according to the session operation request about the UE) from the UE. For a related session or related QoS flow explicitly indicated by the UE to be unsuccessfully operated, the first node may not execute an operation request to the related session or the related QoS flow from the core network.

For a QoS flow unsuccessfully operated (unsuccessfully established/modified/released) by the first node, an NAS data packet related to this QoS flow is not transmitted to the UE. Needless to say, the core network needs to generate a new NAS data packet and then transmit the new NAS data packet to the UE. The new NAS data packet does not contain the QoS flow unsuccessfully operated by the first node.

For a session unsuccessfully established by the UE, the first node can execute at least one of the following: not executing or refusing an establishment request to the related session, and returning a session establishment failure message to the core network.

For a session unsuccessfully modified by the UE, the first node can execute at least one of the following: not executing or refusing to execute a modification request to the related session, and releasing the session unsuccessfully modified by the radio access network. The first node can release the unsuccessfully modified session according to the "RELEASE" in the subsequent operation requirements after modification failure of this session.

For a session unsuccessfully released by the UE, the first node may not execute or refuse to execute a release request to the related session.

For a QoS flow unsuccessfully established by the UE, the first node can execute at least one of the following: not executing or refusing an establishment request to the related QoS flow, and returning a QoS flow establishment failure message to the core network.

For a QoS flow unsuccessfully modified by the UE, the first node can execute at least one of the following: not executing or refusing to execute a modification request to the related QoS flow, releasing the QoS flow unsuccessfully modified by the UE, and returning a QoS flow modification failure message to the core network. The first node can release the unsuccessfully modified QoS flow according to the "RELEASE" in the subsequent operation requirements after modification failure of this QoS flow.

For a QoS flow unsuccessfully released by the UE, the first node may not execute or refuse to execute a release request to the related QoS flow.

Needless to say:

When the session operation request transmitted by the core network is a request to modify multiple QoS flows in one UE session (for example, modify QoS parameters), the UE may fail to modify some QoS flows. The UE returns session operation result information (e.g., QoS flow information of a successfully modified QoS flow and QoS flow information of an unsuccessfully modified QoS flow) to the core network node by an NAS data packet, and simultaneously returns the session operation result information to the radio access network node through an RRC cell. According to the session operation result about the UE transmitted by the UE, the first node accepts only a modification request to a successfully modified QoS flow indicated by the session operation result about the UE, in other words, refuses to accept a modification request to an unsuccessfully modified QoS flow indicated by the session operation result about the UE. The successfully modified QoS flow in the session operation result about the UE returned to the core network node by the first node is a QoS flow successfully modified by both the UE and the first node.

When the session operation request transmitted by the core network is a request to modify multiple sessions (for example, modify QoS parameters), the UE may fail to modify some sessions. The UE returns session operation result information (e.g., session information of a successfully modified session and session information of an unsuccessfully modified session) to the core network node by an NAS data packet, and simultaneously returns the session operation result information to the first node through an RRC cell. According to the session operation result about the UE transmitted by the UE, the first node accepts only a modification request to a successfully modified session indicated by the session operation result about the UE, in other words, refuses to accept a modification request to an unsuccessfully modified session indicated by the session operation result about the UE. The successfully modified session in the session operation result about the UE returned to the core network node by the first node is a session successfully modified by both the UE and the first node.

In some implementations, the first node is a core network node. The first node can acquire session operation result information from the radio access network node (the session operation result information can be the result of an operation performed by the radio access network node according to the session operation request about the UE). For a related session or related QoS flow explicitly indicated by the radio access network node to be unsuccessfully operated, the first node does not generate an operation request to the related session or the related QoS flow. For example, the first node transmits the session operation request information to the radio access network node and then generates, according to the session operation result information returned by the radio access network node, session operation request information about the UE to be eventually transmitted to the UE. The session operation request information transmitted to the UE by the first node can be contained in an NG interface signaling. The session operation request information transmitted to the UE by the first node can be contained in an NAS data packet.

For a session unsuccessfully established by the radio access network, the first node may not transmit an establishment request to the related session, to the UE.

For a session unsuccessfully modified by the radio access network, the first node can execute at least one of the following: not transmitting a modification request to the related session to the UE, and releasing the session unsuccessfully modified by the radio access network.

For a session unsuccessfully released by the radio access network, the first node may not transmit a release request to the related session to the UE.

For a QoS flow unsuccessfully established by the radio access network, the first node may not transmit an establishment request to the related QoS flow to the UE.

For a QoS flow unsuccessfully modified by the radio access network, the first node can execute at least one of the following: not transmitting a modification request to the related QoS flow to the UE, and releasing the QoS flow unsuccessfully modified by the radio access network.

For a QoS flow unsuccessfully released by the radio access network, the first node may not transmit a release request to the related QoS flow to the UE.

Needless to say, the first node determines, from the radio access network, session operation request information which can be accepted by the radio access network and eventually generates session operation request information to be transmitted to the UE. Thus, the consistency of the session operations about the UE by the UE, the radio access network and the core network can be ensured.

In some implementations, when the first session operation result information meets at least one of the following conditions: the QoS flow is successfully established or the QoS flow is modified successfully; the first node may execute, but not limited to, at least one of the following:

accepting or applying the QoS rule related to the QoS flow (for example, when the QoS profile or QoS parameter of the QoS flow is accepted by a radio access network node, the UE can accept the QoS rule of the QoS flow);

accepting or applying the QoS profile of the QoS flow;

accepting or applying the QoS parameter of the QoS flow;

accepting or applying the updates in the QoS rule related to the QoS flow (for example, when the updates in the QoS profile or the updates in QoS parameter of the QoS flow are accepted by a radio access network node, the UE can accept the updated QoS rule of the QoS flow);

accepting or applying the updates in the QoS profile of the QoS flow; and accepting or applying the updates in the QoS parameter of the QoS flow.

Needless to say, a QoS flow can be transmitted only when the radio access network accepts the QoS flow and radio resources (for example, DRBs) are allocated or mapped according to the requirements on the QoS profile or QoS parameter of the QoS flow. The data of service data flows is mapped to data of QoS flows based on the QoS rule, which is then transmitted.

In some implementations, when the first session operation result information meets at least one of the following conditions: the QoS flow is unsuccessfully established, the QoS flow is unsuccessfully established and the defaulted QoS rule cannot be applied, or the defaulted QoS rule cannot be applied for relevant service data in the unsuccessfully established QoS flow, the first node may execute, but not limited to, at least one of the following:

refusing or not applying the QoS rule related to the QoS flow (the QoS rule related to the QoS flow may be the received QoS rule or the preconfigured QoS rule);

requesting other nodes to refuse or not apply the QoS rule related to the QoS flow (In some implementation, when the first node is an SMF, the SMF may request to refuse or not apply the QoS rule related to the QoS flow. The SMF may transmit also the QoS flow information of the unsuccessfully established QoS flow to the UPF.);

refusing or not applying the QoS rule related to the QoS profile of the QoS flow;

requesting other nodes to refuse, release and/or not apply the QoS rule related to the QoS flow (In some implementations, when the first node is an SMF, the SMF can request the UPF to refuse, release and/or not apply the QoS rule related to the QoS flow. The SMF may transmit also the QoS flow information of the unsuccessfully established QoS flow to the UPF.);

refusing or not applying the QoS profile of the QoS flow;

refusing or not applying the QoS parameter of the QoS flow;

abandoning the data of the QoS flow and/or the data of the service data flow related to the QoS flow (In some implementations, when the first node is a UE and/or a core network node (for example, an SMF or a UPF), the QoS rule related to the QoS flow cannot be applied, and meanwhile, when the defaulted QoS rule cannot be applied, the data of the service data flow related to the QoS flow is abandoned);

requesting other nodes to abandon the data of the QoS flow and/or the data of the service data flow related to the QoS flow (In some implementations, when the first node is an SMF, the SMF can request the UPF to refuse, release and/or not apply the QoS rule related to the QoS flow. The SMF may transmit also the QoS flow information of the unsuccessfully established QoS flow to the UPF.);

temporarily caching the data of the QoS flow and/or the data of the service data flow related to the QoS flow (In some implementations, the first node is a UE. The UE can temporarily cache the data of the service data flow related to the QoS flow. The UE can wait for a further instruction from the core network. The core network may request the UE to release the QoS rule or decrease requirements on the QoS profile, and allocate and/or map radio bearers (for example, DRBs) for the QoS flow. When the radio bearers (for example, DRBs) are mapped, the data of the cached QoS flow or service data flow can be transmitted.);

requesting other nodes (for example, the UPF) to temporarily cache the data of the QoS flow and/or the data of the service data flow related to the QoS flow;

applying the defaulted QoS rule for the data of the service data flow related to the QoS flow;

applying the defaulted QoS rule for the data of the service data flow related to the QoS rule of the QoS flow;

decreasing requirements on the QoS parameter of the QoS flow (In some implementations, when the first node is an SMF, the SMF can decrease requirements on the QoS parameter of the QoS flow and resend the requirements on the QoS parameter to the UE, the UPF and/or the radio access network node. The radio access network node may be able to accept the decreased requirements on the QoS parameter, and allocate radio resources or specify mapped DRBs for the QoS flow. When the DRBs are mapped, the data of the relevant service data flow can be transmitted.);

releasing the relevant configurations of the QoS flow (for example, the QoS profile and/or the QoS rule, etc. In some implementations, when the first node is a UE and/or a core network node (for example, an SMF or a UPF), the QoS profile and/or QoS rule of the QoS flow can be released); and transmitting the data of the QoS flow by a defaulted radio bearer.

Needless to say, due to the limited radio resources or other reasons, the radio access network refuses to accept the QoS flow. That is, it cannot satisfy requirements on the QoS profile of the QoS flow and also the requirements on the QoS parameter of the QoS flow, and it refuses to allocate/map radio bearers for the QoS flow. In this case, it is valueless to map the data of the service data flow to data of the QoS flow based on the QoS rule, so it is abandoned. In case of not mapping based on the QoS rule of the QoS flow, the data of the service data flow can still satisfy the QoS rule and can be transmitted, after being mapped to the data of the QoS flow based on the defaulted QoS rule, by radio resources mapped by the QoS flow related to the defaulted QoS rule. For a service data flow, the data of which cannot be mapped based on the defaulted QoS rule, it may be abandoned or temporarily cached. Temporary caching means that, when the core network node finds that the requirements on the QoS profile or QoS parameter of the QoS flow are too high to be satisfied by the radio access network node, the requirements on the QoS profile or QoS parameter of the QoS flow can be decreased. If the radio access network node can accept the decreased requirements on the QoS profile or QoS parameter of the QoS flow, the radio resources can be allocated or mapped. In this case, the data of the cached service data flow can be mapped to the data of the QoS flow based on the QoS rule of the QoS flow, and then transmitted by the mapped radio resources.

In some implementations, when the first session operation result information meets at least one of the following conditions: the QoS flow is unsuccessfully modified or the defaulted QoS rule cannot be applied for relevant new service data flows in the unsuccessfully modified QoS flow, the first node may execute, but not limited to, at least one of the following:

refusing, not applying and/or releasing the updates in the QoS rule of the QoS flow (In some implementations, the updates in the QoS rule are related to the updates in the QoS profile/QoS parameter. When the radio access network refuses the updates in the QoS profile/QoS parameter of the QoS flow, the UE or the core network can correspondingly refuse the updates in the QoS rule.);

requesting other nodes to refuse and/or release updates in the QoS rule of the QoS flow (In some implementations, when the first node is an SMF, the SMF requests the UPF to refuse, not apply and/or release the updates in the QoS rule of the QoS flow.);

refusing, not applying and/or releasing the QoS rule related to the QoS flow (In some implementations, except for the updated QoS rule, the old QoS rules related to the QoS flow may not be applicable.);

requesting other nodes to refuse, not apply and/or release the QoS rule related to the QoS flow (In some implementation, when the first node is an SMF, the SMF may request the UPF to refuse, not apply and/or release the QoS rule related to the QoS flow. The SMF may transmit also the QoS flow information of the unsuccessfully modified QoS flow to the UPF.);

maintaining the QoS rule of the QoS flow before modification;

requesting other nodes to maintain the QoS rule of the QoS flow before modification (In some implementation, when the first node is an SMF, the SMF may request the UPF to maintain the QoS rule of the QoS flow before modification. The SMF may transmit also the QoS flow information of the QoS flow to the UPF.);

refusing or not applying the updates in the QoS rule related to the updates in the QoS profile or updates in the QoS parameter (For example, some QoS rules contain a QoS parameter of the QoS flow on the UE side. When the QoS parameter is updated, it is needed to update the corresponding QoS rule. When the updates in the QoS parameter are not accepted by the radio access network, the UE and the core network can refuse or not apply the corresponding updates in the QoS rule.);

refusing or not applying the updates in the QoS profile or updates in the QoS parameter of the QoS flow;

maintaining the QoS profile or QoS parameter of the QoS flow before the update;

maintaining the radio bearer (for example, the DRB) mapped by the QoS flow before the update;

abandoning the data of new service data flows related to the updates in the QoS rule of the QoS flow;

requesting other nodes (for example, the UPF) to abandon the data of new service data flows related to the updates in the QoS rule of the QoS flow;

temporarily caching the data of new service data flows related to the updates in the QoS rule of the QoS flow;

requesting other nodes (for example, the UPF) to temporarily cache the data of new service data flows related to the updates in the QoS rule of the QoS flow;

applying the defaulted QoS rule for the data of new service data flows related to the updates in the QoS rule of the QoS flow;

applying the defaulted QoS rule for the new service data flows without any dedicated QoS rule;

lowering requirements on the updated QoS profile or QoS parameter of the QoS flow;

releasing relevant configurations of the QoS flow (for example, the QoS profile and/or QoS rule, etc.); and transmitting the data of the QoS flow by a defaulted radio bearer.

Optionally, after the first node performs a session operation about the UE according to the acquired session operation information about the UE, the first node generates and transmits second session operation result information (the content of the second session operation result information is as described with respect to the session operation result information in the step 301 and will not be repeated here). In some implementations, the second session operation result information can be used for responding to the first session operation result information. Specifically, the step of generating, by the first node, second session operation result information according to the acquired session operation information about the UE can comprise at least one of the following:

1) using sessions/QoS flows in the first session operation request information which are not to be executed or refused to be executed as unsuccessfully operated sessions/QoS flows in the second session operation result information, for example:

using sessions/QoS flows which are not to be established or refused to be established as unsuccessfully established sessions/QoS flows in the second session operation result information;

using sessions/QoS flows which are not to be modified or refused to be modified as unsuccessfully modified sessions/QoS flows in the second session operation result information; and using sessions/QoS flows which are not to be released or refused to be released as unsuccessfully released sessions/QoS flows in the second session operation result information;

2) using sessions/QoS flows in the first session operation request information which can be operated or have been operated successfully as successfully operated sessions/QoS flows in the second session operation result information, for example:

using sessions/QoS flows which can be established or have been established successfully as successfully established sessions/QoS flows in the second session operation result information;

using sessions/QoS flows which can be modified or have been modified successfully as successfully modified sessions/QoS flows in the second session operation result information; and using sessions/QoS flows which can be released or have been released successfully as successfully released sessions/QoS flows in the second session operation result information;

3) using unsuccessfully operated sessions/QoS flows in the acquired first session operation result information as unsuccessfully operated sessions/QoS flows in the second session operation result information; and 4) using successfully operated sessions/QoS flows in the acquired first session operation result information as unsuccessfully operated sessions/QoS flows in the second session operation result information.

In some implementations, the unsuccessfully operated sessions/QoS flows which may be returned by the first node may be as follows: 1) sessions or QoS flows which are operated by the first node but operated unsuccessfully; and, 2) sessions or QoS flows which are refused to be operated by the first node due to the operation failure of other nodes. In order to distinguish the above two situations, an indication, for example, the reason for failure, can be carried in the session information/QoS flow formation of an unsuccessfully operated session/QoS flow. The reason for failure is used for distinguishing whether the operation failure is caused by the reason on the first node side or the reason on the other node side, for example, whether the operation failure is caused by the reason on the UE side or the reason on the radio access network side (for example, insufficient radio resources).

Optionally, after the first node performs a session operation about the UE according to the acquired session operation information about the UE, the first node generates and transmits second session operation request information, wherein, in some implementations, the first node requests to release unsuccessfully modified sessions/QoS flows.

Specifically, the step of generating, by the first node, second session operation request information according to the acquired session operation information about the UE can comprise at least one of the following:

1) not using sessions/QoS flows in the first session operation request information which are not to be executed or refused to be executed as sessions/QoS flows requested to be operated in the second session operation request information, for example:

not using sessions/QoS flows in the first session operation request information which are not to be established or refused to be established as sessions/QoS flows requested to be established in the second session operation request information;

not using sessions/QoS flows in the first session operation request information which are not to be modified or refused to be modified as sessions/QoS flows requested to be modified in the second session operation request information; and not using sessions/QoS flows in the first session operation request information which are not to be released or refused to be released as sessions/QoS flows requested to be released in the second session operation request information;

2) not using sessions/QoS flows in the first session operation request information which are not to be executed or refused to be executed as sessions/QoS flows requested to be released in the second session operation request information, for example:

not using sessions/QoS flows in the first session operation request information which are not to be modified or refused to be modified as sessions/QoS flows requested to be released in the second session operation request information; and 3) using sessions/QoS flows in the first session operation request information which can be operated or have been operated successfully as sessions/QoS flows requested to be operated in the second session operation request information, for example:

using sessions/QoS flows in the first session operation request information which can be established or have been established successfully as sessions/QoS flows requested to be established in the second session operation request information;

using sessions/QoS flows in the first session operation request information which can be modified or have been modified successfully as sessions/QoS flows requested to be modified in the second session operation request information; and using sessions/QoS flows in the first session operation request information which can be released or have been released successfully as sessions/QoS flows requested to be released in the second session operation request information.

Optionally, the second session operation result information or the second session operation request information generated by the first node can be transmitted to at least one of the following: a core network, a radio access network, a gNodeB, a gNodeB-CU, a gNodeB-DU, a UE, a radio access network node, a core network node, a data endpoint, a non-access stratum (e.g., an NA stratum) of a UE, an access stratum (e.g., an AS stratum) of a UE, an application stratum (e.g., an APP stratum) of a UE, a CU, a DU, a core network user plane node, a core network control panel node, a source radio access network node during the movement process of a UE, a target radio access network node during the movement process of a UE, a new radio access network node accessed by a UE in a light connection mode or in an inactive state, an old radio access network node for storing UE context when a UE is in a light connection mode or in an inactive state, a radio access network node of a suspended UE, and a radio access network node to which a UE requests for connection recovery.

Compared with the prior art, in the first embodiment of the present disclosure, by controlling the operation to a session/QoS flow of the UE, the establishment, modification and release operations of the session/QoS flow of the UE by the core network, the radio access network and the UE can be ensured to be consistent, and the core network is prevented from repetitively generating signaling to maintain consistency. Thus, the signaling overhead is reduced, the data transmission efficiency is greatly improved, the delay for the UE to access to a network is greatly reduced, and the operation delay of the session/QoS flow is ensured.

A method for controlling a session operation is provided, comprising the steps of: determining, by a second node, whether a preset condition is satisfied; when it is determined that the preset condition is satisfied, determining, by the second node, second session operation information about a User Equipment (UE), wherein the second session operation information about the UE comprises at least one of the following: second session operation request information and second session operation result information; and, transmitting the determined second session operation information about the UE.

Preferably, the preset condition comprises at least one of the following: a session operation synchronization indication of the UE is acquired; first session operation request information is acquired; and, first session operation result information is acquired; wherein the first session operation result information comprises: the operation result of an operation performed according to the acquired first session operation request information, and/or received session operation result information.

Preferably, the session operation synchronization indication of the UE comprises: an indication of generating session operation request information of the UE, and/or an indication of generating session operation result information of the UE; and, the session operation synchronization indication of the UE is used for indicating that a session operation performed by the second node is the same as an operation performed on a session/QoS flow by the UE.

Preferably, the step of determining, by the second node, second session operation request information and/or second session operation result information of a UE comprises: determining second session operation request information according to an operation performed on the first session operation request information; and/or, determining second session operation result information according to the acquired first session operation result information and/or the result of an operation performed by the second node according to the first session operation request information.

Preferably, the step of determining second session operation request information according to an operation performed in accordance with the first session operation request information specifically comprises at least one of the following: determining second session operation request information according to the result of an operation performed according to the first session operation request information and/or whether the operation requested in the first session operation request information can be accepted; determining second session operation request information according to the acquired session operation synchronization indication of the UE and/or the acquired indication of generating session operation request information of the UE; and, determining a session/QoS flow in the first session operation request information which can be operated or has been operated successfully as a session/QoS flow requested to be operated in the second session operation result information.

Preferably, the step of determining second session operation result information according to the acquired first session operation result information and/or the result of an operation performed by the second node according to the first session operation request information specifically comprises at least one of the following: determining a successfully operated session/QoS flow, which is indicated by both the acquired first session operation result information and the result of an operation performed on the first session operation request information by the second node, as a successfully operated session/QoS flow in the second session operation result information; determining an unsuccessfully operated session/QoS flow, which is indicated by the acquired first session operation result information, as an unsuccessfully operated session/QoS flow in the second session operation result information; determining an unsuccessfully operated session/QoS flow, which is indicated by the result of an operation performed on the first session operation request information by the second node, as an unsuccessfully operated session/QoS flow in the second session operation result information; and, determining the second session operation result information according to the result of UE's operation to the first session operation request information on the UE and that of UE on the second node, and/or the session operation synchronization indication of the UE, and/or the indication of generating session operation result information of the UE.

Preferably, the second node is at least one of the following: a core network, a radio access network, a gNB, a gNB-CU, a gNB-DU, a UE, a radio access network node, a core network node, a data endpoint, a non-access stratum of a UE, an access stratum of a UE, an application stratum of a UE, a Central Control unit (CU), a Distributed Unit (DU), a core network user plane node, a core network control panel node, a source radio access network node during the movement process of a UE, a target radio access network node during the movement process of a UE, a new radio access network node accessed by a UE in a light connection mode or in an inactive state, an old radio access network node for storing UE context when a UE is in a light connection mode or in an inactive state, a radio access network node of a suspended UE, and a radio access network node to which a UE requests for connection recovery. In an embodiment, the second node may include a communication interface (e.g., a transceiver), at least one processor and a memory.

The second node transmits the session operation information of the UE to at least one of the following: a core network, a radio access network, a gNB, a gNB-CU, a gNB-DU, a UE, a radio access network node, a core network node, a data endpoint, a non-access stratum of a UE, an access stratum of a UE, an application stratum of a UE, a Central Control unit (CU), a Distributed Unit (DU), a core network user plane node, a core network control panel node, a source radio access network node during the movement process of a UE, a target radio access network node during the movement process of a UE, a new radio access network node accessed by a UE in a light connection mode or in an inactive state, an old radio access network node for storing UE context when a UE is in a light connection mode or in an inactive state, a radio access network node of a suspended UE, and a radio access network node to which a UE requests for connection recovery.

The technical solutions of the present disclosure will be described below in detail by specific embodiments.

FIG. 16 schematically shows a flowchart of a method for controlling a session operation according to a second embodiment of the present invention. Referring FIG. 16, in step 1610, a second node decides whether a preset condition is satisfied; if so, step 1620 will be executed; and, if not, the method will end. In step 1602, when it is determined that the preset condition is satisfied, the second node determines second session operation information about a UE, wherein the second session operation information about the UE comprises at least one of the following: second session operation request information and second session operation result information. Step 1603: The determined second session operation information about the UE is transmitted.

Specifically, in the step 1601, the second node decides whether a preset condition is satisfied.

Optionally, the preset condition can comprise at least one of the following: a session operation synchronization indication about the UE is acquired; first session operation request information is acquired; and, first session operation result information is acquired.

In some implementations, an operation synchronization indication is acquired while acquiring the first session operation request information.

In some implementations, the acquired first session operation result information is at least one of the following: the operation result of an operation performed by the second node according to the acquired first session operation request information, and the operation result of an operation performed by other nodes according to the first session operation request information, which is received by the second node.

Optionally, the session operation synchronization indication about the UE means that the session operations about the UE performed by the radio access network node and the UE are kept consistent. For example, for a session/QoS flow unsuccessfully operated by the radio access network node, the UE may not execute an operation to the related session/QoS flow; for a session/QoS flow unsuccessfully operated by the UE, the radio access network node may not execute an operation to the related session/QoS flow; and, a successfully operated session/QoS flow is a session/QoS flow successfully operated by both the radio access network and the UE.

In some implementations, the operation synchronization indication can further contain one of the following:

an indication of generating session operation request information about the UE, which can be used for indicating to generate second session operation request information according to the acquired first session operation result information, wherein, in some implementations, the acquired first session operation result information can be the result of an operation performed by the first node according to the first session request information or the received session operation result information (for example, result information of an operation performed by other nodes according to the first session request information); and an indication of generating session operation result information about the UE, which can be used for indicating to generate second session operation request information according to the acquired first session operation result information, wherein, in some implementations, the acquired first session operation result information can be the result of an operation performed by the first node according to the first session request information or the received session operation result information (for example, result information of an operation performed by other nodes according to the first session request information).

With respect to the "indication of generating session operation request information about the UE", when the second node is a radio access network node, needless to say, for a session/QoS flow which has been operated successfully or can be operated successfully by the second node, the second node can transmit an operation request to the related session/QoS flow to the UE; and, for a session/QoS flow which has been operated unsuccessfully or cannot be operated successfully by the second node, the second node may not transmit an operation request to the related session/QoS flow to the UE.

With respect to the "indication of generating session operation result information about the UE", when the second node is a radio access network, needless to say, for a session/QoS flow which has been operated successfully or can be operated successfully by both the UE and the second node, the related session/QoS flow contained in the second session operation result information transmitted to the core network node by the second node is a successfully operated session/QoS flow. For a session/QoS flow which has been operated unsuccessfully or cannot be operated successfully by the UE or the second node, the related session/QoS flow contained in the second session operation result information transmitted to the core network node by the second node is an unsuccessfully operated session/QoS flow.

Optionally, the second node can be at least one of the following: a core network, a radio access network, a gNodeB, a gNodeB-CU, a gNodeB-DU, a UE, a radio access network node, a core network node, a data endpoint, a non-access stratum (e.g., an NA stratum) of a UE, an access stratum (e.g., an AS stratum) of a UE, an application stratum (e.g., an APP stratum) of a UE, a CU, a DU, a core network user plane node, a core network control panel node, a source radio access network node during the movement process of a UE, a target radio access network node during the movement process of a UE, a new radio access network node accessed by a UE in a light connection mode or in an inactive state, an old radio access network node for storing UE context when a UE is in a light connection mode or in an inactive state, a radio access network node of a suspended UE, and a radio access network node to which a UE requests for connection recovery.

Specifically, in the step 1602, when it is determined that the preset condition is satisfied, the second node determines second session operation information about a User Equipment (UE), wherein the second session operation information about the UE comprises at least one of the following: second session operation request information and second session operation result information.

Specifically:

The second node can determine second session operation request information according to an operation performed on the first session operation request information; and, the operation performed by the second node according to the first session operation request information can be an operation which has been completed by the first node or an operation which can be accepted.

The second node can determine second session operation result information according to the acquired first session operation result information and/or the result of an operation performed on the first session operation request information by the second node.

Specifically, the step of determining, by the second node, second session operation request information according to an operation performed in accordance with the first session operation request information can comprise at least one of the following:

1) not using sessions/QoS flows in the first session operation request information which are executed unsuccessfully or refused to be executed as sessions/QoS flows requested to be operated in the second session operation request information, for example:

not using sessions/QoS flows in the first session operation request information which are established unsuccessfully or refused to be established as sessions/QoS flows requested to be established in the second session operation request information;

not using sessions/QoS flows in the first session operation request information which are modified unsuccessfully or refused to be modified as sessions/QoS flows requested to be modified in the second session operation request information; and not using sessions/QoS flows in the first session operation request information which are released unsuccessfully or refused to be released as sessions/QoS flows requested to be released in the second session operation request information;

2) not using sessions/QoS flows in the first session operation request information which are executed unsuccessfully or refused to be executed as sessions/QoS flows requested to be released in the second session operation request information, for example:

using sessions/QoS flows in the first session operation request information which are not to be modified or refused to be modified as sessions/QoS flows requested to be released in the second session operation request information; and 3) using sessions/QoS flows in the first session operation request information which can be operated or have been operated successfully as sessions/QoS flows requested to be operated in the second session operation request information, for example:

using sessions/QoS flows in the first session operation request information which can be established or have been established successfully as sessions/QoS flows requested to be established in the second session operation request information;

using sessions/QoS flows in the first session operation request information which can be modified or have been modified successfully as sessions/QoS flows requested to be modified in the second session operation request information; and using sessions/QoS flows in the first session operation request information which can be released or have been released successfully as sessions/QoS flows requested to be released in the second session operation request information.

Specifically, the step of determining, by the second node, second session operation result information according to the acquired first session operation result information and/or the result of an operation performed by the second node on the first session operation request information can comprise at least one of the following:

1) determining a successfully operated session/QoS flow as a successfully operated session/QoS flow in the second session operation result information, which is indicated by both the received first session operation result information and the result of an operation performed by the second node on the first session operation request information;

2) determining an unsuccessfully operated session/QoS flow as an unsuccessfully operated session/QoS flow in the second session operation result information, which is indicated by the received first session operation result information; and 3) determining an unsuccessfully operated session/QoS flow as an unsuccessfully operated session/QoS flow in the second session operation result information, which is indicated by the result of an operation performed by the second node on the first session operation request information.

Optionally, the first session operation request information and the second session operation request information can contain the same contents as the session operation request information in the step 1510, and will not be repeated here.

Optionally, the first session operation result information and the second session operation result information can contain the same contents as the session operation result information in the step 1510, and will not be repeated here.

In some implementations, the first/second session operation result information is the result of an operation which has been completed or the result of an operation which can be completed, wherein the result of an operation which can be completed can mean that the operation can be completed but has not yet been completed actually.

With respect to "the second node can determine second session operation request information according to an operation performed on the first session operation request information", in some implementations, the second node is a radio access network node (e.g., a gNB or a gNB-CU). The second node can acquire the first session operation request information from an NG interface signaling transmitted by the core network node. First, according to the session operation request of the UE, the second node determines to perform an operation or decides whether to accept the requested operation. The second node generates final second session operation request information according to the session operation result of the UE performed by the second node. The second node may transmit, to the UE, only an operation request to a session/QoS flow, which has been operated successfully or can be operated successfully on the second node side, in other words, may not transmit, to the UE, an operation request to a session/QoS flow, which has been operated unsuccessfully or cannot be operated on the second node side. Needless to say, the session operation request about the UE transmitted to the radio access network by the core network does not contain the NAS data packet requested to be transmitted to the UE. Instead, it is required that the radio access network node generates, according to the operation result of the radio access network node, second session operation request information to be eventually transmitted to the UE. Thus, it can be ensured that the session operation requests about the UE from the UE and the radio access network node are consistent.

With respect to "the second node can determine second session operation result information according to the acquired first session operation result information and/or the result of an operation performed by the second node according to the first session operation request information", in some implementations, the second node is a radio access network node (e.g., a gNB or a gNB-CU). The second node can acquire, from a cell in the RRC message transmitted by the UE, the first session operation result information (which can be the result of an operation performed by the UE according to the session operation request about the UE). The second node generates final second session operation request information according to the session operation result about the UE on the UE side and the radio access network side. The successfully operated session/QoS flow contained in the final session operation result about the UE is a session/QoS flow successfully operated by both the UE and the second node; and, the unsuccessfully operated session/QoS flow contained in the final session operation result about the UE may be a session/QoS flow unsuccessfully operated on the UE side or on the second node side, and the operation failure on the UE side or the operation failure on the radio access network side can be distinguished by different reasons. The second node can return the final second session operation result information to the core network. Needless to say, since the successfully operated session or QoS flow returned to the core network by the second node is a really successful QoS flow or session, the UE does not need to return an NAS data packet. It is avoided that the core network needs to trigger signaling to maintain synchronization when finding inconsistent operation results of the UE and the second node.

Specifically, in the step 1630, the second node transmits the determined session operation information about the UE.

Optionally, the second session operation information about the UE can comprise at least one of the following: second session operation request information and second session operation result information.

Optionally, the second node can transmit the determined session operation information about the UE to at least one of the following: a radio access network node, a core network node, a data endpoint, a UE, a non-access stratum (e.g., an NA stratum) of a UE, an access stratum (e.g., an AS stratum) of a UE, an application stratum (e.g., an APP stratum) of a UE, a CU, a DU, a core network user plane node, a core network control panel node, a source radio access network node during the movement process of a UE, a target radio access network node during the movement process of a UE, a new radio access network node accessed by a UE in a light connection mode or in an inactive state, an old radio access network node for storing UE context when a UE is in a light connection mode or in an inactive state, a radio access network node of a suspended UE, and a radio access network node to which a UE requests for connection recovery.

The embodiments of the present disclosure will be presented and described below more intuitively and specifically by specific application scenarios in different circumstances, so that it is convenient for those skilled in the art to thoroughly understand the technical solutions in the embodiments of the present disclosure.

A first specific application scenario of the present disclosure, i.e., session establishment, is shown in FIG. 17. FIG. 17 schematically shows a signaling flow diagram of an operation process in the method for controlling a session operation in a first application scenario of the present invention.

Step 1710: A UE transmits an NAS data packet to an AMF. The NAS data packet contains a PDU session establishment request message. The operation flows between the AMF and a core network, for example, an SMF, will be omitted. As an implementation, the SMF accepts a PDU session establishment request from the UE and then transmits the PDU session establishment request to the AMF.

Step 1720: The AMF transmits an NG interface PDU session resource establishment request message to a gNB (i.e., gNodeB). Optionally, this message contains at least one of the following: session operation request information (containing session information of PDU sessions (PDU session 1 and PDU session 2) requested to be established, and the NAS data packet (corresponding to an establishment acceptation message of multiple PDU sessions (PDU session 1 and PDU session 2)).

As an implementation, the gNB can accept only the establishment of the PDU session 1, but not the establishment of the PDU session 2.

Step 1730: The gNB transmits an RRC message to the UE. Optionally, this message contains at least one of the following: the NAS data packet, session operation result information (for example, session information of the successfully established PDU session (PDU session 1) or session information of the unsuccessfully established PDU session (PDU session 2)) on the gNB side, and DRB configuration related to the PDU session 1.

The UE configures (PDU session 1 and PDU session 2) according to the PDU session establishment acceptation message indicated by the received NAS data packets. The UE can perform establishment configuration only on the PDU session 1 according to the session operation result information on the gNB side, as described in the step 1502.

Step 1740: The gNB returns an NG interface PDU session establishment response message to the AMF. Optionally, this message can contain at least one of the following: the session operation result about the UE (for example, session information of the successfully established PDU session 1 and session information of the unsuccessfully established PDU session 2)returned by the gNB, and the NAS data packet.

Step 1750: Optionally, the UE returns an RRC message to the gNB. Optionally, this message contains at least one of the following: the NAS data packet, and session operation result information (for example, session information of the successfully established PDU session (PDU session 1) or session information of the PDU session (PDU session 2) refused to be established (the reason is a reason on the radio access network side)) on the UE side. If the NAS data packet is returned, the PDU session establishment completion message in the NAS data packet can contain one of the following: the PDU session 1 is established successfully, and the PDU session 2 is established unsuccessfully because of a reason on the radio access network side.

Step 1760: Optionally, the gNB returns an NG interface uplink NAS delivery message to the AMF. Optionally, this message can contain at least one of the following: the NAS data packet from the UE.

It can be known from the embodiments that the session operation results about the UE returned by the gNB and by the UE are consistent, i.e.: the PDU session 1 is established successfully and the PDU session 2 is established unsuccessfully.

A second specific application scenario of the present disclosure, i.e., session release, is shown in FIG. 18. FIG. 18 schematically shows a signaling flow diagram of an operation process in the method for controlling a session operation in a second application scenario of the present invention.

Step 1810: An AMF transmits an NG interface PDU session release request message to a gNB. Optionally, this message contains at least one of the following: session operation request information (containing session information of PDU sessions (PDU session 1 and PDU session 2) requested to be released, and an NAS data packet (corresponding to a release request to multiple PDU sessions (PDU session 1 and PDU session 2)).

As an implementation, the gNB can accept only the release of the PDU session 1, but not the release of the PDU session 2.

Step 1820: The gNB transmits an RRC message to a UE. Optionally, this message contains at least one of the following: the NAS data packet, and session operation result information (for example, session information of the successfully released PDU session 1 or session information of the unsuccessfully released PDU session 2) on the gNB side.

The UE releases the PDU session 1 and the PDU session 2 according to the PDU session release request indication indicated by the received NAS data packet. The UE can perform only a release operation on the PDU session 1 according to the session operation result information on the gNB side, as described in the step 1820.

Step 1830: The gNB returns an NG interface PDU session release response message to the AMF. Optionally, this message contains the session operation result about the UE (for example, session information of the successfully released PDU session 1 and session information of the unsuccessfully released PDU session 2) returned by the gNB, and the NAS data packet.

Step 1840: The UE returns an RRC message to the gNB. Optionally, this message contains at least one of the following: the NAS data packet, and session operation result information (for example, session information of the successfully released PDU session 1 or session information of the PDU session 2 refused to be released) on the UE side. The PDU session release response in the returned NAS data packet contains the following situations: the UE accepts the release of the PDU session 2 and refuses the release of the PDU session 2. The gNB can know, according to the session operation result information on the UE side, that only the PDU session 1 is successfully released eventually, as described in the step 1520.

Step 1850: Optionally, the gNB returns an NG interface uplink NAS delivery message to the AMF. Optionally, this message can contain at least one of the following: the NAS data packet from the UE.

It can be known from the second application scenario that the session operation results about the UE returned by the gNB and the UE are consistent, i.e.: the PDU session 1 is released successfully and the PDU session 2 is released unsuccessfully.

A third specific application scenario of the present disclosure is as shown in FIG. 19. FIG. 19 schematically shows a signaling flow diagram of an operation process in the method for controlling a session operation in a third application scenario of the present invention.

Step 1910: An AMF transmits an NG interface PDU session resource modification request message to a gNB. Optionally, this message contains at least one of the following: session operation request information (for example, session information of PDU sessions (for example, PDU session 1, PDU session 2 and PDU session 3) requested to be modified, and an NAS data packet (corresponding to a modification request to multiple PDU sessions (PDU session 1, PDU session 2 and PDU session 3)).

As an implementation, the gNB can accept only the modification of the PDU session 1 and the PDU session 3, but not the modification of the PDU session 2.

Step 1920: The gNB transmits an RRC message to a UE. Optionally, this message contains at least one of the following: the NAS data packet, and session operation result information (for example, session information of the successfully modified PDU sessions (PDU session 1 and PDU session 3) or session information of the unsuccessfully modified PDU session (PDU session 2)) on the gNB side.

Step 1930: The UE modifies the PDU session 1, the PDU session 2 and the PDU session 3 according to the PDU session modification request indication indicated by the received NAS data packet. The UE can perform only a modification operation on the PDU session 1 and the PDU session 3 according to the session operation result information on the gNB side. The specific process is as described in the step 1520 in the first embodiment of the present disclosure. As an implementation, the UE can accept only the modification of the PDU session 1, but not the modification of the PDU session 3.

Step 1940: The gNB returns an NG interface PDU session modification response message to the AMF. Optionally, this message contains the session operation result about the UE (for example, session information of the successfully modified PDU session (PDU session 1) or session information of the unsuccessfully modified PDU sessions (PDU session 2 and PDU session 3) returned by the gNB, and the NAS data packet (returned by the UE).

Step 1950: The UE returns an RRC message to the gNB. Optionally, this message contains at least one of the following: the NAS data packet, and session operation result information (for example, session information of the successfully modified PDU session (PDU session 1), session information of the PDU session (PDU session 2) refused to be modified, and/or session information of the unsuccessfully modified PDU session (PDU session 3 and/or PDU session 2)) on the UE side. The PDU session modification response in the returned NAS data packet contains the following situations: the UE accepts the modification of the PDU session 1 and refuses the modification of the PDU session 2 and the PDU session 3. The gNB can know, according to the session operation result information on the UE side, that only the PDU session 1 is successfully modified eventually, as described in the step 1520.

Step 1960: Optionally, the gNB returns an NG interface uplink NAS delivery message to the AMF. Optionally, this message can contain at least one of the following: the NAS data packet from the UE.

It can be known from the third application scenario that the session operation results about the UE returned by the gNB and the UE are consistent, i.e.: the PDU session 1 is modified successfully and the PDU session 2 and the PDU session 3 are modified unsuccessfully.

A fourth specific application scenario of the present disclosure is as shown in FIG. 20. FIG. 20 schematically shows a signaling flow diagram of an operation process in the method for controlling a session operation in a fourth application scenario of the present invention.

Step 2010: An AMF transmits an NG interface PDU session modification request message to a gNB. Optionally, this message contains at least one of the following: session operation request information (for example, QoS flow information of QoS flows (for example, QoS flow 1, QoS flow 2 and QoS flow 3) requested to be modified, and an NAS data packet (corresponding to a modification request to multiple QoS flows (QoS flow 1, QoS flow 2 and QoS flow 3) in a same PDU session).

As an implementation, the gNB can accept only the modification of the QoS flow 1 and the QoS flow 3, but not the modification of the QoS flow 2.

Step 2020: The gNB transmits an RRC message to a UE. Optionally, this message contains at least one of the following: the NAS data packet, and session operation result information (for example, QoS flow information of the successfully modified QoS flows (QoS flow 1 and QoS flow 3) or session information of the unsuccessfully modified QoS flow (QoS flow 2)) on the gNB side.

Step 2030: The UE modifies the QoS flow 1, the QoS flow 2 and the QoS flow 3 according to the PDU session modification request indication indicated by the received NAS data packet. The UE can perform only a modification operation on the QoS flow 1 and the QoS flow 3 according to the session operation result information on the gNB side, as described in the step 1520. As an implementation, the gNB can accept only the modification of the QoS flow 1, but not the modification of the QoS flow 3.

Step 2040: The gNB returns an NG interface PDU session modification response message to the AMF. Optionally, this message contains the session operation result about the UE (for example, QoS flow information of the successfully modified QoS flow (QoS flow 1) or information of the unsuccessfully released QoS flows (QoS flow 2 and QoS flow 3) returned by the gNB, and the NAS data packet (returned by the UE).

Step 2050: The UE returns an RRC message to the gNB. Optionally, this message contains at least one of the following: the NAS data packet, and session operation result information (for example, QoS flow information of the successfully modified QoS flow (QoS flow 1), QoS flow information the QoS flow (QoS flow 2) refused to be modified, and/or QoS flow information of the unsuccessfully modified QoS flows (QoS flow 3 and/or QoS flow 2)) on the UE side. The PDU session modification response in the returned NAS data packet contains the following situations: the UE accepts the modification of the QoS flow 1 and refuses the modification of the QoS flow 2 and the QoS flow 3. The gNB can know, according to the session operation result information on the UE side, that only the QoS flow 1 is successfully modified eventually, as described in the step 1520.

Step 2060: Optionally, the gNB returns an NG interface uplink NAS delivery message to the AMF. Optionally, this message can contain at least one of the following: the NAS data packet from the UE.

It can be known from the fourth application scenario that the session operation results about the UE returned by the gNB and the UE are consistent, i.e.: the QoS flow 1 is modified successfully and the QoS flow 2 and the QoS flow 3 are modified unsuccessfully.

A fifth specific application scenario of the present disclosure is also as shown in FIG. 19, but the specific operation process is slightly different from the third application scenario and will be specifically described below.

Step 1910: An AMF transmits an NG interface PDU session modification request message to a gNB. Optionally, this message contains at least one of the following: session operation request information (for example, session information of PDU sessions (for example, PDU session 1, PDU session 2 and PDU session 3) requested to be modified, and an NAS data packet (corresponding to a modification request to multiple PDU sessions (PDU session 1, PDU session 2 and PDU session 3)). It is assumed that the subsequent operation after modification failure of the PDU session 1, the PDU session 2 and the PDU session 3 is RELEASE, and the subsequent operation after modification failure may be contained in the NAS data packet or the NG interface PDU session modification request message.

As an implementation, the gNB can accept only the modification of the PDU session 1 and the PDU session 3, but not the modification of the PDU session 2. The gNB can release resources (for example, NG interface resources or radio resources) for the PDU session 2, as described in the step 1520.

Step 1920: The gNB transmits an RRC message to a UE. Optionally, this message contains at least one of the following: the NAS data packet, session operation result information (for example, session information of the successfully modified PDU sessions (PDU session 1 and PDU session 3) or session information of the unsuccessfully modified PDU session (PDU session 2)) on the gNB side, and session operation request information (for example, session information of the PDU session (PDU session 2) requested to be released and/or DRB established by the PDU session 2 requested to be released) on the gNB side.

Step 1930: The UE modifies the PDU session 1, the PDU session 2 and the PDU session 3 according to the PDU session modification request indication indicated by the received NAS data packet. According to the session operation result information on the gNB side and/or the session operation request information on the gNB side, the UE can perform a modification operation on the PDU session 1 and the PDU session 3 and perform a release operation on the PDU session 2, as described in the step 1502. As an implementation, the UE can accept only the modification of the PDU session 1, but not the modification of the PDU session 3, so that the UE can release the resources and configuration (for example, radio resource DRBs) for the PDU session 2, as described in the step 1520.

Step 1940: The gNB returns an NG interface PDU session modification response message to the AMF. Optionally, this message contains the session operation result about the UE (for example, session information of the successfully modified PDU session (PDU session 1) or session information of the modified unsuccessfully or released PDU sessions (PDU session 2 and PDU session 3) returned by the gNB, and the NAS data packet (returned by the UE). The AMF transmits the corresponding information to an SMF, so that the SMF can control the resource release of the PDU session 2 and the PDU session 3 on the CN side.

Step 1950: The UE returns an RRC message to the gNB. Optionally, this message contains at least one of the following: the NAS data packet, session operation result information (for example, session information of the successfully modified PDU sessions (PDU session 1), session information of the unsuccessfully modified PDU session (PDU session 3) and/or session information of the successfully released PDU session (PDU session 2)) on the UE side, and session operation request information (for example, session information of the PDU session (PDU session 3) requested to be released) on the UE side. The PDU session modification response in the returned NAS data packet contains the following situations: the UE accepts the modification of the PDU session 1 and releases the PDU session 2 and the PDU session 3. The gNB can know, according the session operation result information on the UE side and/or the session operation request information on the UE side, that only the PDU session 1 is successfully modified eventually and the radio resources for the PDU session 3 need to be released, as described in the step 1520. Hence, the gNB can release resources (for example, NG interface resources or radio resources) for the PDU session 3, as described in the step 1520.

Step 1960: Optionally, the gNB returns an NG interface uplink NAS delivery message to the AMF. Optionally, this message can contain at least one of the following: the NAS data packet from the UE.

It can be known from the fifth application scenario that the session operation results about the UE returned by the gNB and the UE are consistent, i.e.: the PDU session 1 is modified successfully and the PDU session 2 and the PDU session 3 are released after modification failure.

A sixth specific application scenario of the present disclosure is also as shown in FIG. 20, but the specific operation process is slightly different from the fourth application scenario and will be specifically described below.

Step 2010: An AMF transmits an NG interface PDU session modification request message to a gNB. Optionally, this message contains at least one of the following: session operation request information (for example, QoS flow information of QoS flows (for example, QoS flow 1, QoS flow 2 and QoS flow 3) requested to be modified, and an NAS data packet (corresponding to a modification request to multiple QoS flows (QoS flow 1, QoS flow 2 and QoS flow 3) in a same PDU session). It is assumed that the subsequent operation after modification failure of the QoS flow 1, the QoS flow 2 and the QoS flow 3 is RELEASE, and the subsequent operation after modification failure may be contained in the NAS data packet or the NG interface PDU session modification request message. As an implementation, the gNB can accept only the modification of the QoS flow 1 and the QoS flow 3, but not the modification of the QoS flow 2. The gNB can release the resources for the QoS flow 2 (for example, unbind the DRBs), as described in the step 1520.

Step 2020: The gNB transmits an RRC message to a UE. Optionally, this message contains at least one of the following: the NAS data packet, session operation result information (for example, QoS flow information of the successfully modified QoS flows (QoS flow 1 and QoS flow 3) and/or QoS flow information of the unsuccessfully modified QoS flow (QoS flow 2)) on the gNB side, and session operation request information (for example, QoS flow information of the QoS flow (QoS flow 2) requested to be released and/or DRBs requested to be unbound with the QoS flow) on the gNB side.

Step 2030: The UE modifies the QoS flow 1, the QoS flow 2 and the QoS flow 3 according to the PDU session modification request indication indicated by the received NAS data packet. The UE can perform only a modification operation on the QoS flow 1 and the QoS flow 3 according to the session operation result information on the gNB side and/or the session operation request information on the gNB side, as described in the step 1520. As an implementation, the UE can accept only the modification of the QoS flow 1, but not the modification of the QoS flow 3. Hence, the UE can release the resources and configuration (for example, the binding with the DRBs) for the QoS flow 3, as described in the step 1520.

Step 2040: The gNB returns an NG interface PDU session modification response message to the AMF. Optionally, this message contains the session operation result about the UE (for example, session information of the successfully modified QoS flow (QoS flow 1) or session information of the modified unsuccessfully or released QoS flows (QoS flow 2 and QoS flow 3) returned by the gNB, and the NAS data packet (returned by the UE). The AMF transmits the corresponding session information to an SMF, so that the SMF can control the resource release of the QoS flow 2 and the QoS flow 3 on the CN side.

Step 2050: The UE returns an RRC message to the gNB. Optionally, this message contains at least one of the following: the NAS data packet, session operation result information (for example, QoS flow information of the successfully modified QoS flow (QoS flow 1), QoS flow information of the QoS flow (QoS flow 2) refused to be modified, QoS flow of the unsuccessfully modified QoS flows (QoS flow 3 and/or QoS flow 2), and/or QoS flow information of the released QoS flows (QoS flow 3 and/or QoS flow 2)) on the UE side, and session operation request information (for example, QoS flow information of the QoS flow (QoS flow 3) requested to be released) on the UE side. The PDU session modification response in the returned NAS data packet contains the following situations: the UE accepts the modification of the QoS flow 1 and releases the QoS flow 2 and the QoS flow 3. The gNB can know, according the session operation result information on the UE side and/or the session operation request information on the UE side, that only the QoS flow 1 is successfully modified eventually and the radio resources for the QoS flow need to be released, as described in the step 1520. Hence, the gNB can release the resources for the QoS flow 3 (for example, unbinding the QoS flow 3 with the previous DRBs, where QoS flows bound with the DRBs do not include the QoS flow 3), as descried in the step 1520.

Step 2060: Optionally, the gNB returns an NG interface uplink NAS delivery message to the AMF. Optionally, this message can contain at least one of the following: the NAS data packet from the UE.

It can be known from the sixth application scenario that the session operation results about the UE returned by the gNB and the UE are consistent, i.e.: the QoS flow 1 is modified successfully and the QoS flow 2 and the QoS flow 3 are released after modification failure.

A seventh specific application scenario of the present disclosure is as shown in FIG. 21. FIG. 21 schematically shows a signaling flow diagram of an operation process in the method for controlling a session operation in a fifth application scenario of the present invention.

Step 2110: An AMF transmits an NG interface PDU session modification request message to a gNB. Optionally, this message contains at least one of the following: session operation request information of PDU sessions (for example, PDU session 1, PDU session 2 and PDU session 3) requested to be modified, and a session operation synchronization indication about a UE. As an implementation, the gNB can accept only the modification of the PDU session 1 and the PDU session 3, but not the modification of the PDU session 2.

Step 2120: The gNB transmits an RRC message to a UE. Optionally, this message contains at least one of the following: session operation request information (for example, session information of the PDU session (PDU session 1) requested to be modified) on the gNB side.

The UE can perform only a modification operation on the PDU session 1 and the PDU session 3 according to the session operation request information on the gNB side, as described in the step 1520. As an implementation, the UE can accept only the modification of the PDU session 1, but not the modification of the PDU session 3.

Step 2130: The UE returns an RRC message to the gNB. Optionally, this message contains at least one of the following: session operation result information (for example, session information of the successfully modified PDU session (PDU session 1) or session information of the unsuccessfully modified PDU session (PDU session 3)) on the UE side. The gNB can know, according to the session operation result information on the UE side, that only the PDU session 1 is successfully modified eventually, as described in the step 1610.

Step 2140: The gNB returns an NG interface PDU session modification response message to the AMF. This message contains the session operation result about the UE (for example, session information of the successfully modified PDU session (PDU session 1) or session information of the unsuccessfully modified PDU sessions (PDU session 2 and PDU session 3)) returned by the gNB.

It can be known from the seventh application scenario that the operations between the UE and the core network may not be controlled by an NAS data packet, and the gNB directly keeps the session operation results about the UE returned by the UE and by the gNB consistent, i.e.: the PDU session 1 is modified successfully and the PDU session 2 and the PDU session 3 are modified unsuccessfully.

An eighth specific application scenario of the present disclosure is as shown in FIG. 22. FIG. 22 schematically shows a signaling flow diagram of an operation process of the method for controlling a session operation in an eighth application scenario of the present invention.

Step 2210: An AMF transmits an NG interface PDU session modification request message to a gNB. Optionally, this message contains at least one of the following: session operation request information of QoS flows (for example, QoS flow 1, QoS flow 2 and QoS flow 3) requested to be modified, and a session operation synchronization indication about a UE.

As an implementation, the gNB can accept only the modification of the QoS flow 1 and the QoS flow 3, but not the modification of the QoS flow 2.

Step 2220: The gNB transmits an RRC message to a UE. Optionally, this message contains at least one of the following: an NAS data packet, and session operation request information (for example, QoS flow information of QoS flows (QoS flow 1 and QoS flow 3) requested to be modified) on the gNB side.

The UE can perform only a modification operation on the QoS flow 1 and the QoS flow 3 according to the session operation request information on the gNB side. The specific process is as described in the step 1520 in the first embodiment of the present disclosure. As an implementation, the UE can accept only the modification of the QoS flow 1, but not the modification of the QoS flow 3.

Step 2230: The UE returns an RRC message to the gNB. Optionally, this message contains at least one of the following: session operation result information (QoS flow information of the successfully modified QoS flow (QoS flow 1) and/or QoS flow information of the unsuccessfully modified QoS flow (QoS flow 3)) on the UE side. The gNB can know, according to the session operation result information on the UE side, that only the QoS flow 1 is successfully modified eventually, as described in the step 1610.

Step 2240: The gNB returns an NG interface PDU session modification response message to the AMF. This message contains the session operation result about the UE (for example, QoS flow information of the successfully modified QoS flow (QoS flow 1) and session information of the unsuccessfully modified QoS flows (QoS flow 1 and QoS flow 3) returned by the gNB.

It can be known from the eighth application scenario that the operations between the UE and the core network may not be controlled by an NAS data packet, and the gNB directly maintains the session operation results about the UE returned by the UE and by the gNB to be consistent, i.e.: the QoS flow 1 is modified successfully and the QoS flow 2 and the QoS flow 3 are modified unsuccessfully.

A ninth specific application scenario of the present disclosure is also as shown in FIG. 21, but the specific operation process is slightly different from the seventh application scenario and will be specifically described below.

As shown in FIG. 21, FIG. 21 is a schematic diagram of the ninth specific application scenario of the method for a session operation of a user equipment according to the present disclosure.

Step 2110: An AMF transmits an NG interface PDU session modification request message to a gNB. Optionally, this message contains at least one of the following: session operation request information of PDU sessions (for example, PDU session 1, PDU session 2 and PDU session 3) requested to be modified, and a session operation synchronization indication about a UE. It is assumed that the subsequent operation after modification failure of the PDU session 1, the PDU session 2 and the PDU session 3 is set as RELEASE. The subsequent operation after modification failure may be contained in an NAS data packet or the NG interface PDU session modification request message.

As an implementation, the gNB can accept only the modification of the PDU session 1 and the PDU session 3, but not the modification of the PDU session 2. Hence, the gNB can release resources (for example, NG interface resources or radio resources) for the PDU session 2. The specific process is as described in the step 1520 in the first embodiment of the present disclosure.

Step 2120: The gNB transmits an RRC message to a UE. Optionally, this message contains at least one of the following: session operation request information (for example, session information of the PDU sessions (PDU session 1 and PDU session 3) requested to be modified, session information of the PDU session (PDU session 2) requested to be released, and/or DRB established by the PDU session 2 requested to be released) on the gNB side.

According to the session operation result information on the gNB side, the UE can perform only a modification operation on the PDU session 1 and the PDU session 3 and perform a release operation on the PDU session 2. The specific process is as described in the step 1520 in the first embodiment of the present disclosure. As an implementation, the UE can accept only the modification of the PDU session 1, but not the modification of the PDU session 3, so that the UE can release the resources and configuration (for example, radio resource DRBs) for the PDU session 2, as described in the step 1520.

Step 2130: The UE returns an RRC message to the gNB. Optionally, this message contains at least one of the following: session operation result information (for example, session information of the successfully modified PDU session (PDU session 1), session information of the unsuccessfully modified PDU session (PDU session 3) and/or session information of the successfully released PDU session (PDU session 2)) on the UE side. The gNB can know, according to the session operation result information on the UE side, that only the PDU session 1 is successfully modified eventually and the radio resources for the PDU session 3 need to be released, as described in the step 1520. Hence, the gNB can release resources (for example, NG interface resources or radio resources) for the PDU session 3, as described in the step 1520.

Step 2140: The gNB returns an NG interface PDU session modification response message to the AMF. Optionally, this message contains the session operation result about the UE (for example, session information of the successfully modified PDU session (PDU session 1) or session information of the modified unsuccessfully or released PDU sessions (PDU session 2 and PDU session 3)) returned by the gNB. The AMF transmits the corresponding information an SMF, so that the SMF can control the resource release of the PDU session 2 and the PDU session on the CN side.

It can be known from the ninth application scenario that the operations between the UE and the core network may not be controlled by an NAS data packet, and the gNB directly maintains the session operation results about the UE returned by the UE and by the gNB to be consistent, i.e.,: the PDU session 1 is modified successfully and the PDU session 2 and the PDU session 3 are realized after modification failure.

A tenth specific application scenario of the present disclosure is also as shown in FIG. 22, but the specific operation process is slightly different from the eighth application scenario and will be specifically described below.

Step 2210: An AMF transmits an NG interface PDU session modification request message to a gNB. Optionally, this message contains at least one of the following: session operation request information of QoS flows (for example, QoS flow 1, QoS flow 2 and QoS flow 3) requested to be modified, and a session operation synchronization indication about a UE. It is assumed that the subsequent operation after modification failure of the QoS flow 1, the QoS flow 2 and the QoS flow 3 is set as RELEASE, and the subsequent operation after modification failure may be contained in an NAS data packet or the NG interface PDU session modification request message. As an implementation, the gNB can accept only the modification of the QoS flow 1 and the QoS flow 3, but not the modification of the QoS flow 2, so that the gNB can release resources for the QoS flow 2 (for example, unbind the DRBs), as described in the step 1520.

Step 2220: The gNB transmits an RRC message to a UE. Optionally, this message contains at least one of the following: session operation request information (for example, QoS flow information of the QoS flows (QoS flow 1 and QoS flow 3) requested to be modified, QoS flow information of the QoS flow (QoS flow 2) requested to be released, and/or the DRBs requested to be unbound with the QoS flow) on the gNB side.

The UE can perform only a modification operation on the QoS flow 1 and the QoS flow 3 according to the session operation request information on the gNB side. The specific process is as described in the step 1520 in the first embodiment of the present disclosure. As an implementation, the UE can accept only the modification of the QoS flow 1, but not the modification of the QoS flow 3, so that the UE can release the resources and configuration (for example, the binding with the DRB) for the QoS flow 3, as described in the step 1520.

Step 2230: The UE returns an RRC message to the gNB. Optionally, this message contains at least one of the following: session operation result information (for example, QoS flow information of the successfully modified QoS flow (QoS flow 1), QoS flow information the unsuccessfully modified QoS flow (QoS flow 3), and/or QoS flow information of the successfully released QoS flow (QoS flow 2)) on the UE side. The gNB can know, according to the session operation result information on the UE side, that only the QoS flow 1 is successfully modified eventually and the radio resources for the QoS flow 3 need to be released, as described in the step 1520. Hence, the gNB can release the resources for the QoS flow 3 (for example, unbinding the QoS flow 3 with the previous DRBs, where QoS flows bound with the DRB do not include the QoS flow 3), as descried in the step 1520.

Step 2240: The gNB returns an NG interface PDU session modification response message to the AMF. Optionally, this message contains the session operation result about the UE (for example, QoS flow information of the successfully modified QoS flow (QoS flow 1) and session information of the modified unsuccessfully or released QoS flows (QoS flow 1 and QoS flow 3) returned by the gNB. The AMF transmits the corresponding session information to an SMF, so that the SMF can control the resource release of the QoS flow 2 and the QoS flow 3 on the CN side.

It can be known from the tenth application scenario that the operations between the UE and the core network may not be controlled by an NAS data packet, and the gNB directly maintains the session operation results about the UE returned by the UE and by the gNB to be consistent, i.e.: the QoS flow 2 and the QoS flow 3 are released after modification failure.

An eleventh specific application scenario of the present disclosure, i.e., session establishment, is shown in FIG. 23. FIG. 35 schematically shows a signaling flow diagram of an operation process in the method for controlling a session operation in an eleventh application scenario of the present disclosure.

Step 2301: A UE transmits an NAS data packet to an access mobility management function (AMF). The NAS data packet contains an N1 PDU session establishment request message.

Step 2302: The AMF transmits a PDU session context establishment request message to a session management function (SMF). This message contains the NAS data packet received from the UE. The operations between the core networks, such as SMF and the UDF, are omitted. In one implementation, the SMF accepts a PDU session establishment request from the UE, and transmits the PDU session establishment request to the AMF, as described in the step 2503.

Step 2303: The SMF transmits a session context establishment response message to the AMF. This message can contain a NAS data packet and requirements on the QoS profile/QoS parameter of the QoS flow of the PDU session. The NAS data packet contains an N1 PDU session establishment acceptation message. The N1 PDU session establishment acceptation message can contain the authorized QoS rule for the accepted PDU session.

Step 2304: The AMF transmits an NG interface PDU session resource establishment request message to a radio access network node. Optionally, this message can contain at least one of the following: PDU session operation request information (containing session information (requirements on the QoS profile/QoS parameter of the QoS flow 1, requirements on the QoS profile/QoS parameter of the QoS flow 2) of PDU sessions requested to be established, and the NAS data packet (N1 PDU session establishment acceptation message (the QoS rule authorized for the QoS flow 1, the QoS rule authorized for the QoS flow 2, etc.)).

In one implementation, the radio access network can accept only the establishment of the QoS flow 1, but not the establishment of the QoS flow 2. For example, there is at least one of the following cases: the radio access network node can accept the requirements on the QoS profile or QoS parameter of the QoS flow 1 and can allocate/map radio bearers for the QoS flow 1; and, the radio access network node refuses to accept requirements on the QoS profile or QoS parameter of the QoS flow 2 and is unable to allocate/map radio bearers for the QoS flow 2.

Step 2305: The radio access network node transmits an RRC message to the UE. Optionally, this message contains at least one of the following: the NAS data packet (N1 PDU session establishment acceptation message (for example, the QoS rule authorized for the QoS flow 1, the QoS rule authorized for the QoS flow 2, etc.)), session operation result information on the radio access network node side, and DRB configuration related to the QoS flow 1.

The UE can perform the configuration of DRBs according to the DRB configuration mapped by the QoS flow 1, and then map the QoS flow 1. For the QoS flow 1 accepted by the radio access network node or the QoS flow 1 with mapped DRBs, the UE can accept or apply the QoS rule related to the QoS flow 1 (the QoS rule may be the QoS rule preconfigured by the UE or the QoS rule of the QoS flow 1 in the N1 PDU session establishment acceptation message).

For the QoS flow 2 unsuccessfully established by the radio access network node (for example, the QoS flow 2 refused or not accepted by the radio access network node or the QoS 2 without mapped DRBs), the UE can execute, but not limited to, at least one of the following (just for example, specifically described in the step 1520): refusing or not applying the QoS rule related to the QoS flow, requesting other nodes to refuse or not apply the QoS rule related to the QoS flow, refusing or not applying the QoS rule related to the QoS profile of the QoS flow, requesting other nodes to release and/or not apply the QoS rule related to the QoS flow, refusing or not applying the QoS profile of the QoS flow, refusing or not applying the QoS parameter of the QoS flow, abandoning the data of the QoS flow and/or the data of the service data flow related to the QoS flow, requesting other nodes to abandon the data of the QoS flow and/or the data of the service data flow related to the QoS flow, temporarily caching the data of the QoS flow and/or the data of the service data flow related to the QoS flow, requesting other nodes to temporarily cache the data of the QoS flow and/or the data of the service data flow related to the QoS flow, applying the defaulted QoS rule for the data of the service data flow related to the QoS flow, applying the defaulted QoS rule for the data of the service data flow related to the QoS rule of the QoS flow, decreasing requirements on the QoS parameter of the QoS flow, releasing the relevant configurations of the QoS flow, and transmitting the data of the QoS flow by a defaulted radio bearer.

Step 2306: The UE returns an RRC configuration completion message to the radio access network node.

Step 2307: The radio access network node returns an NG interface PDU session establishment response message to the AMF. Optionally, this message can contain at least one of the following: the session operation result about the UE (for example, QoS flow information of the successfully established QoS flow 1, QoS flow information of the unsuccessfully established QoS flow 2, etc.) returned by the radio access network node.

Step 2308: The AMF transmits a session context modification request message to the SMF. Optionally, this message can contain at least one of the following: the session operation result about the UE (for example, QoS flow information of the successfully established QoS flow 1, QoS flow information of the unsuccessfully established QoS flow 2, etc.) returned by the radio access network node.

For the QoS flow 2 unsuccessfully established or the QoS flow 2, requirements on the QoS profile or QoS parameter of which, is not accepted, the SMF can refuse or not apply the QoS rule related to the QoS flow 2.

For the QoS flow 2, the SMF can execute, but not limited to, at least one of the following (specifically described in the step 1520): refusing or not applying the QoS rule related to the QoS flow, requesting other nodes to refuse or not apply the QoS rule related to the QoS flow, refusing or not applying the QoS rule related to the QoS profile of the QoS flow, requesting other nodes to release and/or not apply the QoS rule related to the QoS flow, refusing or not applying the QoS profile of the QoS flow, refusing or not applying the QoS parameter of the QoS flow, abandoning the data of the QoS flow and/or the data of the service data flow related to the QoS flow, requesting other nodes to abandon the data of the QoS flow and/or the data of the service data flow related to the QoS flow, temporarily caching the data of the QoS flow and/or the data of the service data flow related to the QoS flow, requesting other nodes to temporarily cache the data of the QoS flow and/or the data of the service data flow related to the QoS flow, applying the defaulted QoS rule for the data of the service data flow related to the QoS flow, applying the defaulted QoS rule for the data of the service data flow related to the QoS rule of the QoS flow, decreasing requirements on the QoS parameter of the QoS flow, releasing the relevant configurations of the QoS flow, and transmitting the data of the QoS flow by a defaulted radio bearer.

Step 2309: The SMF transmits a session context modification request message to the UPF. Optionally, this message can contain at least one of the following: the session operation result about the UE (for example, QoS flow information of the successfully established QoS flow 1, QoS flow information of the unsuccessfully established QoS flow 2, etc.) returned by the radio access network node.

For the QoS flow 2 unsuccessfully established or the QoS flow 2, requirements on the QoS profile or QoS parameter of which, is not accepted, the UPF can refuse or not apply the QoS rule related to the QoS flow 2.

For the QoS flow 2, the UPF can execute, but not limited to, at least one of the following (specifically described in the step 1520): refusing or not applying the QoS rule related to the QoS flow, requesting other nodes to refuse or not apply the QoS rule related to the QoS flow, refusing or not applying the QoS rule related to the QoS profile of the QoS flow, requesting other nodes to release and/or not apply the QoS rule related to the QoS flow, refusing or not applying the QoS profile of the QoS flow, refusing or not applying the QoS parameter of the QoS flow, abandoning the data of the QoS flow and/or the data of the service data flow related to the QoS flow, requesting other nodes to abandon the data of the QoS flow and/or the data of the service data flow related to the QoS flow, temporarily caching the data of the QoS flow and/or the data of the service data flow related to the QoS flow, requesting other nodes to temporarily cache the data of the QoS flow and/or the data of the service data flow related to the QoS flow, applying the defaulted QoS rule for the data of the service data flow related to the QoS flow, applying the defaulted QoS rule for the data of the service data flow related to the QoS rule of the QoS flow, decreasing requirements on the QoS parameter of the QoS flow, releasing the relevant configurations of the QoS flow, and transmitting the data of the QoS flow by a defaulted radio bearer.

Step 2310: The UPF transmits a session context modification response message to the SMF.

Step 2311: The SMF transmits a session context modification response message to the AMF.

It can be known from this embodiment that the UE or core network node determines whether to accept the QoS rule of a QoS flow according to the determination of the radio access network node about whether to accept the QoS profile or QoS parameter of the QoS flow.

A twelfth specific application scenario of the present disclosure is shown in FIG. 24. FIG. 24 schematically shows a signaling flow diagram of an operation process in the method for controlling a session operation in a twelfth application scenario of the present disclosure.

Step 2401: An SMF transmits a session transfer message to an AMF. Optionally, this message contains at least one of the following: session operation request information (for example, the QoS flow information (for example, the updates in the QoS profile or QoS parameter of the QoS flows) of QoS flows requested to be modified), the NAS data packet (a modification command (for example, updates in the QoS rule of the QoS flow) for multiple QoS flows (QoS flow 1 and QoS flow 2) in a same PDU session).

Step 2402: The AMF transmits an NG interface PDU session modification request message to a radio access network node. Optionally, this message can contain at least one of the following: session operation request information (for example, the QoS flow information (for example, the updates in the QoS profile or QoS parameter of the QoS flows) of QoS flows (QoS flow 1 and QoS flow 2) requested to be modified), the NAS data packet (a PDU session modification command (a modification command (for example, update the QoS rule of the QoS flow) for multiple QoS flows (QoS flow 1 and QoS flow 2) in a same PDU session).

In one implementation, the radio access network can accept only the modification to the QoS flow 1, but not the establishment of the QoS flow 2. For example, the radio access network node can accept the updates in the QoS profile or QoS parameter of the QoS flow 1, allocate/map radio bearers for the QoS flow 1, and allocate/map radio bearers for the QoS flow 1 according to the requirements on the updated QoS profile or QoS parameter of the QoS flow 1; and, the radio access network node refuses to accept requirements on the QoS profile or QoS parameter of the QoS flow 2 and is unable to allocate/map radio bearers for the QoS flow 2 and/or unable to allocate/map radio bearers for the QoS flow 2 according to the requirements on the updated QoS profile or QoS parameter of the QoS flow 2.

In one implementation, the DRBs previously associated with the QoS flow 1 by the radio access network node still can satisfy the requirements on the QoS profile or QoS parameter of the QoS flow 1. That is, it is unnecessary to update the DRBs associated with the QoS flow 1.

Step 2403: The radio access network node transmits an RRC message to the UE. Optionally, this message contains at least one of the following: the NAS data packet and the session operation result information (for example, QoS flow information of the successfully modified QoS flow 1 and/or QoS flow information of the unsuccessfully modified QoS flow 2) on the gNB side.

For the QoS flow 2 unsuccessfully modified by the radio access network node (for example, the radio access network refuses or does not accept the updates in the QoS flow 2 or the radio access network is unable to allocate and/or map DRBs according to the updates in the QoS flow 2), the UE can execute, but not limited to, at least one of the following (just for example, specifically described in the step 1520): refusing and/or releasing the updates in the QoS rule of the QoS flow, requesting other nodes to refuse and/or release updates in the QoS rule of the QoS flow, refusing and/or releasing the QoS rule related to the QoS flow, requesting other nodes to refuse and/or release the QoS rule related to the QoS flow, maintaining the QoS rule of the QoS flow before modification, requesting other nodes to maintain the QoS rule of the QoS flow before modification, refusing or not applying the updates in the QoS rule related to the updates in the QoS profile or updates in the QoS parameter, refusing or not applying the updates in the QoS profile or updates in the QoS parameter of the QoS flow, maintaining the QoS profile or QoS parameter of the QoS flow before the update, maintaining the radio bearer mapped by the QoS flow before the update, abandoning the data of new service data flows related to the updates in the QoS rule of the QoS flow, requesting other nodes to abandon the data of new service data flows related to the updates in the QoS rule of the QoS flow, temporarily caching the data of new service data flows related to the updates in the QoS rule of the QoS flow, requesting other nodes to temporarily cache the data of new service data flows related to the updates in the QoS rule of the QoS flow, applying the defaulted QoS rule for the data of new service data flows related to the updates in the QoS rule of the QoS flow, applying the defaulted QoS rule for the new service data flows without any dedicated QoS rule, decreasing requirements on the updated QoS profile or QoS parameter of the QoS flow, releasing relevant configurations of the QoS flow, and transmitting the QoS flow by a defaulted radio bearer.

Step 2404: The UE transmits an RRC message to the radio access network node. Optionally, this message contains the NAS data packet returned by the UE, for example, the N1 PDU session modification acknowledgement.

Step 2405: The radio access network node returns an NG interface PDU session modification response message to the AMF. Optionally, this message contains the session operation result about the UE (for example, QoS flow information of the successfully modified QoS flow 1 and QoS flow information of the unsuccessfully modified QoS flow 2) returned by the gNB, and the NAS data packet (returned by the UE).

Step 2406: The AMF transmits a session context modification request message to the SMF. Optionally, this message can contain at least one of the following: the session modification operation result about the UE (for example, QoS flow information of the successfully modified QoS flow 1, QoS flow information of the unsuccessfully modified QoS flow 2, etc.) returned by the radio access network node.

For the QoS flow 2 unsuccessfully modified or the QoS flow 2, the updates in the QoS profile or QoS parameter of which, are not accepted, the SMF can refuse or not apply the updates in the QoS rule related to the QoS flow 2.

For the QoS flow 2, the SMF can execute, but not limited to, at least one of the following (just for example, specifically described in the step 1520): refusing and/or releasing the updates in the QoS rule of the QoS flow, requesting other nodes to refuse and/or release updates in the QoS rule of the QoS flow, refusing and/or releasing the QoS rule related to the QoS flow, requesting other nodes to refuse and/or release the QoS rule related to the QoS flow, maintaining the QoS rule of the QoS flow before modification, requesting other nodes to maintain the QoS rule of the QoS flow before modification, refusing or not applying the updates in the QoS rule related to the updates in the QoS profile or updates in the QoS parameter, refusing or not applying the updates in the QoS profile or updates in the QoS parameter of the QoS flow, maintaining the QoS profile or QoS parameter of the QoS flow before the update, maintaining the radio bearer mapped by the QoS flow before the update, abandoning the data of new service data flows related to the updates in the QoS rule of the QoS flow, requesting other nodes to abandon the data of new service data flows related to the updates in the QoS rule of the QoS flow, temporarily caching the data of new service data flows related to the updates in the QoS rule of the QoS flow, requesting other nodes to temporarily cache the data of new service data flows related to the updates in the QoS rule of the QoS flow, applying the defaulted QoS rule for the data of new service data flows related to the updates in the QoS rule of the QoS flow, applying the defaulted QoS rule for the new service data flows without any dedicated QoS rule, decreasing requirements on the updated QoS profile or QoS parameter of the QoS flow, releasing relevant configurations of the QoS flow, and transmitting the QoS flow by a defaulted radio bearer.

Step 2407: The SMF transmits a session context modification request message to the UPF. Optionally, this message can contain at least one of the following: the session operation result about the UE (for example, QoS flow information of the successfully modified QoS flow 1, QoS flow information of the unsuccessfully modified QoS flow 2, etc.) returned by the radio access network node.

For the QoS flow 2 unsuccessfully modified or the QoS flow 2, requirements on the QoS profile or QoS parameter of which, is not accepted, the UPF can refuse or not apply the updates in the QoS rule related to the QoS flow 2.

For the QoS flow 2, the UPF can execute, but not limited to, at least one of the following (just for example, specifically described in the step 1520):

for the QoS flow 1 refused or not accepted by the radio access network node or the QoS flow 2 without DRBs, the UPF can execute, but not limited to, at least one of the following (specifically described in the step 1520):

refusing and/or releasing the updates in the QoS rule of the QoS flow, requesting other nodes to refuse and/or release updates in the QoS rule of the QoS flow, refusing and/or releasing the QoS rule related to the QoS flow, requesting other nodes to refuse and/or release the QoS rule related to the QoS flow, maintaining the QoS rule of the QoS flow before modification, requesting other nodes to maintain the QoS rule of the QoS flow before modification, refusing or not applying the updates in the QoS rule related to the updates in the QoS profile or updates in the QoS parameter, refusing or not applying the updates in the QoS profile or updates in the QoS parameter of the QoS flow, maintaining the QoS profile or QoS parameter of the QoS flow before the update, maintaining the radio bearer mapped by the QoS flow before the update, abandoning the data of new service data flows related to the updates in the QoS rule of the QoS flow, requesting other nodes to abandon the data of new service data flows related to the updates in the QoS rule of the QoS flow, temporarily caching the data of new service data flows related to the updates in the QoS rule of the QoS flow, requesting other nodes to temporarily cache the data of new service data flows related to the updates in the QoS rule of the QoS flow, applying the defaulted QoS rule for the data of new service data flows related to the updates in the QoS rule of the QoS flow, applying the defaulted QoS rule for the new service data flows without any dedicated QoS rule, decreasing requirements on the updated QoS profile or QoS parameter of the QoS flow, releasing relevant configurations of the QoS flow, and transmitting the QoS flow by a defaulted radio bearer.

Step 2408: The UPF transmits a session context modification response message to the SMF.

Step 2409: The SMF transmits a session context modification response message to the AMF.

It can be known from this embodiment that the UE or core network node decides whether to accept the QoS rule of a QoS flow according to the decision of the radio access network node about whether to accept the QoS profile or QoS parameter of the QoS flow.

It can be known from the twelfth application scenario and this embodiment that the UE or core network node decides whether to accept the updates in the QoS rule of a QoS flow according to the decision of the radio access network node about whether to accept the updates in the QoS profile or QoS parameter of the QoS flow.

A third embodiment of the present disclosure provides a device for controlling a session operation, comprising an acquisition module 2510 and an operation module 2520, as shown in FIG. 25. FIG. 25 schematically shows a structural block diagram of a device for controlling a session operation according to a third embodiment of the present disclosure The acquisition module 2510 is configured to acquire, by a first node, first session operation information about a UE, wherein the first session operation information about the UE comprises at least one of the following: first session operation request information and first session operation result information.

The operation module 2520 is configured to determine, according to the first session operation information about the UE, whether to accept an operation request to a session/QoS flow in the first session operation request information.

A fourth embodiment of the present disclosure provides a device for controlling a session operation, comprising a decision module 2610, a determination module 2620 and a transmitting module 2630, as shown in FIG. 26. FIG. 26 schematically shows a structural block diagram of a device for controlling a session operation according to a fourth embodiment of the present disclosure.

The decision module 2610 is configured to decide, by a second node, whether a preset condition is satisfied.

The determination module 2620 is configured to, when it is determined that the preset condition is satisfied, determine, by the second node, second session operation information about a UE, wherein the second session operation information about the UE comprises at least one of the following: second session operation request information and second session operation result information.

The transmitting module 2630 is configured to transmit the determined second session operation information about the UE.

The programs running on the device according to the present disclosure may be programs that enable the computer to implement functions of the embodiments of the present disclosure by controlling a central processing unit (CPU). The programs or information processed by the programs may be temporarily stored in a volatile memory, such as a random access memory (RAM), a hard disk drive (HDD), a non-volatile memory (e.g., flash memory), or other memory system.

The programs for realizing the functions of the embodiments of the present disclosure may be recorded on a computer-readable recording medium. Corresponding functions can be realized by making the computer system read the programs recorded on the recording medium and execute these programs. The so-called "computer system" herein may be a computer system embedded in the device, and may include an operating system or hardware, such as a peripheral device. The "computer-readable recording medium" may be a semi-conductor recording medium, an optical recording medium, a magnetic recording medium, a recording medium for a short-time dynamic storage program, or any other computer readable recording medium.

Various features or functional blocks of the device used in the above embodiments may be implemented or executed by circuitry (e.g., monolithic or multi-chip integrated circuits). The circuitry designed to perform the functions described in this specification may include general purpose processors, digital signal processors (DSPs), application specific integrated circuits (ASICs), field programmable gate arrays (FPGAs), or other programmable logic devices, discrete gate or transistor logic, discrete hardware components, or any combination of the above devices. The general purpose processor may be a microprocessor or any existing processor, controller, microcontroller, or state machine. The circuit may be a digital circuit or an analog circuit. One or more embodiments of the present disclosure may also be implemented using these new integrated circuit techniques in the event of a new integrated circuit technology that replaces existing integrated circuits due to advances in semiconductor technology.

As described above, the embodiments of the present disclosure have been described in detail with reference to the accompanying drawings. However, the specific structure is not limited to the above-described embodiments, and the present disclosure also includes any design modifications that do not depart from the spirit of the present disclosure.

In addition, various modifications may be made to the present disclosure within the scope of the claims, and the embodiments obtained by appropriate combinations of the technical means disclosed in the different embodiments are also included within the technical scope of the present disclosure. In addition, the components having the same effects described in the above embodiments may be substituted for each other.

The foregoing descriptions are only preferred embodiments of the present disclosure and a description of the technical principles of the present disclosure. It should be understood by the skilled in the art that the scope of the present disclosure recited in this application is not limited to the particular combinations of the above technical features and should also cover other technical solutions formed by any combinations of the technical features described above or their equivalent features without departing from the inventive concept, e.g., the technical solutions formed by the above mentioned features being interchangeable with, but not limited to, technical features having similar functions as disclosed in this application.

The invention claimed is:

1. A method performed by a master base station in a wireless communication system, the method comprising:
   transmitting, to a secondary base station, a first message for requesting the secondary base station to allocate resources for a dual connectivity (DC) operation; and
   receiving, from the secondary base station, a second message, after transmitting the first message; and
   transmitting, to the secondary base station, a third message, after receiving the second message,
   wherein the first message comprises a quality of service (QoS) flow identifier (ID) and a data radio bearer (DRB) ID,
   wherein the second message comprises the QoS flow ID and a new DRB ID corresponding to the QoS flow ID, and
   wherein the third message comprises tunnel information for the new DRB ID, the tunnel information comprising an internet protocol (IP) address and a tunnel endpoint identifier (TEID).

2. The method of claim 1, wherein the first message comprises information indicating a list of DRB IDs that is usable by the secondary base station for the OoS flow identified by the OoS flow ID.

3. The method of claim 1, wherein the first message comprises:
   an ID of a packet data unit (PDU) session associated with the resources,
   an ID of a flow associated with the resources, and
   QoS parameters related to the QoS flow.

4. A method performed by a secondary base station in a wireless communication system, the method comprising:
   receiving, from a master base station, a first message for requesting the master base station to allocate resources for a dual connectivity (DC) operation;
   transmitting, to the master base station, a second message, after transmitting the first message; and
   receiving, from the master base station, a third message, after receiving the second message,
   wherein the first message comprises quality of service (QoS) flow identifier (ID) and a data radio bearer (DRB) ID,
   wherein the second message comprises the QoS flow ID and a new DRB ID corresponding to the QoS flow ID, and
   wherein the third message comprises tunnel information for the new DRB ID, the tunnel information comprising an internet protocol (IP) address and a tunnel endpoint identifier (TEID).

5. The method of claim 4, wherein the first message comprises information indicating a list of DRB IDs that is usable by the master base station for the QoS flow identified by the QoS flow ID.

6. The method of claim 4, wherein the first message comprises:
   an ID of a packet data unit (PDU) session associated with the resources,
   an ID of a flow associated with the resources, and
   QoS parameters related to the QoS flow.

7. A master base station in a wireless communication system, the master base station comprising:
   a transceiver; and
   at least one processor coupled to the transceiver and configured to:
      transmit, to a secondary base station, a first message for requesting the secondary base station to allocate resources for a dual connectivity (DC) operation;
      receive, from the secondary base station, a second message, after transmitting the first message; and
      transmit, to the secondary base station, a third message, after receiving the second message,
   wherein the first message comprises a quality of service (OoS) flow identifier (ID) and a data radio bearer (DRB) ID,
   wherein the second message comprises the QoS flow ID and a new DRB ID corresponding to the QoS flow ID, and
   wherein the third message comprises tunnel information for the new DRB ID, the tunnel information comprising an internet protocol (IP) address and a tunnel endpoint identifier (TEID).

8. The master base station of claim 7, wherein the first message comprises information indicating a list of DRB IDs that is usable by the secondary base station for the QoS flow identified by the QoS flow ID.

9. The master base station of claim 7, wherein the first message comprises:
   an ID of a packet data unit (PDU) session associated with the resources,
   an ID of a flow associated with the resources, and
   QoS parameters related to the QoS flow.

* * * * *